US009251192B2

(12) United States Patent
Mineno

(10) Patent No.: US 9,251,192 B2
(45) Date of Patent: Feb. 2, 2016

(54) INFORMATION MATCHING APPARATUS, INFORMATION MATCHING SYSTEM AND METHOD OF MATCHING INFORMATION FOR OUTPUTTING MATCHING RESULT

(75) Inventor: Kazuo Mineno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/307,091

(22) Filed: Nov. 30, 2011

(65) Prior Publication Data

US 2012/0197921 A1 Aug. 2, 2012

(30) Foreign Application Priority Data

Jan. 28, 2011 (JP) ................................. 2011-017221

(51) Int. Cl.
*G06F 7/00* (2006.01)
*G06F 17/30* (2006.01)

(52) U.S. Cl.
CPC ...... *G06F 17/30336* (2013.01); *G06F 17/3053* (2013.01); *G06F 17/30598* (2013.01); *G06F 17/30622* (2013.01)

(58) Field of Classification Search
CPC .......... G06F 17/3053; G06F 17/30598; G06F 17/30336
USPC .................................. 707/728, 740, 758, 741
See application file for complete search history.

(56) References Cited

U.S. PATENT DOCUMENTS

| | | | | |
|---|---|---|---|---|
| 6,460,036 | B1 * | 10/2002 | Herz .............................. | 707/748 |
| 6,584,221 | B1 * | 6/2003 | Moghaddam et al. . | 707/999.006 |
| 7,058,658 | B2 * | 6/2006 | Mentzer .................. | 707/999.107 |
| 7,958,048 | B2 * | 6/2011 | Beardsell et al. .................. | 705/3 |
| 7,974,975 | B2 * | 7/2011 | Pollack et al. ................. | 707/728 |
| 8,131,083 | B2 * | 3/2012 | Yoshino ......................... | 707/728 |
| 2004/0024755 | A1 * | 2/2004 | Rickard ................. | 707/999.003 |
| 2009/0083228 | A1 * | 3/2009 | Shatz et al. ............ | 707/999.003 |
| 2010/0088307 | A1 | 4/2010 | Watanabe | |
| 2010/0306193 | A1 * | 12/2010 | Pereira et al. ................. | 707/728 |

FOREIGN PATENT DOCUMENTS

| | | | |
|---|---|---|---|
| JP | 2003-241653 | A | 8/2003 |
| JP | 2004-348489 | A | 12/2004 |
| JP | 2006-221478 | A | 8/2006 |

(Continued)

OTHER PUBLICATIONS

Terry Sincich. A Course in Modern Business Statistics, Second Edition. Macmillan College Publishing Company, New York, 1994, Title pages, Preface and Sections 2.4 and 3.3, pp. i, ii, ix-xii, 40-43 and 69-79.*

(Continued)

*Primary Examiner* — Usmaan Saeed
*Assistant Examiner* — Brian E. Weinrich
(74) *Attorney, Agent, or Firm* — Fujitsu Patent Center

(57) ABSTRACT

The information matching apparatus includes calculating matching result values representing identicalness, similarity, and relevance between a plurality of records by matching the plurality of records based on a judgment criteria, each of the plurality of records including sets of values corresponding to items, generating frequency distribution information in which the calculated matching result values are used as classes and determining the judgment criteria for whether the records matches or not based on the generated frequency distribution information.

12 Claims, 33 Drawing Sheets

(56) References Cited

FOREIGN PATENT DOCUMENTS

| | | |
|---|---|---|
| JP | 2008-234174 A | 10/2008 |
| JP | 2009-265905 A | 11/2009 |
| JP | 2010-86455 A | 4/2010 |

OTHER PUBLICATIONS

Japanese Office Action mailed Apr. 8, 2014 for corresponding Japanese Application No. 2011-017221, with English Translation, 7 pages.

Aizawa, Akiko, et al., "Techniques and Research Trends in Record Linkage Studies," The Transactions of The Institute of Electronics, Information and Communication Engineers, D-I, vol. J88-D-1, No. 3, pp. 576-589, Mar. 1, 2005, The Institute of Electronics, Information and Communication Engineers, with English Translation.

Japanese Office Action mailed Sep. 30, 2014 for corresponding Japanese Patent Application No. 2011-017221, with Partial English Translation, 5 pages.

Fukuda, Takeshi, "Article 3, IBM InfoSphere Identity Insight Solutions: intelligent solution for fighting threat and fraud," Provision, No. 65, Spring, May 21, 2010, IBM Japan, Ltd., pp. 45-51, with English Abstract and Partial English Translation of Japanese Office Action mailed Sep. 30, 2014.

\* cited by examiner

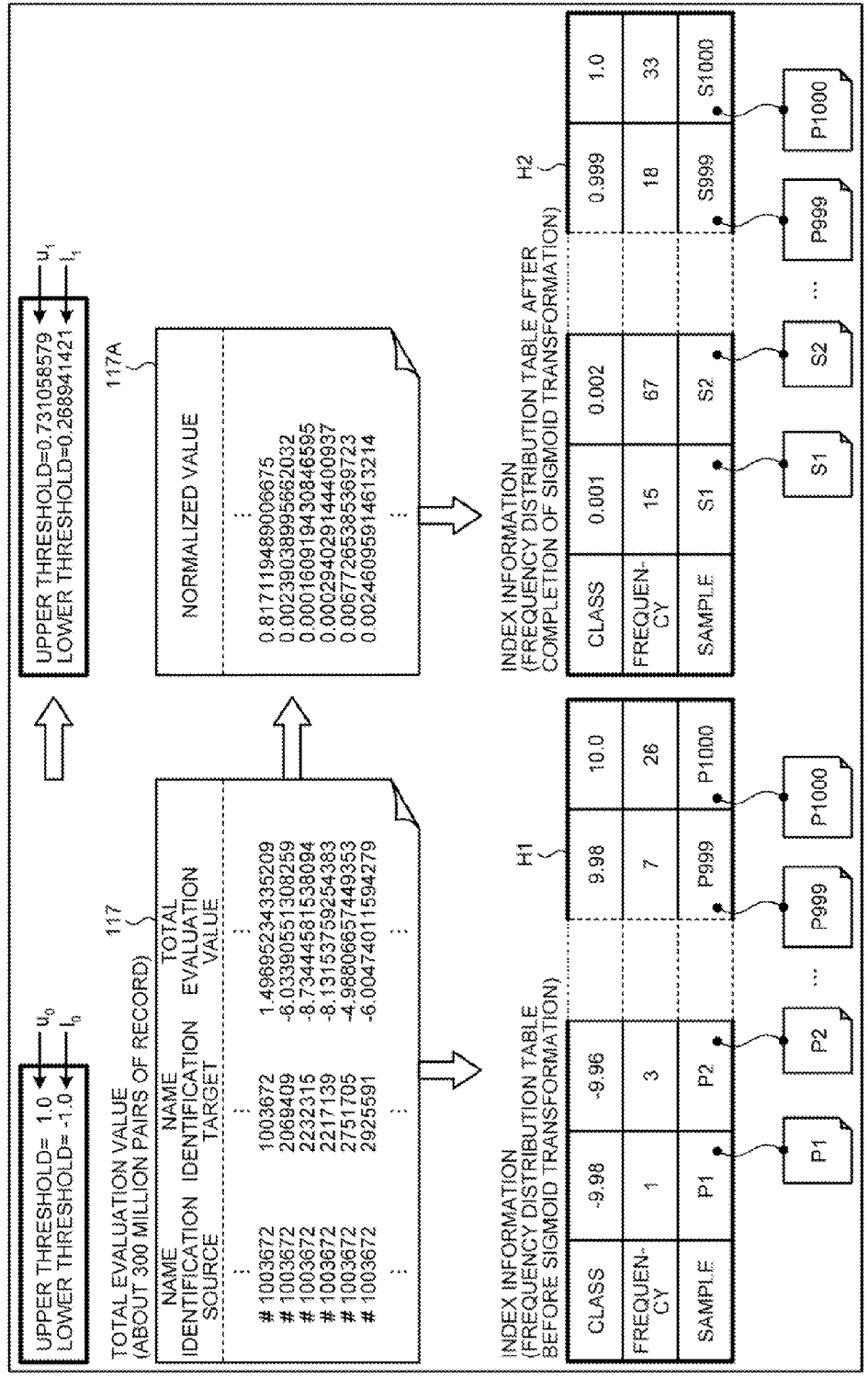

FIG.4

| No | INDEX NAME | INPUT DATA | DERIVATION SEQUENCE | USE |
|---|---|---|---|---|
| 1 | HISTOGRAM OF TOTAL EVALUATION VALUE | TOTAL EVALUATION VALUES OF ALL SETS | GENERATE FREQUENCY DISTRIBUTION TABLE BY SETTING TOTAL EVALUATION VALUE AS CLASS AND DISPLAY HISTOGRAM | DISTRIBUTION OF TOTAL EVALUATION VALUE |
| 2 | THRESHOLD | THRESHOLD | DISPLAY THRESHOLD AS LINE AT COORDINATES OF EACH INDEX | CHECKING OF THRESHOLD |
| 3 | NUMBER OF JUDGMENT RESULTS (White, Gray, AND Black) AND RATIO | FREQUENCY DISTRIBUTION TABLE GENERATED WITH INDEX No. 1 AND THRESHOLD | COUNT NUMBER OF RESPECTIVE JUDGMENT DISTRIBUTION TABLE BASES ON THRESHOLD | PREDICT JUDGMENT RESULT BASED ON THRESHOLD |
| 4 | HISTOGRAM OF TOTAL EVALUATION VALUE OF CHECK POINT | TOTAL EVALUATION VALUE OF CHECK POINT OF JUDGMENT OF White TOTAL EVALUATION VALUE OF CHECK POINT OF JUDGMENT OF Black | GENERATE FREQUENCY DISTRIBUTION TABLE BY SETTING TOTAL EVALUATION VALUE AS CLASS AND DISPLAY HISTOGRAM | DISTRIBUTION OF TOTAL EVALUATION VALUES OF CHECKPOINTS OF White/Black |
| 5 | ACCURACY RATES OF JUDGMENT OF White AND JUDGMENT OF Black BASED ON CHECK POINTS | THRESHOLD AND TOTAL EVALUATION VALUE OF Nos. 1 TO 5 AND 7 | ACQUIRE ACCURACY RATE FOR EACH CLASS BY COUNTING FREQUENCY DISTRIBUTION TABLE OF No. 4 | ACCURACY RATES OF JUDGMENT OF White/ JUDGMENT OF Black |
| 6 | NORMALIZATION AND SIGMOID TRANSFORMATION OF TOTAL EVALUATION VALUE | THRESHOLD AND TOTAL EVALUATION VALUE OF Nos. 1 TO 5 AND 7 | APPLY SIGMOID TRANSFORMATION TO TOTAL EVALUATION VALUE AND THRESHOLD | ENLARGE PORTION NEAR THRESHOLD |
| 7 | SET OF SAMPLE RECORDS | DERIVED POINT (TOTAL EVALUATION VALUE) | EXTRACT SET OF RECORDS HAVING SAME EVALUATION AS INSTRUCTED TOTAL EVALUATION VALUE | CHECKING OF PAIR OF RECORDS NEAR INSTRUCTED TOTAL EVALUATION VALUE |
| 8 | COUNTING JUDGMENT RESULTS | NAME IDENTIFICATION RESULT AND CANDIDATE LIST | COUNT NAME IDENTIFICATION RESULT AS JUDGMENT RESULTS OF RESPECTIVE PAIRS OF RECORDS AND CANDIDATE LIST | COUNTING OF RESPECTIVE JUDGMENT RESULTS AND VISUALIZATION OF VARIATION |

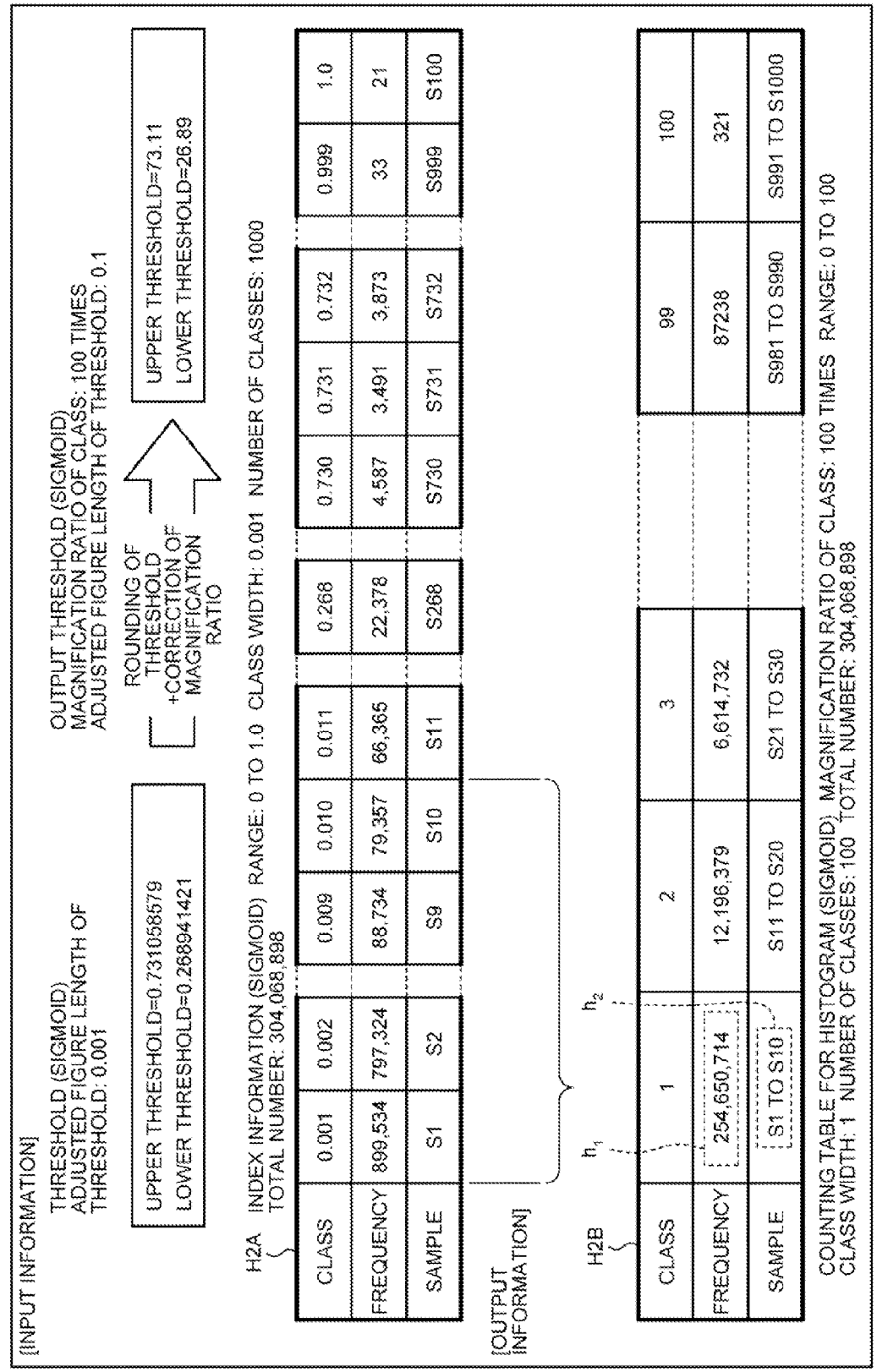

FIG.8A

INDEX INFORMATION OF CHECK POINTS OF White (SIGMOID) RANGE: 0 TO 1.0 CLASS WIDTH: 0.001
NUMBER OF CLASSES: 1000 TOTAL NUMBER: 870

H3A

| CLASS | 0.001 | 0.002 | ... | 0.009 | 0.010 | 0.011 | ... | 0.268 | ... | 0.730 | 0.731 | 0.732 | ... | 0.999 | 1.0 |
|---|---|---|---|---|---|---|---|---|---|---|---|---|---|---|---|
| FRE-QUENCY | 0 | 0 | | 0 | 0 | 0 | | 0 | | 0 | 1 | 1 | | 7 | 1 |
| ACCUMU-LATION | 864 | 864 | | 864 | 864 | 864 | | 864 | | 864 | 864 | 863 | | 8 | 1 |
| ACCURACY RATE | 99.31 | 99.31 | | 99.31 | 99.31 | 99.31 | | 99.31 | | 99.31 | 99.31 | 99.20 | | 0.91 | 0.11 |
| SAMPLE | NULL | NULL | | NULL | NULL | NULL | | NULL | | NULL | P731 | P732 | | P999 | P100 | c1 → ACCUMU-LATION
c2 → ACCURACY RATE

COUNTING TABLE FOR HISTOGRAM (SIGMOID) MAGNIFICATION RATIO OF CLASS: 100 TIMES RANGE: 0 TO 100
CLASS WIDTH: 1 NUMBER OF CLASSES: 100 TOTAL NUMBER: 870

H3B

| CLASS | 1 | 2 | 3 | ... | 99 | 100 |
|---|---|---|---|---|---|---|
| FRE-QUENCY | 0 | 0 | 0 | | 252 | 52 |
| ACCUMU-LATION | 864 | 864 | 864 | | 303 | 52 |
| ACCURACY RATE | 99.31 | 99.31 | 99.31 | | 34.82 | 5.98 |
| SAMPLE | NULL | NULL | NULL | | S981 TO S990 | S991 TO S1000 |

FIG.8B

INDEX INFORMATION OF CHECK POINTS OF Black (SIGMOID) RANGE: 0 TO 1.0 CLASS WIDTH: 0.001
NUMBER OF CLASSES: 1000 TOTAL NUMBER: 1340

| H4A | CLASS | 0.001 | 0.002 | ... | 0.009 | 0.010 | 0.011 | ... | 0.268 | ... | 0.730 | 0.731 | 0.732 | ... | 0.999 | 1.0 |
|---|---|---|---|---|---|---|---|---|---|---|---|---|---|---|---|---|
| | FRE-QUENCY | 0 | 0 | | 0 | 0 | 0 | | 3 | | 0 | 1 | 0 | | 0 | 0 |
| c3→ | ACCUMU-LATION | 685 | 685 | | 685 | 685 | 685 | | 791 | | 1285 | 1285 | 1286 | | 1340 | 1340 |
| c4→ | ACCURACY RATE | 51.12 | 51.12 | | 51.12 | 51.12 | 51.12 | | 59.02 | | 95.90 | 95.90 | 95.97 | | 100 | 100 |
| | SAMPLE | NULL | NULL | | NULL | NULL | NULL | | M268 | | NULL | M731 | NULL | | NULL | NULL |

COUNTING TABLE FOR HISTOGRAM (SIGMOID) MAGNIFICATION RATIO OF CLASS: 100 TIMES RANGE: 0 TO 100
CLASS WIDTH: 1 NUMBER OF CLASSES: 100 TOTAL NUMBER: 1340

| H4B | CLASS | 1 | 2 | 3 | ... | 99 | 100 |
|---|---|---|---|---|---|---|---|
| | FRE-QUENCY | 0 | 0 | 0 | | 0 | 0 |
| | ACCUMU-LATION | 685 | 685 | 685 | | 1340 | 1340 |
| | ACCURACY RATE | 51.12 | 51.12 | 51.12 | | 100 | 100 |
| | SAMPLE | NULL | NULL | NULL | | NULL | NULL |

FIG.12

| | | ID | NAME | ADDRESS | DATE_OF_BIRTH | EVALUATION VALUE |
|---|---|---|---|---|---|---|
| sr1 | NAME IDENTIFICATION SOURCE | 1000100 | 田中一郎 | 東京都新宿区AAAA | 1958.8.3 | 72.85 |
| | NAME IDENTIFICATION TARGET | 1000113 | 田中一郎 | 熊本県熊本市DDDD | 2001.9.15 | |
| sr2 | NAME IDENTIFICATION SOURCE | 1000101 | 鈴木次郎 | 神奈川県川崎市BBBB | 2003.5.1 | 73.04 |
| | NAME IDENTIFICATION TARGET | 1000121 | 鈴木次郎 | 神奈川県横浜市GGG | 2001.9.1 | |

FIG.13

| JUDGMENT BASED ON OLD THRESHOLD →CHANGE TO NEW THRESHOLD | | |
|---|---|---|
| White | W | 501,018 |
| | U | 92,930 |
| | L | 9,497 |
| | B | 7,605 |
| GrayU | W | 375,771 |
| | U | 927,946 |
| | L | 62,125 |
| | B | 48,525 |
| GrayL | W | 288,203 |
| | U | 361,326 |
| | L | 2,133,528 |
| | B | 337,451 |
| Black | W | 206,832 |
| | U | 827,543 |
| | L | 2,760,746 |
| | B | 295,127,852 |
| TOTAL | | 304,068,898 |

$C_{WO}$ = 611,050
$C_{GUO}$ = 1,414,367
$C_{GLO}$ = 3,120,508
$C_{BO}$ = 298,922,973
$C_{AO}$ $C_{WL}$, $C_{WB}$, $C_{BW}$

| JUDGMENT BASED ON NEW THRESHOLD | |
|---|---|
| White | 1,371,824 |
| GrayU | 2,209,745 |
| GrayL | 4,965,896 |
| Black | 295,521,433 |
| TOTAL | 304,068,898 |

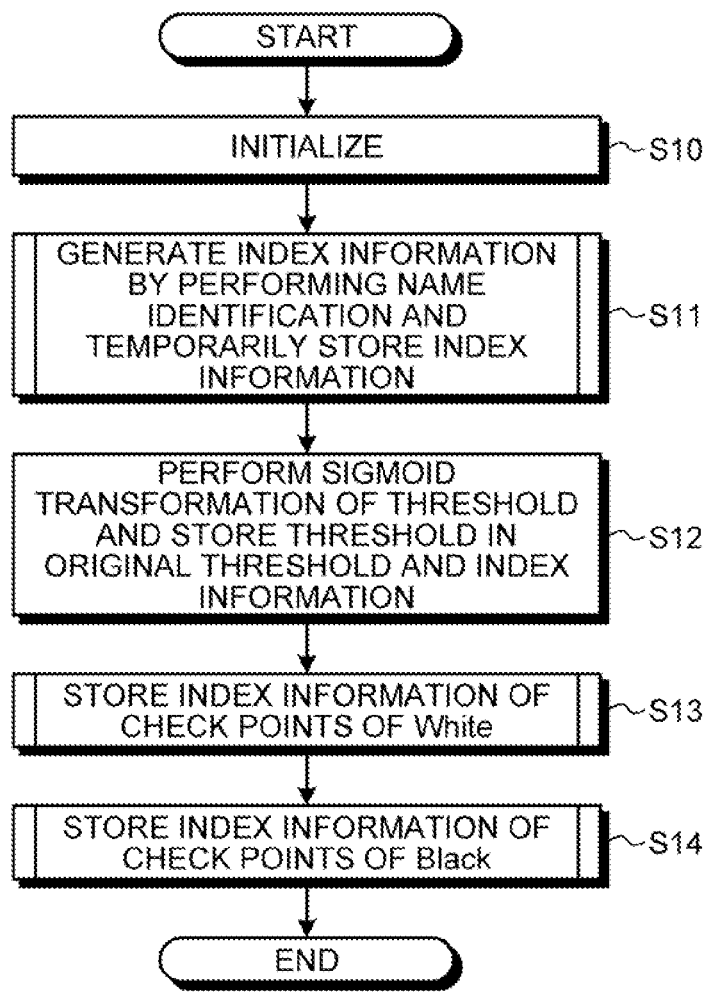

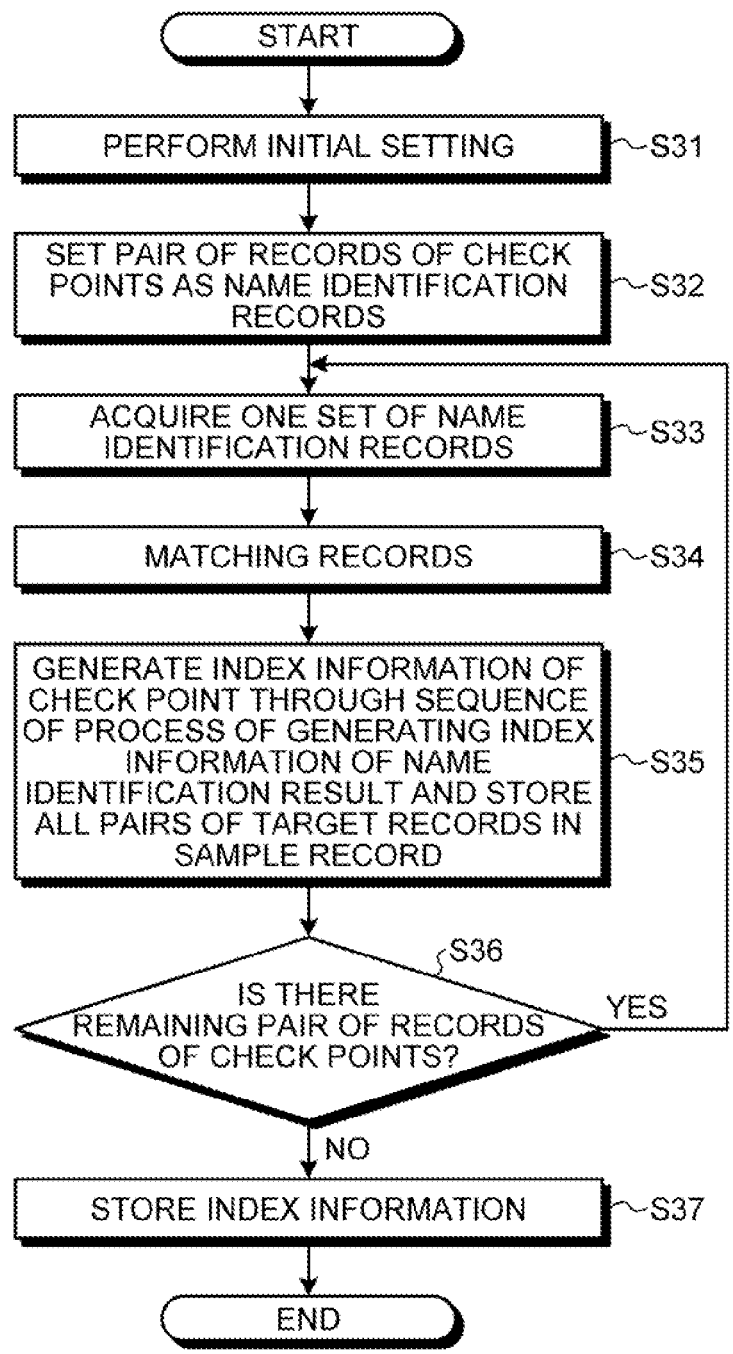

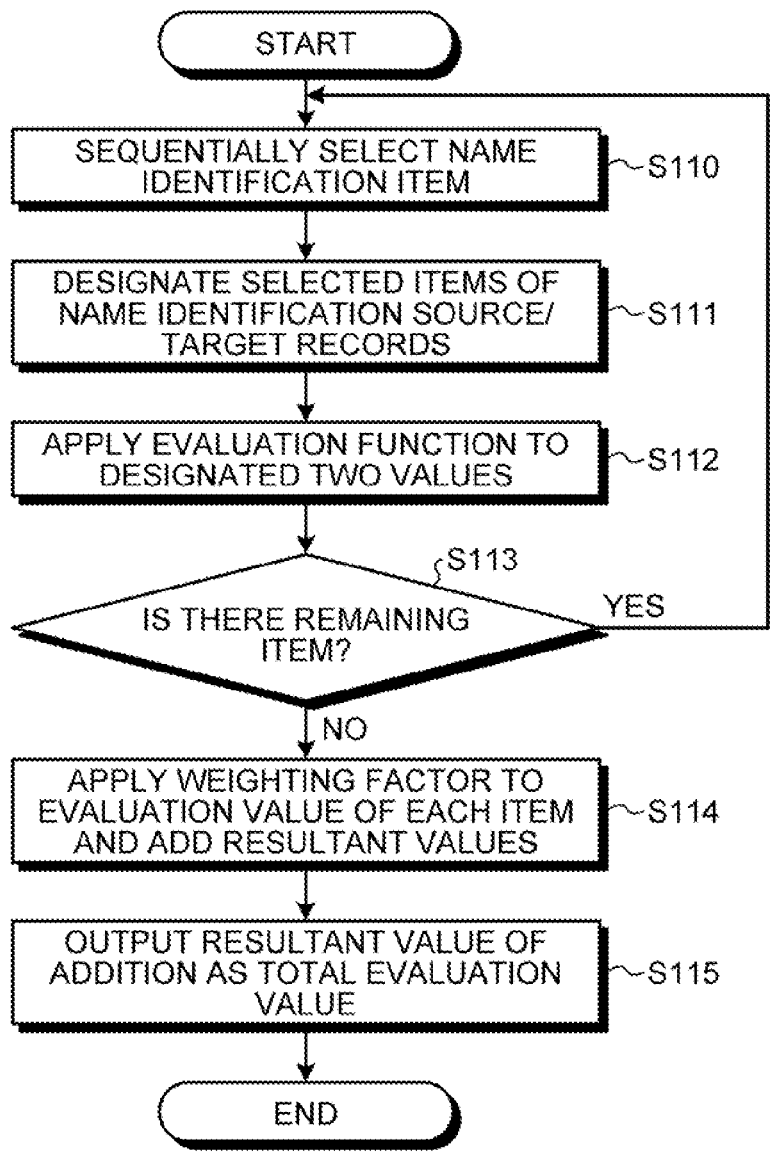

INFORMATION MATCHING APPARATUS, INFORMATION MATCHING SYSTEM AND METHOD OF MATCHING INFORMATION FOR OUTPUTTING MATCHING RESULT

CROSS-REFERENCE TO RELATED APPLICATION

This application is based upon and claims the benefit of priority of the prior Japanese Patent Application No. 2011-017221, filed on Jan. 28, 2011, the entire contents of which are incorporated herein by reference.

FIELD

The embodiment discussed herein is directed to an information matching apparatus, an information matching system, a method of matching information, and an information matching program.

BACKGROUND

As to records each configured by a set of values, as a function for matching the records to judge identicalness, similarity, and relevance between the records, there is a name identification function. In the name identification function, for example, a set of records to be identified by name is referred to as a name identification source, and a set of records that are opponents for name identification is referred to as a name identification target. FIG. 24 is a diagram illustrating the name identification function. As illustrated in FIG. 24, in a name identification process that realizes the name identification function, a record that is identical to the name identification source, a record that is similar to the name identification source, or a record that is relevant to the name identification source is detected from the name identification target, and a detection result is output as a result of the name identification process.

Relating to a name identification function for customer information, a technique is disclosed which refines matching data by searching for customer information stored in a name identification database (DB) based on customer data acquired by arranging address information and name information in order and compares the matching data with the customer data. According to such a technique, the degree of matching is judged based on a function for comparing the refined matching data and the customer data serving as a name identification source, and, in a case where the customer data that is compared is judged as customer data of a new customer in accordance with the degree of matching, the customer data is newly registered in the name identification DB serving as a name identification target.

First, a conventional name identification function will be described with reference to FIGS. 25 to 29. FIG. 25 is a diagram illustrating the operation of the name identification function. As illustrated in FIG. 25, in a name identification process that realizes the name identification function, each record J1 of the name identification source is matched with records M (M1 to Mn) of the name identification target so that name identification is performed.

In the name identification process, the values of each item of the identification target (referred to as a "name identification item") of the record J1 of the name identification source and a record M1 of the name identification target are matched by applying an evaluation function that is defined for each name identification item thereto. Here, it is assumed that the name identification items include a name, an address, and a date of birth, and, in the name identification process, a matching is made by applying each evaluation function of fa( ) to a name, fb( ) to an address, and fc( ) to a date of birth out of the name identification items. Then, the evaluation value of each name identification item that is derived as a result of the matching is weighted in accordance with the name identification item, and the acquired values are added together, whereby a total evaluation value is derived. In addition, in the name identification process, total evaluation values are derived for all the remaining records M2 to Mn of the name identification target with respect to the record J1 of the name identification source. In each name identification process, a name identification candidate set that includes the total evaluation values for sets of the record J1 of the name identification source and the records M1 to Mn of the name identification target is generated.

Then, in the name identification process, name identification is performed for sets of records that belongs to a name identification candidate set based on thresholds defined in advance. For example, in the name identification process, a set of records that are judged to completely be same each other is automatically judged as ""White"", and a set of records that are judged to be different is automatically judged as ""Black"", and the results are output as identification results. In addition, in the name identification process, a set of records which is automatically difficult to judge are judged as ""Gray"" and are outputted to a candidate list. Then, a staff undertakes the judgment with respect to the set outputted to the candidate list. In addition, name identification definitions that are need to be set by a staff include a selection of name identification items, a selection of evaluation functions, and setting of weighing factors and thresholds.

Next, the sequence of the name identification process will be described with reference to FIGS. 28 and 29. FIG. 28 is a flowchart illustrating the name identification function, and FIG. 29 is a flowchart illustrating the sequence of a matching process.

First, in the name identification process, the operating environment is set by reading a name identification definition in Step S100, and records of a name identification source (hereinafter, referred to as "name identification source records") which are name identification targets are sequentially chosen from the name identification source in Step S101. Then, in the name identification process, records of a name identification target (hereinafter, referred to as "name identification target records") that are identification opponents are sequentially chosen from the name identification target for each name identification record in Step S102. Here, when the name identification record is changed to another, the process is returned to the start point of the name identification target, and the name identification target records are chosen sequentially.

Next, in the name identification process, a matching process of the name identification source record and the name identification target record is performed in Step S103. Then, in the name identification process, a matching result is stored in the name identification candidate set in Step S104. In addition, the matching result includes a total evaluation value.

Subsequently, in the name identification process, it is judged whether or not there is a remaining name identification target record in the name identification target in Step S105. In a case where it is judged that there is a name identification target record remaining (Yes in Step S105), in the name identification process, the process is returned to Step S102 so as to extract the remaining name identification target records.

On the other hand, in a case where it is judged that there is no remaining name identification target record (No in Step S105), in the name identification process, a judgment is made for each total evaluation value stored in the name identification candidate set by using thresholds, and judgment results are output in Step S106. For example, in the name identification process, in a case where the total evaluation value is an upper-position threshold or larger, it is judged that the matched set of the name identification source record and the name identification target record is a set of records that are the same as each other, and "White" is judged for this set. In addition, in the name identification process, in a case where the total evaluation value is smaller than the upper-position threshold and a lower-position threshold or larger, it is judged that the matched set of the name identification source record and the name identification target record is automatically difficult to judge, and "Gray" is judged for this set. On the other hand, in the name identification process, in a case where the total evaluation value is smaller than the lower-position threshold, it is judged that the matched set of the name identification source record and the name identification target record is a set of records that is different each other, and "Black" is judged. Then, in the name identification process, the judgment results other than the result of "Black" are outputted as results. Since the set of records that is judged as "Black" can be considered to a set that is neither the set of records judged as "White" nor the set of records judged as "Gray" from the judgment results, the judgment result of "Black" does not need to be output as a result. In addition, there is a case where the output of the result is divided into "White" and "Gray", and "Gray" is referred to as a "candidate list" that means judgment candidates that need to be judged by a staff. In the description and diagrams described below, the upper-position threshold is abbreviated as an "upper threshold", and a lower-position threshold is abbreviated as a "lower threshold".

Next, in the name identification process, it is judged whether or not there is a remaining name identification source record in the name identification source in Step S107. In a case where it is judged that there is a remaining name identification source record in the name identification source (Yes in Step S107), the name identification process proceeds to Step S101 so as to extract the remaining name identification source record one by one. On the other hand, in a case where it is judged that there is no remaining name identification source record in the name identification source (No in Step S107), the name identification ends.

Next, the sequence of the matching process of Step S103 illustrated in FIG. 28 will be described with reference to FIG. 29. FIG. 29 is a flowchart illustrating the sequence of the matching process. The matching process is a process of performing matching so as to derive a total evaluation value for each set of the name identification source record and the name identification target record.

First, in the name identification process, name identification items defined in the name identification definition are sequentially selected in Step S110. Here, it is assumed that the name identification items are a set of items to be compared, which is configured by items of the name identification source and items of the name identification target, and are defined in the name identification definition in advance. Next, in the name identification process, values corresponding to the selected name identification items are respectively designated for the name identification source record and the name identification target record in Step S111, and an evaluation value is calculated by applying an evaluation function to the designated two values in Step S112. In addition, the evaluation function is a function that is defined in advance for the name identification item and is assumed to be defined in the name definition.

Subsequently, in the name identification process, it is judged whether or not there is a remaining name identification item in Step S113. In a case where it is judged that there is a remaining name identification item (Yes in Step S113), the name identification process proceeds to Step S110 so as to apply an evaluation function to the remaining name identification item.

On the other hand, in a case where it is judged that there is no remaining name identification item (No in Step S113), in the name identification process, the evaluation value of each name identification item is weighted for each name identification item, and the evaluation values resulting from the weighting are added up in Step S114. Then, in the name identification process, the value of the result of the addition is outputted as a total evaluation value for the target set of records in Step S115, and the matching process for one set ends.

Next, a detailed example of the name identification process will be described with reference to FIGS. 26 and 27. FIG. 26 is a diagram illustrating an example of the data structure of name identification definitions, FIG. 26(A) illustrates the contents of the name identification definitions, and FIG. 26(B) illustrates a detailed example of the name identification definitions. FIG. 27 is a diagram illustrating a detailed example of the name identification.

As illustrated in FIG. 26(A), in the name identification definition, a name identification method d1, a name identification source designation d2, a name identification target designation d3, a name identification item designation d4, and a threshold d5 are associated with one another for the definition. In the name identification method d1, a method of identifying names is designated. For example, as a method of identifying names, there is a "self name identification" in which name identification is performed between records within a set in a round-robin system with one record set being set as a target, and duplicate records are eliminated by detecting records that are the same as each other. In the self name identification, since the name identification source and the name identification target are the same set, the structures (items of the record) thereof are the same. In addition, as another method of identifying names, there is a "different party name identification" in which name identification is performed on a combination of a name identification source record and a name identification target record, with respect to different sets of the name identification source and the name identification target, records that match each other between the name identification source and the name identification target are detected, and the corresponding records are associated with each other. In the different party name identification, since the name identification source and the name identification target are different sets, generally, the structures (items of records) thereof are different from each other. In the name identification source designation d2, access information of the name identification source such as a database name and items of a record of the name identification source are designated. In the name identification target designation d3, access information of the name identification target such as a database name and items of a record of the name identification target are designated. In the name identification item designation d4, the name identification items are designated as a combination of items of the name identification source and items of the name identification target, and an evaluation function and a weighting factor that are applied to each name identification item are designated. In addition, in the threshold d5, an upper threshold used for judging "White" and a lower threshold used for judging "Black" are designated.

As illustrated in FIG. 26(B), for example, in the name identification method d1, the "self name identification" is designated. In the access information of the name identification source designation d2, a "customer table" is designated, and, in the record information of the name identification source designation d2, items including an identification (ID), a name, a zip code, an address, and a date of birth are designated. In addition, in a case where the name identification method is the "self name identification", the name identification target designation d3 is the same as the information of the name identification source, and a definition thereof is not necessary. In the name identification item designation d4, the name identification items are designated in the form of name: name, zip code: zip code, address: address, and date of birth: date of birth. The reason for this is that the name identification item is designated with a set of an item of the name identification source and an item of the name identification target, and in a case where the name identification method is the "self name identification", the record configurations are the same, and thus, generally, the same item names are designated as the set. For each name identification item, an evaluation function and a weighting factor to be applied are designated. For example, in a case where the name identification item is "name:name", "edit distance" is designated as the evaluation function, and 0.3 is designated as the weighting factor. On the other hand, in a case where the name identification item is "zip code: zip code", "complete matching" is designated as the evaluation function, and 0.2 is designated as the weighting factor. In the threshold d5, 0.72 is designated as the upper threshold, and 0.26 is designated as the lower threshold. Hereinafter, a name identification item in which the same item names are paired will be represented as one item name. For example, "name identification item name: name" is represented as "name identification item name". Here, the "edit distance" is an evaluation function that represents a minimum number of times of editing at the time of transforming the value of the name identification target into the value of the name identification source for a matching of values of the name identification items of the name identification source and the name identification target, as a distance. For example, in a case where a transformation is not necessary, 1.0 is returned, and, in a case where all the transformations are necessary, 0 is returned. On the other hand, in a case where some of the transformations are sufficient, a value in the range of 0 to 1.0 is returned in accordance with the number of the transformations, which is a value that decreases as the number of transformations increases. Here, the "complete matching" is an evaluation function that represents whether or not two values completely are same each other in matching of the values of the name identification items of the name identification source and the name identification target. In a case where the two values completely are same each other, 1.0 is returned, but otherwise 0 is returned. In addition, the evaluation function is not limited thereto, and there is an "N-gram" that evaluates the degree in which N characters adjacent to each other for the value of the name identification source are included in the value of the name identification target or the like.

FIG. 27 illustrates an intermediate transition and a result of a name identification process with respect to one record M1 of the name identification source and each name identification target, as a part of the name identification process defined in FIG. 26. In the customer table M of the name identification target, for example, two million records are stored. In the name identification process, each one of the records is used as a name identification target and matched with the record M1 of the name identification source. For example, in the name identification process, as an intermediate result of the matching, for each set of the record M1 of the name identification source and records M1 to M6 of the name identification target, a result of applying the evaluation function, a weighting result, and a total evaluation value are output with being associated with one another. Then, in the name identification process, after the matching, for each set of the record M1 of the name identification source and the records M1 to M6 of the name identification target, the judgment on the name identification is made, and the judgment results are output.

However, there is a problem in that it is difficult to allow all the name identification results to be clearly understood in a large-scale name identification process. In other words, in a conventional name identification process, since records of the name identification source and the name identification target are matched in a round-robin system, in order to store the matching results of all the combinations, a considerable storage capacity is used, and enormous time is required for the analysis thereof. In addition, the processing time that is required for the matching relating to the name identification process is enormous. For example, in a case where a self-name identification is designated as the name identification method, and the name identification source and the name identification target respectively have two million records, 2 million records×2 million records=combinations of four trillion sets are matched. Here, assuming that the data capacity relating to the matching result of one set is 50 bytes, the data capacity relating to the matching results of all the sets is 200 terabyte (TB), and enormous time is required for the analysis thereof. Accordingly, it is not practical to store the matching results of all the sets and analyze and visualize the stored matching results of all the sets. Consequently, it is difficult to allow the matching results of all of the sets to be clearly understood.

In addition, in order to appropriate perform the name identification process, setting that is based on the experiences and the adjustment thereof through feedback of the processing result are done, and a name identification result and a matching result need to be clearly understood for effective feedback.

SUMMARY

According to an aspect of an embodiment of the invention, an information matching apparatus includes a processor, a memory. The processor executes acquiring a matching result value representing a result of each matching between a plurality of records configured by sets of values corresponding to items, generating a frequency distribution table in which the acquired matching result value is used as a class; and outputting indices comprehensively evaluating a plurality of matching results based on the frequency distribution table generated at the generating.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating a specific example of an index information generating process of an index information generating unit according to an embodiment;

FIG. 4 is a diagram illustrating a specific example of indices according to an embodiment;

FIG. 5 is a diagram illustrating a specific example of calculation of a histogram of total evaluation values (normalized total evaluation values);

FIG. 8A is a diagram illustrating a specific example of calculation of an accuracy rate based on check points of "White";

FIG. 8B is a diagram illustrating a specific example of calculation of an accuracy rate based on check points of "Black";

FIG. 12 is a diagram illustrating an example of an output that is output by a sample record output unit;

FIG. 13 is a diagram illustrating an example of an output of the counting of judgment results by using a judgment result output unit;

FIG. 19A is a flowchart illustrating the sequence of a main process of an index information generating process according to an embodiment;

FIG. 19C is a flowchart illustrating the sequence of the index information generating process of check points;

FIG. 29 is a flowchart illustrating the sequence of a matching process.

DESCRIPTION OF EMBODIMENT

Preferred embodiments of the present invention will be explained with reference to accompanying drawings.

In the following embodiments, a case will be described in which an information matching apparatus is applied to a large-scale name identification process. However, the invention is not limited to the embodiments.

Embodiments

Configuration of Information Matching Apparatus According to Embodiment

Figure 1:
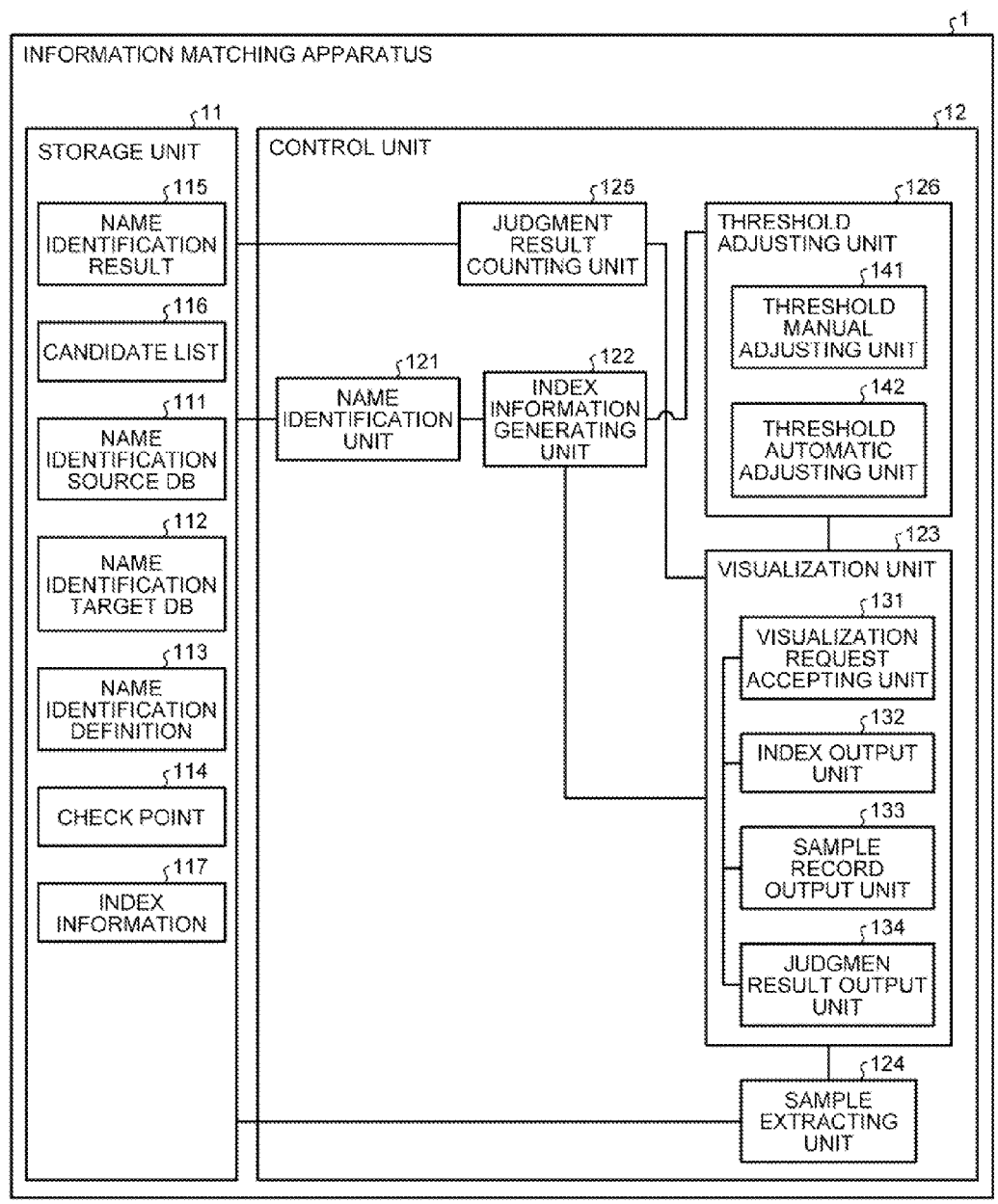
FIG. 1 is a functional block diagram illustrating the configuration of an information matching apparatus according to an embodiment.

FIG. 1 is a functional block diagram illustrating the configuration of an information matching apparatus according to an embodiment. An information matching apparatus 1 is an apparatus that matches records for a plurality of records that are configured by a set of values corresponding to items and judges the identity, the similarity, and the relevance between the records. As illustrated in FIG. 1, the information matching apparatus 1 includes a storage unit 11 and a control unit 12.

The storage unit 11 includes a name identification source database (DB) 111, a name identification target DB 112, a name identification definition 113, a check point 114, a name identification result 115, and a candidate list 116. Here, the storage unit 11 is a storage device such as a semiconductor memory device, for example, a random access memory (RAM) or a flash memory, a hard disk, or an optical disc.

The name identification source DB 111 is a database (DB) that stores a plurality of records (name identification source records) to be identified. The name identification target DB 112 is a DB that stores a plurality of records (name identification target records) as identification opponents. The items of the name identification source DB 111 and the items of the name identification target DB 112 may completely be same, may be same in part, or may not be same at all but have relevance in part. In addition, the name identification source DB 111 and the name identification target DB 112 may be DBs having the same information or may be configured as one DB. Furthermore, the name identification source DB 111 may not be necessarily a DB but be an XML file, a CSV file, or the like as long as it has a function of sequential choosing the records thereof. Similarly, the name identification target DB 112 may not be necessarily a DB but be an XML file, a CSV file, or the like as long as it has a function of sequential choosing the records thereof and a searching function with a key (ID).

In the name identification definition 113, a name identification method, a name identification source designation, a name identification target designation, a name identification item designation, and a threshold used for a name identification, are defined in association with one another. In the name identification method, a method of identifying a name such as a self-name identification or a different party name identification is designated. In the name identification source designation, access information of the name identification source DB 111 such as a database name and the items of the record of the name identification source DB 111 are designated. In the name identification target designation, access information of the name identification target DB 112 such as a database name and items of the record of the name identification target DB 112 are designated. In the name identification item designation, target items of the name identification are designated, and an evaluation function and a weighting factor applied to each name identification item are designated. In the threshold, an upper threshold used for judging "White" and a lower threshold used for judging "Black" are designated.

The name identification candidate set (not illustrated in the figure) is generated in the memory of a name identification unit 121 and stores a matching result of each, a set (pair) of a name identification source record and a name identification target record for each name identification source record. In the matching result, a total evaluation value that is calculated for each set of records is included. In the name identification result 115, for each set of a name identification source record and a name identification target record, a judgment result of judgment of "White" regarded to be same and judgment of "Black" regarded to be different is stored as the judgment result of the name identification. In the candidate list 116, for each set of a name identification source record and a name identification target record, a judgment result of judgment of "Gray" regarded to be difficult to judge is stored as the judgment result of the name identification. The check point 114 will be described later.

The control unit 12 performs visualization of the name identification result based on index information that is generated and provided by an index information generating unit 122 that receives information from a name identification engine (corresponding to the name identification unit 121) as input and adjusts the thresholds based on a comprehensive judgment of the name identification results. In addition, the control unit 12 includes: the name identification unit 121; the index information generating unit 122; a visualization unit 123; a sample extracting unit 124; a judgment result counting unit 125; and a threshold adjusting unit 126. The control unit 12 is an integrated circuit such as an application specific integrated circuit (ASIC) or a field programmable gate array (FPGA) or an electronic circuit such as a central processing unit (CPU) or a micro processing unit (MPU).

The name identification unit 121 performs a name identification process through a matching in which the name identification source DB 111 is set as a name identification source, and the name identification target DB 112 is set as a name identification target by using the name identification definition 113. For example, the name identification unit 121 matches the value of each name identification item of the name identification source record stored in the name identification source DB 111 and the value of the name identification item of the name identification target record stored in the name identification target DB 112 and calculates evaluation values by applying evaluation functions for each name identification item that are stored in the name identification definition 113. Then, the name identification unit 121 weights the calculated evaluation value for each name identification item by using a weighting factor for each name identification item, which is defined in the name identification definition 113 for each name identification item and calculates a total evaluation value by adding the acquired values. The name identification unit 121 internally stores the above-described name identification candidate set with the set of the name identification source record and the name identification target record and the total evaluation value being associated with each other. In addition, the name identification unit 121 judges a name identification for the set of records that belongs to the name identification candidate set based on the thresholds defined in the name identification definition 113. Here, it may be configured such that the judgment process based on the thresholds is performed immediately after the derivation of the total evaluation value, and the judgment result is output for each matching of one set. In such a case, the name identification candidate set including the total evaluation values does not need to be stored, and the index information generating unit 122 to be described later is configured so as to acquire the matching result (the total evaluation value and the like) and the judgment result for each set from the name identification unit 121. In the description presented below, a configuration is used as an example in which, for each name identification source record, the name identification unit 121 stores a matching result of each name identification source record and a corresponding name identification target as the name identification candidate set.

In other words, in a case where the total evaluation value of a set of records that belongs to the name identification candidate set is equal to or larger than the upper threshold, the name identification unit 121 stores a judgment of "White", which regards the set of records to match each other, in the name identification result 115 as the judgment result. On the other hand, in a case where the total evaluation value of a set of records is smaller than the lower threshold, the name identification unit 121 stores a judgment of "Black", which regards the set of records not to match each other, in the name identification result 115 as the judgment result. In addition, in a case where the total evaluation value of a set of records is smaller than the upper threshold, and is equal to or larger than the lower threshold, the name identification unit 121 stores a judgment of "Gray", which regards the set of records to be difficult to judge, in the candidate list 116 as the judgment result.

The index information generating unit 122 acquires the total evaluation value and the like that are generated for each set of records as a name identification target from the name identification unit 121, generates and stores information used for index information by using the acquired total evaluation value and the like, and provides the index information in response to a request from the visualization unit 123 or the threshold adjusting unit 126. The information generated by the index information generating unit 122 may be stored in the storage unit 11 as an index information 117. This index information is used for the visualization of a name identification result by the visualization unit 123. For example, the index information generating unit 122 acquires the total evaluation value of each set of the name identification source record and the name identification target record from the name identification candidate set of the name identification unit 121. In addition, the index information generating unit 122 acquires thresholds from the name identification unit 121 or the threshold adjusting unit 126 to be described later.

In addition, the index information generating unit 122 sets the total evaluation value of each set of records as a class, and generates a frequency distribution table acquired by setting the combination number (the number of combinations) of records included in the class as the index information. Here, the width of the class is judged based on the particle size (minimal unit) of the threshold that can be adjusted by the threshold adjusting unit 126 to be described later. For example, when the particle size of the threshold is a three digit number of "0.xxx" having three as the number of significant figures, the width of the class is 0.001, and the number of classes is 1000 in a case where the total evaluation value is in the range of 0 to 1. The default of the particle size of the threshold is set so as to be about ten times the number of classes of a histogram output by the visualization unit 123 to be described later. In addition, the index information generating unit 122 sets the number of classes of the histogram to about 100 and provides a frequency distribution table of 1000 classes, which is ten times the number of classes, thereby generating a histogram that can be finely adjusted by a particle size necessary and sufficient for the adjustment of the thresholds with a minimal amount of information. Here, the particle size of the threshold and the number of classes may be set by a user.

Furthermore, the index information generating unit 122 normalizes the total evaluation value of each set of records and the thresholds, performs a sigmoid transformation for the normalized total evaluation value, and generates a frequency distribution table in which the total evaluation value after the sigmoid transformation is set as the class. For example, the index information generating unit 122 normalizes the total evaluation value of each set of records such that the upper threshold is 1, and the lower threshold is −1. As an example, the index information generating unit 122, as illustrated in Equation (1), normalizes the total evaluation value (old evaluation value) so as to calculate a normalized total evaluation value (new evaluation value). In Equation (1), the total evaluation value is set as an old evaluation value, and the normalized total evaluation value is set as a new evaluation value. In addition, in Equation (1), the upper threshold before normalization is set as an old upper threshold, and the lower threshold before normalization is set as an old lower threshold.

New Evaluation Value=((Old Evaluation Value−((Old Upper Threshold+Old Lower Threshold)/2))×(2/(Old Upper Threshold−Old Lower Threshold))) (1)

In addition, the sigmoid transformation is a transformation for transforming the total evaluation value into a probability by normalizing the total evaluation value using a sigmoid function illustrated in Equation (2).

$$y = \frac{1}{1 + e^{-\alpha x}} \quad (2)$$

Here, x is a total evaluation value that is normalized with the upper threshold of the transformation target as 1 and the lower threshold as −1 and represents a value in the range of −∞ to +∞ that has 0 at its center. In addition, y represents a probability and represents a value in the range of 0 to 1.0 (0 to 100%) that has 0.5 (50%) as its center. Here, $\alpha$ represents a gain, and, by increasing the gain, there is an effect that a value between the upper threshold and the lower threshold with a value (near a probability 0.5) near a normalized total evaluation value 0 being the center thereof and values near the threshold are amplified (enlarged). In a case where the gain $\alpha$ is 1, the sigmoid function is called a standard sigmoid function, and, in the description below, the sigmoid function is described as the standard sigmoid function. In addition, e represents a Nepier's constant.

Figure 2:
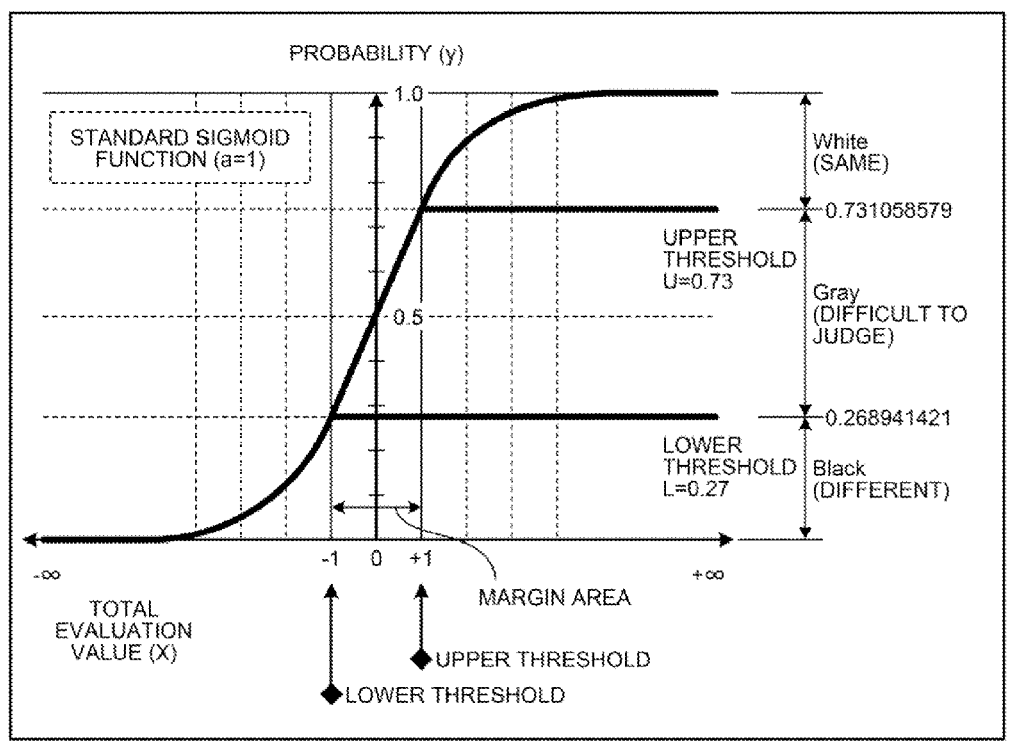
FIG. 2 is a diagram illustrating normalization and a sigmoid transformation of total evaluation values.

Here, the normalization and the sigmoid transformation of the total evaluation values will be described with reference to FIG. 2. FIG. 2 is a diagram illustrating the normalization and the sigmoid transformation of total evaluation values. As illustrated in FIG. 2, the x axis represents the normalized total evaluation value, and the y axis represents the probability as a result of the sigmoid transformation. Here, the sigmoid transformation is performed for total evaluation values normalized such that the upper threshold=1.0, and the lower threshold=−1. Accordingly, portions at which the normalized total evaluation value is near 0, that is, a portion between the lower threshold −1 and the upper threshold +1 that is judged as "Gray" regarded to be difficult to judge and portions of the thresholds are amplified (enlarged) in the range of the upper threshold U 0.73 and the lower threshold L≈0.27 so as to be transformed into a probability represented in the range of (0%) to 1.0 (100%) with 0.5 (50%) being set as its center, whereby delicate adjustment near the thresholds can be made easily.

Referring back to FIG. 1, the index information generating unit 122 acquires a total evaluation value generated by the name identification unit 121 for each check point of check points of "White" and check points of "Black" and generates a frequency distribution table in which the acquired total evaluation values are set as the class. Here, the check point represents a set of records that are known to match each other or not to match each other in advance. A set of records that are known to match ("White") each other in advance is called a check point of "White". In addition, a set of records that are known not to match ("Black") each other in advance is called a check point of "Black". The check points are set as the check points 114 of the storage unit 11 in advance.

In addition, the index information generating unit 122 stores a prejudged number of sets of records (pairs of sample record) having total evaluation values that are relatively close to a center value of each class for each class of the frequency distribution table in the storage unit 11 in association with each class. In other words, by storing the frequency distribution table calculated from the total evaluation value of each set of records and sets of sample records that are associated with each class of the frequency distribution table by using the index information generating unit 122, differently from a case where all the sets of records are stored, enormous amount of information can be prevented. For example, the index information generating unit 122, for sets of sample records, stores first N sets for each class, and sequentially interchanging the sets of sample records with sets having total evaluation values closer to the center after the storing of N sets, thereby finally storing N sets of sample records that are relatively close to the center value in the storage unit 11. In addition, in a case where ten classes are arranged so as to be visualized as one class by the visualization unit 123 by using the frequency distribution table generated by the index information generating unit 122 as N=10 sets, the number of sample records after visualization near one class is 100 sets, and ten sets of sample records of each class are equally included for every ⅒ of the width of the class.

Here, a specific example of generation of index information using the index information generating unit 122 will be described with reference to FIG. 3. FIG. 3 is a diagram illustrating a specific example of an index information generating process of the index information generating unit according to an embodiment. As illustrated in FIG. 3, the index information generating unit 122 sets a total evaluation value of each set of records of the name identification source and the name identification target that is stored in the name identification candidate set of the name identification unit 121 as a class, and generates index information (a frequency distribution table before the sigmoid transformation) H1 in which the number of sets of records corresponding to each class is set as the frequency. Then, the index information generating unit 122 stores N sets of sample records having total evaluation values that are relatively close to the center value of each class, for each class of the frequency distribution table H1. Here, for example, for a class of −9.98, N sets of sample records are stored in a file P1.

In addition, the index information generating unit 122 normalizes the total evaluation values acquired from the name identification unit 121 such that the upper threshold is 1.0 ($u_o$), and the lower threshold is −1.0 ($l_o$) (in this example, the total evaluation values are described to have already been normalized by the name identification unit 121), and performs a sigmoid transformation for each normalized value. Here, the total evaluation values after the sigmoid transformation are represented as normalized values 117A. Then, the index information generating unit 122 sets the total evaluation values after the sigmoid transformation as the classes and generates index information (a frequency distribution table for which the sigmoid transformation has been performed) H2 in which the number of sets of records corresponding to each class is the frequency. Then, the index information generating unit 122 stores N sets of sample records having the total evaluation values that are relatively close to the center value of each class, for each class of the frequency distribution table H2.

Referring back to FIG. 1, the visualization unit 123 includes a visualization request accepting unit 131, an index output unit 132, a sample record output unit 133, and a judgment result output unit 134 and outputs an index used for visualizing a plurality of matching results of name identifications. In other words, the visualization unit 123 outputs an index used for comprehensively evaluating the plurality of matching results of name identifications based on the index information (other than the frequency distribution table) generated by the index information generating unit 122. In addition, the visualization unit 123 outputs an index corresponding to the adjustment of the thresholds, outputs sample records in accordance with a user's instruction, or outputs the counting result of the judgment results.

Here, a specific example of the index will be described with reference to FIG. 4. FIG. 4 is a diagram illustrating a specific example of indices according to an embodiment. In FIG. 4, for each No. (s0), an index name s1, input data s2, a derivation sequence s3, and a use s4 are associated with one another. Here, each No. (s0) represents an item number that represents an index. The index name s1 represents the name of the index. The input data s2 represents input data at the time of deriving the index. In addition, the derivation sequence s3 represents the sequence at the time of deriving the index. The use s4 represents the use in a case where the index is output.

For example, in a case where No. (s0) is "1", the index name s1 is "histogram of total evaluation values". In the derivation sequence s3 of this case, the input data s2 is set as total evaluation values of all the sets of records of the name identification source and the name identification target, the frequency distribution table is calculated with the total evaluation values of the all the sets of records set as the classes, and the number of sets of records included in the range of each class set as the frequency, and a histogram is displayed. As the use s4, the distributions of total evaluation values for all the sets of records as targets can be understood and evaluated. In addition, the counting of the frequencies of total evaluation values is performed by the index information generating unit 122.

In addition, in a case where No. (s0) is "2", the index name s1 is a "threshold". In the derivation sequence s3 of this case, the input data s2 is set as a threshold, and the threshold is displayed as a straight line in the coordinates of each index. As the use s4, the position of the threshold in each index can be checked.

Furthermore, in a case where No. (s0) is "3", the index name s1 is "the number and the ratio of judgment results ("White", "Gray", and "Black")". In the derivation sequence s3 of this case, the input data s2 is set as the frequency distribution table generated in accordance with the index No. 1 and a threshold as a prediction target. Then, in the derivation sequence s3, counting is performed for each class of the frequency distribution table generated in accordance with the index No. 1 based on the given threshold, a total number of frequencies of each judgment result of a judgment of "White", a judgment of "Gray", or a judgment of "Black" is calculated, and the ratio out of the total number is calculated. As the use s4, the judgment result based on the threshold can be predicted.

In addition, in a case where No. (s0) is "4", the index name s1 is a "histogram of total evaluation values of check points". In the derivation sequence s3 of this case, the input data s2 is set as total evaluation values of check points of "White" and total evaluation values of check points of "Black". Then, in the derivation sequence s3, the total evaluation value of each check point of "White" and each check point of "Black" is set as classes, a frequency distribution table in which the number of sets of check points included in each class is set as the frequency is generated, and a histogram of the total evaluation values for the check points of "White" and "Black" is displayed. As the use s4, the distribution of the total evaluation values of the check points of "White" and "Black" can be evaluated.

Furthermore, in a case where No. (s0) is "5", the index name s1 is an "accuracy rates of a judgment of "White" and a judgment of "Black" based on check points". In the derivation sequence s3 of this case, the input data s2 is set as total evaluation values of check points of "White" and total evaluation values of check points of "Black". Then, in the derivation sequence s3, regarding the accuracy rate of the judgment of "White", for the frequency distribution table of total evaluation values corresponding to the check points of "White" that are derived in No. 4, for judgment results of "White" in a case where the class is set as a temporary upper threshold, the accuracy rate of the judgment of "White" is derived as "the number of judgments of "White"/the number of check points of "White"". In addition, regarding the accuracy rate of the judgment of "Black", for the frequency distribution table of total evaluation values corresponding to the check points of "Black" that are derived in No. 4, for judgment results of "Black" in a case where the class is set as a temporary lower threshold, the accuracy rate of the judgment of "Black" is derived as "the number of judgments of "Black"/the number of check points of "Black"". Then, the accuracy rates are plotted on the histogram of No. 4. As the use s4, since the accuracy rate of the judgment of "White" and the accuracy rate of the judgment of "Black" can be checked for the thresholds in the entire area, optimal thresholds at the time point of the accuracy rate can be derived.

Furthermore, in a case where No. (s0) is "6", the index name s1 is "normalization and a sigmoid transformation of total evaluation values". In the derivation sequence s3 of this case, the input data s2 is set as the total evaluation values and the thresholds used in No. 1 to No. 5 and No. 7, the thresholds and the total evaluation values are normalized, a sigmoid function is applied to the normalized values, and the results (the histogram and the thresholds) of the transformation are displayed. As the use s4, by amplifying (enlarging) a portion between the thresholds and portions near the thresholds, portions near the thresholds can be evaluated in detail. In addition, the normalization and the sigmoid transformation of total evaluation values are performed by the index information generating unit 122. This index is applied to the cases where the indices are Nos. (s0) "1" to "5" and "7" which will be described later.

In addition, in a case where No. (s0) is "7", the index name s1 is "sets of sample records". In the derivation sequence s3 of this case, a total evaluation value that is a point to be derived is set as the input data s2. Then, in the derivation sequence s3, a set of sample records that has the same total evaluation value as that of the total evaluation value instructed from a user is selected from sets of sample records acquired for each class in advance, and information of the selected records is extracted from the name identification source DB 111 and the name identification target DB 112 and is displayed. As the use s4, a set of records near the total evaluation value instructed from the user can be checked.

In addition, in a case where No. (s0) is "8", the index name s1 is "counting of judgment results". In the derivation sequence s3 of this case, the input data s2 is set as the name identification result 115 and the candidate list 116. Then, in the deriving sequence s3, the identification results and the candidate list that stores the judgment results of the set of records are counted and displayed. As the use s4, the judgment results of the judgment of "White", the judgment of "Black", and the judgment of "Gray" are counted, and the trend of the judgment results can be checked for each set of records. In addition, the derivation sequence s3 of each index will be described in the index output unit 132, the sample record output unit 133, and the judgment result output unit 134.

Referring back to FIG. 1, the visualization request accepting unit 131 accepts various visualization requests from the keyboard and distributes the process based on the accepted visualization request. For example, in a case where a visualization request for the indices No. (s0) "1" to "6" is accepted, the visualization request accepting unit 131 notifies the index output unit 132 of the accepted visualization request for the indices. In addition, in a case where the visualization request for the index of No. (s0) "7" is accepted, the visualization request accepting unit 131 notifies the sample record output unit 133 of the accepted visualization request for the index "7". In this visualization request, a total evaluation value instructed from the user is included. Furthermore, in a case where the visualization request for the index of No. (s0) "8" is accepted, the visualization request accepting unit 131 notifies the judgment result output unit 134 of the accepted visualization request for the index "8". In addition, in a case where the visualization request for the adjustment of the thresholds is accepted, the visualization request accepting unit 131 notifies the threshold adjusting unit 126 of the accepted visualization request for the adjustment of the thresholds. Here, the visualization request accepting unit 131 may accept a visualization request for one index or a visualization request for a plurality of indices.

The index output unit 132 outputs an index that is used for comprehensively evaluating the matching results of a combination of a plurality of name identifications based on the index information (frequency distribution table) generated by the index information generating unit 122. For example, in a case where a visualization request for an index is acquired by the visualization request accepting unit 131, the index output unit 132 outputs an index according to the acquired visualization request. In addition, in a case where a visualization request for a plurality of indices is acquired by the visualization request accepting unit 131, the index output unit 132 sequentially process the plurality of indices and outputs the processed results in a combined manner.

In a case where the index is the "histogram of total evaluation values" of No. (s0) "1", the index output unit 132 requests the frequency distribution table of total evaluation values from the index information generating unit 122. Then, the index output unit 132 outputs a histogram in which the horizontal axis is the class as the total evaluation value, and the vertical axis is the frequency of the class based on the frequency distribution table that is generated by the index information generating unit 122.

In addition, the index output unit 132 requests the frequency distribution table of total evaluation values, for which the normalization and the sigmoid transformation have been performed, from the index information generating unit 122. Then, the index output unit 132 outputs a histogram in which the horizontal axis is the class as the normalized total evaluation value, and the vertical axis is the frequency of the class based on the frequency distribution table of total evaluation values, for which the normalization and the sigmoid transformation have been performed, provided by the index information generating unit 122. In addition, in a case where the index is "normalization and a sigmoid transformation of total evaluation values" of No. (s0) "6", the index output unit 132 calculates a histogram by replacing the frequency distribution table after the sigmoid transformation with the frequency distribution table of total evaluation values before the sigmoid transformation (original) provided by the index information generating unit 122 and outputs the calculated histogram.

Here, the calculation of a histogram based on the frequency distribution table of total evaluation values for which the normalization and the sigmoid transformation of index No. "1" have been performed will be described with reference to FIG. 5. FIG. 5 is a diagram illustrating a specific example of calculation of a histogram of total evaluation values (normalized total evaluation values). As illustrated in FIG. 5, the index output unit 132 generates a counting table H2B for a histogram as output information by using the index information (frequency distribution table) H2A of total evaluation values for which the sigmoid transformation has been performed as input information. First, when a minimal value and a maximum value of the horizontal axis, the width of the class, and the magnification ratio of the class are judged as the specifications of the histogram, the index output unit 132 detects a difference between the specifications of the frequency distribution table H2A and the specifications of the histogram and converts the frequency distribution table H2A into the counting table H2B to correct the detected difference. Here, when the magnification ratio of the class=1, the minimum value=0, the maximum value=1.0, the width of the class=0.001, and the number of classes is 1000 as the specifications of the frequency distribution table H2A, the specifications of the histogram are judged such that the magnification ratio of the class=100 times, the minimum value=0, the maximum value=100, and the width of the class=1. Then, the number of classes of the histogram can be derived as (maximum value−minimum value)/width of class=(100−0)/1=100. Accordingly, as the differences between the specifications of the frequency distribution table H2A and the specifications of the histogram, the magnification ratio of the class=100 times, the minimum value is the same (0 acquired by 100 times the minimal value), the maximum value is the same (100 acquired by 100 times the maximum value), the width of the class is 10 times (0.1 acquired by 100 times the width of the class), and the number of classes=0.1 times. Then, the index output unit 132 increases the magnification ratio of the class of the frequency distribution table H2A to 100 times thereof, and the width of each class is adjusted to 10 times thereof for the classes (0 to 100) in the entire area.

In other words, in order to count 10 classes of the frequency distribution table H2A into one class of the counting table H2B, the index output unit 132 calculates the frequency of one class of the counting table H2B for a histogram by adding a number corresponding to the classes thereto. In addition, the index output unit 132 counts sets of sample records of 10 classes of the frequency distribution table H2A and associates the sets of sample records with one class of the counting table H2B for a histogram. For example, in order to count classes 0.001 to 0.010 of the frequency distribution table H2A into one class (1) of the counting table H2B, the frequency $h_1$ of the counting table H2B for a histogram is calculated by adding a number corresponding to the classes thereto and is associated with a set $h_2$ of sample records.

In a case where the index is the "threshold" of No. (s0) "2", when the thresholds are acquired from the index information generating unit 122, the index output unit 132 outputs the acquired thresholds together with the histogram. At this time, it is preferable that the index output unit 132 round the acquired threshold to be a number in figures less than those of the minimal unit of accuracy for adjusting the threshold by one. Then, the rounded threshold is corrected in correspondence with the magnification rate of the class, is composed with the histogram, and is displayed. In the example illustrated in FIG. 5, since the upper threshold=0.731058579, and the adjusted figure length of the threshold=0.001, in order to form the threshold as a number with four decimal places, the fifth decimal point is rounded off to be 0.7311. Furthermore, 100 times, which is the magnification rate, of the upper threshold is made, so that the upper threshold on the histogram is 73.11. In addition, similarly, the lower threshold is 26.89. Furthermore, the index output unit 132 may acquire thresholds that are actually used in the name identification unit 121, may acquire thresholds defined in the name identification definition 113 of the storage unit 11, may acquire adjusted thresholds from the threshold adjusting unit 126, or may acquire logical thresholds that are derived as a learning result in a case where supervised learning is applied to the name identification process.

In a case where the index is the "the number and the ratio of judgment results ("White", "Gray", and "Black")" of No. (s0) "3", the index output unit 132 sets class sections at the thresholds for the frequency distribution table acquired from the index information generating unit 122 and counts the frequencies for each section. Then, the index output unit 132 outputs a sum of counted frequencies for each section and the ratio of the sum of frequencies to a total number of the sums of frequencies. Regarding the sections, a section that is equal to or larger than a minimal class, and is smaller than the lower threshold is set as a section of the judgment of "Black" that is regard not to match, a section that is equal to or larger than the lower threshold, and is smaller than the upper threshold is set as a section of the judgment of "Gray" that is judged to be difficult to judge, and a section that is equal to or larger than the upper threshold, and is equal to or smaller than a maximal class is set as a section of the judgment of "White" regarded to match.

In other words, the index output unit 132 outputs the number of judgment results corresponding to the sum of frequencies for each section and the ratio of the number of judgment results to a total number. In addition, in a case where the index is "normalization and a sigmoid transformation of total evaluation values" of No. (s0) "6", the index output unit 132 acquires the frequency distribution table after the sigmoid transformation from the index information generating unit 122 and calculates and outputs the number and the ratio and the ratio of judgment results. As the thresholds used at this time, thresholds for which the sigmoid transformation has been performed are used. In addition, in a case where the index after the sigmoid transformation is not designated, the index output unit 132 acquires the frequency distribution table before the sigmoid transformation from the index information generating unit 122 and calculates and outputs the number and the ratio of judgment results.

Figure 6:
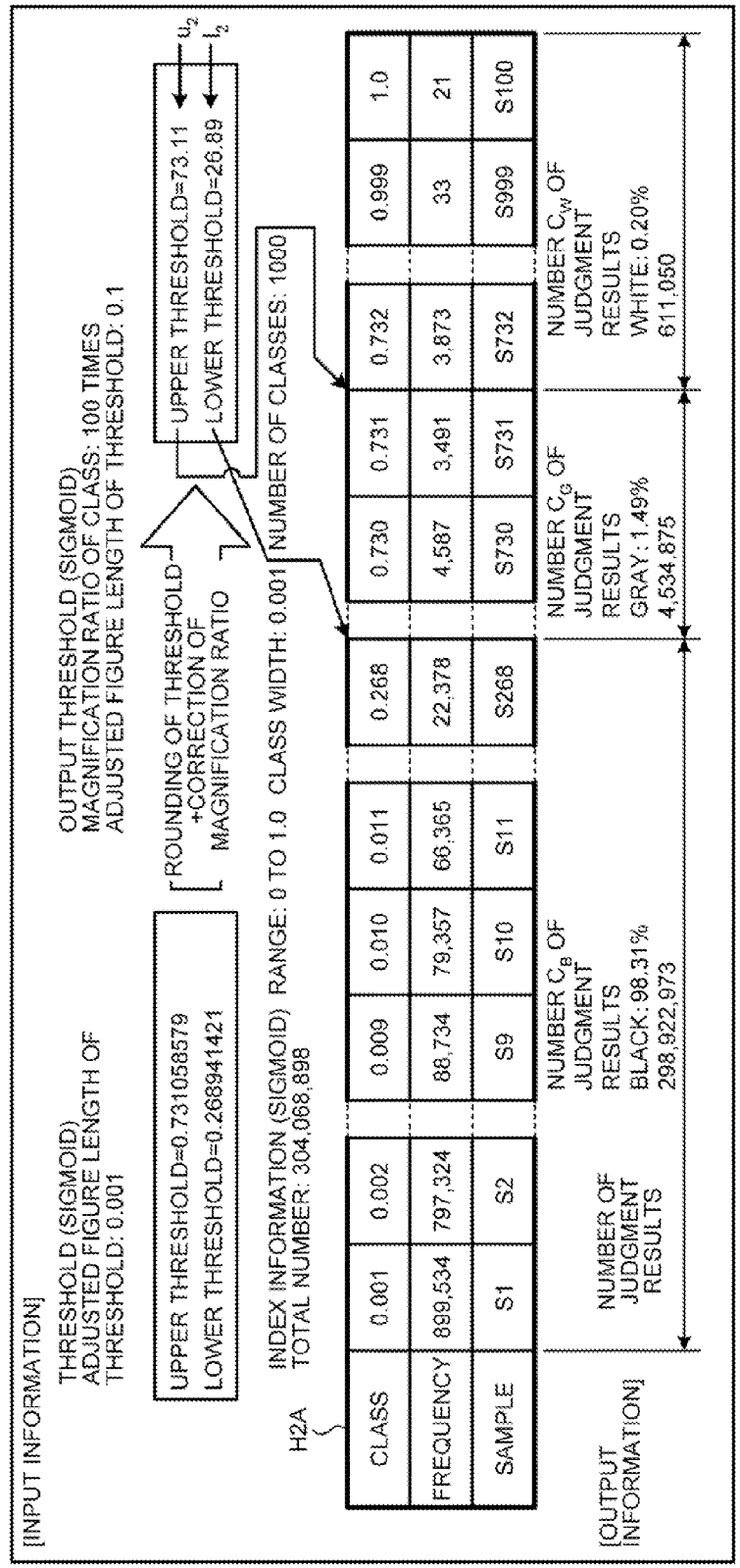
FIG. 6 is a diagram illustrating a specific example of the calculation of the number, and the ratio of judgment results.

Here, the calculation of the number and the ratio of judgment results in a case where the sigmoid transformation is designated as the index "6" will be described with reference to FIG. 6. FIG. 6 is a diagram illustrating a specific example of the calculation of the number and the ratio of judgment results. In FIG. 6, the same input information as that illustrated in FIG. 5 is used. As illustrated in FIG. 6, since an upper threshold $u_2$ is 73.11 (0.7311), and a lower threshold $l_2$ is 26.89 (0.2689), the index output unit 132 sets the section of the judgment of "Black" as a section ranging from a minimum class 0.001 to a class 0.268 corresponding to the lower threshold. In addition, the index output unit 132 sets the section of the judgment of "Gray" to a section from a class 0.269 corresponding to the lower threshold to a class 0.731 corresponding to the upper threshold. Furthermore, the index output unit 132 sets the section of the judgment of "White" to a section from a class 0.732 corresponding to the upper threshold to a class 1.0 corresponding to a maximum class 1.0.

Then, the index output unit 132 acquires the number of judgment results for each section by summing up the frequencies for each section. Here, the index output unit 132 sums up the frequencies for the section of the judgment of "Black" and sets as many as 298,922,973 sets (pairs) resulting from the summation, as the number $C_B$ of judgment results of the judgment of "Black". In addition, the index output unit 132 sums up the frequencies for the section of the judgment of "Gray" and sets as many as 4,534,875 sets resulting from the summation, as the number $C_G$ of judgment results of the judgment of "Gray". Furthermore, the index output unit 132 sums up the frequencies for the section of the judgment of "White" and sets as many as 611,050 sets resulting from the summation, as the number $C_W$ of judgment results of the judgment of "White". In addition, since a total number of sets is 304,068,898, the index output unit 132 calculates the ratio of the section of the judgment of "Gray" by [the number $C_G$ of judgment results of the judgment of "Gray"/total number] and acquires 1.49% as a calculation result. The number and the ratio of judgment results for each section that are derived based on this index and are displayed are approximately calculated values, and the number and the ratio of judgment results for each section in a case where the thresholds are changed are estimated without performing the name identification process again. In other words, for the classes of the frequency distribution table corresponding to the section, in order to derive the number of judgment results by summing frequencies for the section, the number and the ratio are approximately calculated values for the class that is the threshold, more precisely, there are cases where the threshold is be positioned in the middle of one class, and the one class needs to be divided. In more detail, in FIG. 6, although the frequency of the class 0.732, which is a section for a judgment "White", is the number of sets of which total thresholds exceed 0.731 and are up to 0.732, the actual upper threshold is 0.731058579, accordingly, a precise threshold is positioned in the middle of the class 0.732, and a part of the frequency for the class includes sets judged to be the judgment of "Gray", whereby there is a possibility that an error corresponding to the frequency of the class may occur at most. However, by configuring the width of the class to be in correspondence with the number of digits of the threshold that can be adjusted, accuracy sufficient for the purpose of predicting the result of the adjustment of the threshold is acquired, and accordingly, the number and the ratio of judgment results are effective in practical use.

Figure 7:
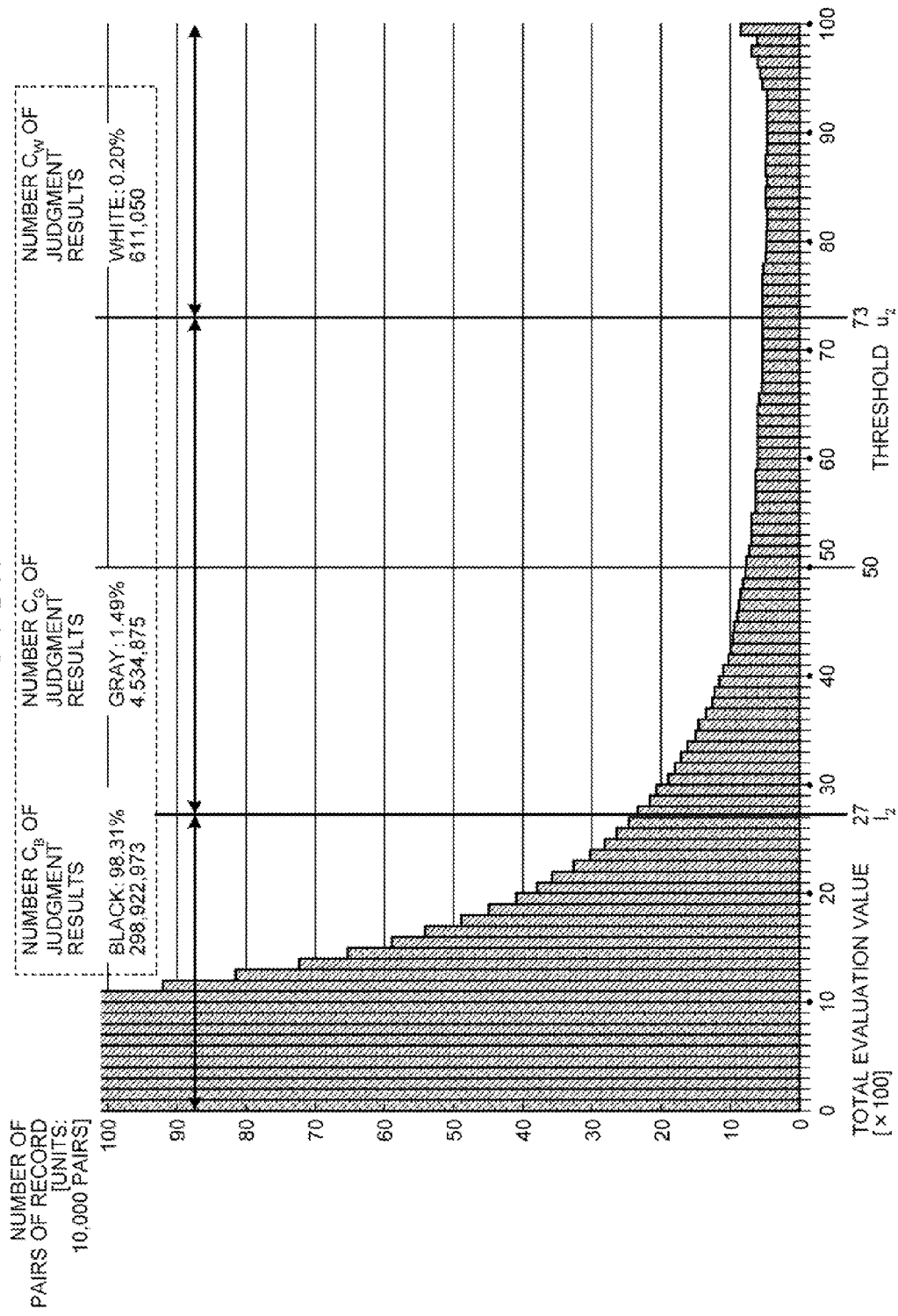
FIG. 7 is a diagram illustrating an example of an output in a case where indices No. 1 to No. 3 are combined by an index output unit.

Here, a specific example in a case where the index output unit 132 outputs a plurality of indices, No. "1" to No. "3", in a combined manner will be described with reference to FIG. 7. FIG. 7 is a diagram illustrating an example of an output in a case where indices No. 1 to No. 3 are combined by the index output unit. As illustrated in FIG. 7, the index output unit 132 outputs the "histogram of total evaluation values" as the index of No. "1", the "thresholds" as the index of No. "2", and "the number and the ratio of judgment results" as the index of No. "3" in a combined manner. In addition, in FIG. 7 index values for which the sigmoid transformation has been performed are used, and this case corresponds to an example in which "normalization and a sigmoid transformation" as the index of No. "6" is combined as well.

Here, as the "histogram of total evaluation values", a histogram $H_G$ of total evaluation values normalized through a sigmoid transformation is illustrated. As the specifications of this histogram, the magnification ratio of the class=100 times, a minimum value=0, a maximum value=100, the width of the class=1, the number of classes is 100, and the frequency displays a range of 0 to 100 (units of 10,000 records). In addition, as the "thresholds", a lower threshold $l_2$, an upper threshold $u_2$, and a center of the thresholds are illustrated.

Furthermore, as "the number and the ratio of judgment results", the number $C_B$ of judgment results of the judgment of "Black", the number $C_G$ of judgment results of the judgment of "Gray", and the number $C_W$ of judgment results of the judgment of "White", and the ratios of the numbers of judgment results to a total number are illustrated.

Referring to FIG. 1, in a case where the index is the No. (s0) "4" that means "histogram of total evaluation values of check points", the index output unit 132 outputs a histogram based on the frequency distribution table of check points that is provided by the index information generating unit 122. For example, the index output unit 132 sets the horizontal axis as the total evaluation value of each class, sets the vertical axis as the frequency of check points for each class, sets the center of the vertical axis as 0 records, outputs a histogram of "White" on the upper side of the center, and outputs a histogram of "Black" on the lower side of the center. In addition, by outputting the histograms combined with thresholds by using the index output unit 132, the frequency distribution of check points divided by the thresholds in the total evaluation values of an area judged as the judgment of "White", the total evaluation values of an area judged as the judgment of "Gray", and the total evaluation values of an area judged as the judgment of "Black" can be output so as to be easily understood. Here, although a case is described in which the histogram of "White" and the histogram of "Black" are vertically divided so as to form one graph, each histogram may be separately displayed. In addition, in a case where the index is No. (s0) "6" that means the "normalization and sigmoid transformation of total evaluation values", the index output unit 132 outputs the histogram based on the frequency distribution table of check points after the sigmoid transformation that is provided by the index information generating unit 122.

In a case where the index is the "accuracy rates of a judgment of "White" and a judgment of "Black" based on check points" of No. (s0) "5", the index output unit 132 calculates the accuracy rate of the check points of "White" for a case in which each class is the upper threshold for each class based on the frequency distribution table of the check points of "White" that is provided by the index information generating unit 122. Then, the index output unit 132 outputs the calculated accuracy rate of the judgment of "White" as an index. In addition, the index output unit 132 calculates the accuracy rate of the check points of "Black" for a case in which each class is the lower threshold for each class based on the frequency distribution table of the check points of "Black" that is provided by the index information generating unit 122. Then, the index output unit 132 outputs the calculated accuracy rate of the judgment of "Black" as an index. Such accuracy rates are output as accuracy rates in which the horizontal axis represents the class as the total evaluation value, and the vertical axis represents the percentage (0% to 100%).

Here, the calculation of the accuracy rate of the judgment of "White" based on the check points of the index "5" in a case where "normalization and a sigmoid transformation of total evaluation values" of the index "6" is designated will be described with reference to FIG. 8A.

FIG. 8A is a diagram illustrating a specific example of the calculation of an accuracy rate based on check points of "White". As illustrated in FIG. 8A, the index output unit 132 generates a counting table H3B for a histogram as output information based on the frequency distribution table H3A of check points of "White", which is the index information (the frequency distribution table) of total evaluation values for which the sigmoid transformation has been performed, as input information. In addition, the calculation of the counting table H3B for a histogram based on the index information (the frequency distribution table) is the same as that described in the calculation of the histogram of total evaluation values illustrated in FIG. 5 except an accumulation level c1 and an accuracy rate c2 were added as the indices, and thus, the description thereof will not be repeated.

First, the index output unit 132 adds the items (lines) of the accumulation level c1 and the accuracy rate c2 to the frequency distribution table input as the index information. Next, the index output unit 132, for a class of a highest position (the side of "White"), the frequency of the class is set as the accumulation thereof, and, for the other classes, the index output unit 132 calculates the accumulation level c1 for each class by accumulating the frequencies from a one-level-higher class from the order of a higher class (the frequency of the class is added to the value of the accumulation of a one-level-higher class). In addition, the index output unit 132 calculates the accuracy rate c2 of the judgment of "White" for each class by dividing the accumulation c1 by a total number. Here, when the total number of the check points of "White" is 870 sets, in a case where the class is 1.0, the accumulation level c1 is 1, and the accuracy rate c2 is 0.11(%) that is a result of dividing 1 by 870 sets expressed in percentage. In addition, in a case where the class is 0.999, the accumulation level c1 is 8 acquired by adding its frequency of 7 to the accumulation of 1 for the one-level-higher class, and the accuracy rate c2 is 0.91(%) that is a result of dividing 8 by 870 expressed in percentage.

Then, the two items (the accumulation c1 and the accuracy rate c2) added to the frequency distribution table H3A of check points of "White" correspond to the lowest class out of the classes corresponding to the same items (the accumulation and the accuracy rate) of the counting table H3B for a histogram, the values of the frequency distribution table H3A are set as the values of the same items of the counting table H3B. Here, the classes of the frequency distribution table H3A that correspond to the class 1 of the counting table H3B are 0.001 to 0.0010, and accordingly, the accumulation level and the accuracy rate of the class 0.001 of the frequency distribution table H3A that is the lowest class among them are set as the accumulation and the accuracy of the class 1 of the counting table H3B.

Here, the calculation of the accuracy rate of the judgment of "Black" based on the check points of the index "5" in a case where "normalization and a sigmoid transformation of total evaluation values" of the index "6" is designated will be described with reference to FIG. 8B. FIG. 8B is a diagram illustrating a specific example of the calculation of an accuracy rate based on check points of "Black". As illustrated in FIG. 8B, the index output unit 132 generates a counting table H4B for a histogram as output information based on the frequency distribution table H4A of check points of "Black", which is the index information (the frequency distribution table) of total evaluation values for which the sigmoid transformation has been performed, as input information. In addition, the calculation of the counting table H4B for a histogram based on the index information (the frequency distribution table) is the same as that described in the calculation of the histogram of total evaluation values illustrated in FIG. 5 except for an accumulation level c3 and an accuracy rate c4 added as the indices, and thus, the description thereof will not be repeated.

First, the index output unit 132 adds the items (lines) of the accumulation level c3 and the accuracy rate c4 to the frequency distribution table input as the index information. Next, the index output unit 132, for a class of a highest position, sets the value of the accumulation as a value acquired by subtracting the frequency of the class from the total number, and, for the other classes, the index output unit 132 calculates the accumulation level c3 for each class by subtracting the frequency of the class from the value of the accumulation of a one-level-higher class in the order of a higher class. In addition, the index output unit 132 calculates the accuracy rate c4 of the judgment of "Black" for each class by dividing the accumulation level c3 by a total number. Here, when the total number of the check points of "Black" is 1340 sets, in a case where the class is 1.0, the accumulation level c3 is calculated as 1340 by calculating "total number 1340− frequency 0", and the accuracy rate c4 is 100(%) that is a result of dividing the accumulation 1340 by the total number 1340 that is expressed in percentage. In addition, in a case where the class is 0.999, the accumulation level c3 is 1340 acquired by subtracting its frequency 0 from the accumulation 1340 of the one-level-higher class (1.0), and the accuracy rate c4 is 100(%) that is a result of dividing 1340 by the total number 1340 expressed in percentage. Furthermore, in a case where the class is 0.731, the accumulation level c3 is 1285 acquired by subtracting its frequency 1 from the accumulation 1286 of the one-level-higher class (0.732), and the accuracy rate c4 is 95.90(%) that is a result of dividing 1285 by the total number 1340 expressed in percentage.

Then, when the two items (the accumulation c3 and the accuracy rate c4) added to the frequency distribution table H4A of check points of "Black" correspond to the lowest class out of the classes corresponding to the same items (the accumulation and the accuracy rate) of the counting table H4B for a histogram, the values of the frequency distribution table H4A are set as the values of the same items of the counting table H4B. Here, the classes of the frequency distribution table H4A that correspond to the class 1 of the counting table H4B are 0.001 to 0.0010, and accordingly, the accumulation and the accuracy rate of the class 0.001 of the frequency distribution table H4A that is the lowest class among them are set as the accumulation and the accuracy of the class 1 of the counting table H4B. In addition, in FIGS. 8A and 8B, although the items of the accumulation level and the accuracy rate are added to the frequency distribution tables (H3A and H4A) of check points, the items may be configured so as to be added to the counting tables (H3B and H4B) for histograms. The accumulation and the accuracy rate of such a case can be derived by using the above-described method.

Figure 9:
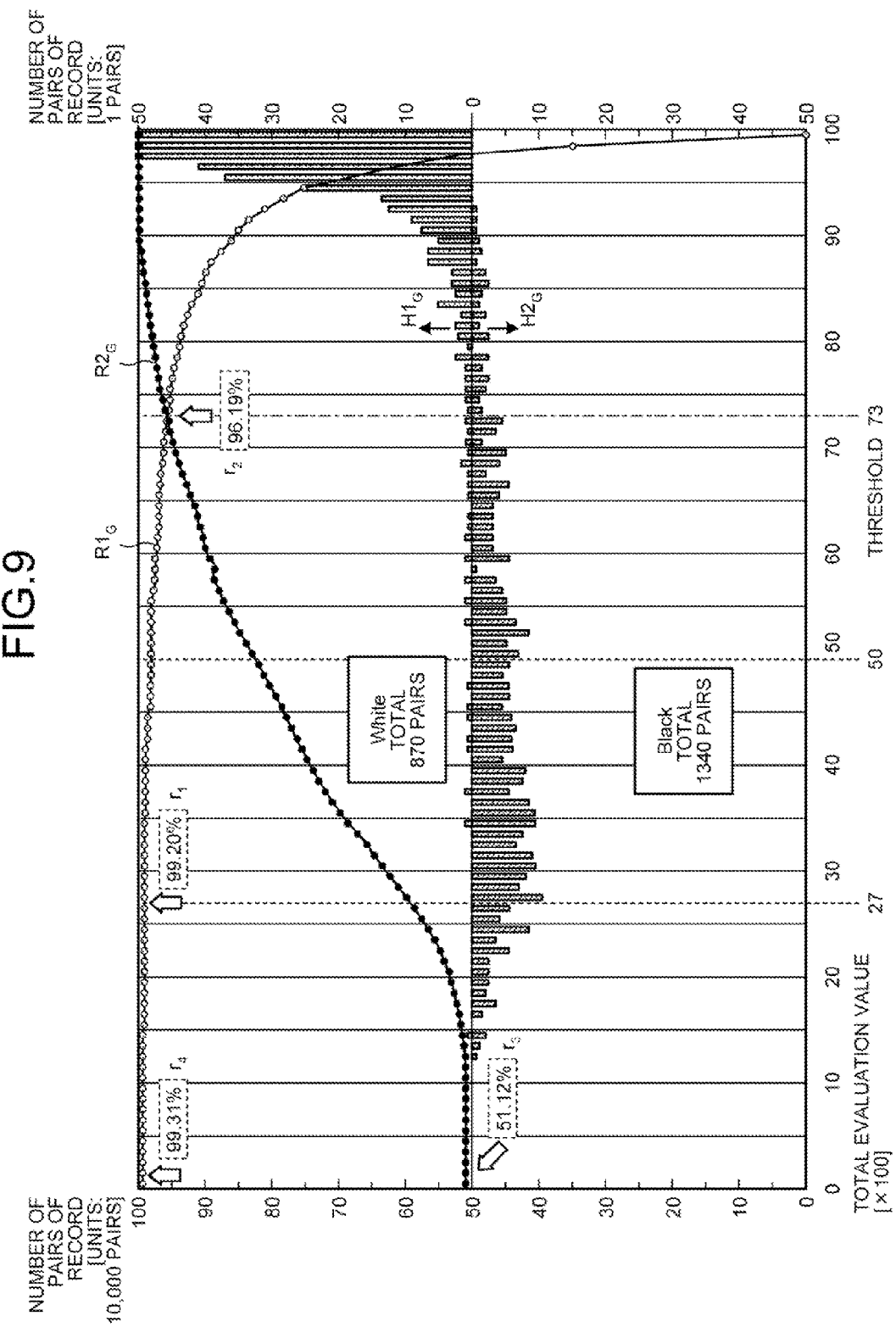
FIG. 9 is a diagram illustrating an example of an output in a case where indices No. 4 to No. 5 are combined by an index output unit.

In addition, a specific example in a case where the index output unit 132 outputs a plurality of indices No. "4" and No. "5" in a combined manner will be described with reference to FIG. 9. FIG. 9 is a diagram illustrating an example of an output in a case where indices No. 4 and No. 5 are combined by the index output unit. This case illustrates an example in which the sigmoid transformation of the index No. "6" is designated as well. As illustrated in FIG. 9, the index output unit 132 outputs the "histogram of total evaluation values of check points" as the index No. "4" and the "accuracy rates of a judgment of "White" and a judgment of "Black" based on check points" as the index of No. "5" in a combined manner. Here, $H1_G$ is illustrated as a histogram of total evaluation values of check points of "White", and $H2_G$ is illustrated as a histogram of total evaluation values of check points of "Black". In addition, $R1_G$ is illustrated as the accuracy rate of the judgment of "White", and $R2_G$ is illustrated as the accuracy rate of the judgment of "Black".

Here, the analysis of the accuracy rate will be described. For example, in a case where the lower threshold is set to 27, the accuracy rate $r_1$ of the judgment of "White" is 99.20%. This accuracy rate 99.20% of the judgment of "White" represents that, in a case where the lower threshold is set to 27, 0.8% of check points of "White" that are be judged to be same is erroneously judged to be different ("Black"). In addition, in a case where the threshold is set to 73, the accuracy rate $r_2$ of the judgment of "Black" is 96.19%. This accuracy rate of the judgment of "Black" as 96.19% represents that, in a case where the upper threshold is set to 73, 3.81% of check points of "Black" that are to be judged to be different is erroneously judged to be same ("White"). Furthermore, the accuracy rate $r_3$ of the judgment of "Black" at the lowest class represents 51.12%. This accuracy rate of the judgment of "Black" as 51.12% is the accuracy rate of the judgment of "Black" when the lower threshold is set to 0, in other words, when all the matching results are judged to be same ("White") or be difficult to judge ("Gray"). In addition, this accuracy rate r4 of the judgment of "White" for the lowest class represents 99.31%. This accuracy rate, 99.31%, of the judgment of "White" is the accuracy rate of the judgment of "White" when the upper threshold is set to 0, in other words, when all the matching results are judged to be same ("White").

Such accuracy rates ($r_3$ and $r_4$) represent the capability of an exclusion process and the correctness thereof in a case where a process of excluding sets judged to be unnecessary from combinations of matching targets in advance before a matching process. In other words, the accuracy rate $r_3$ represents the capability of the exclusion process in a sense that 51.12% of sets to be judged to be different ("Black") can be excluded in the exclusion process performed in advance. In addition, the accuracy rate r4 represents a value used for evaluating the correctness of the exclusion process in a sense that 0.79% of sets to be originally judged to be same ("White") in the matching are erroneously excluded.

Referring back to FIG. 1, in a case where the index is the "normalization and a sigmoid transformation of total evaluation values" of the index No. (s0) of "6", the index output unit 132 applies the frequency distribution table and the thresholds after the sigmoid transformation that is provided by the index information generating unit 122. In contrast, in a case where the index No. (s0) "6" is not designated, the index output unit 132 applies the frequency distribution table and the thresholds, for which the sigmoid transformation has not been performed, provided by the index information generating unit 122. In addition, the application of No. "6" is assumed to be No. "1" to No. "5" and No. "7".

Figure 10:
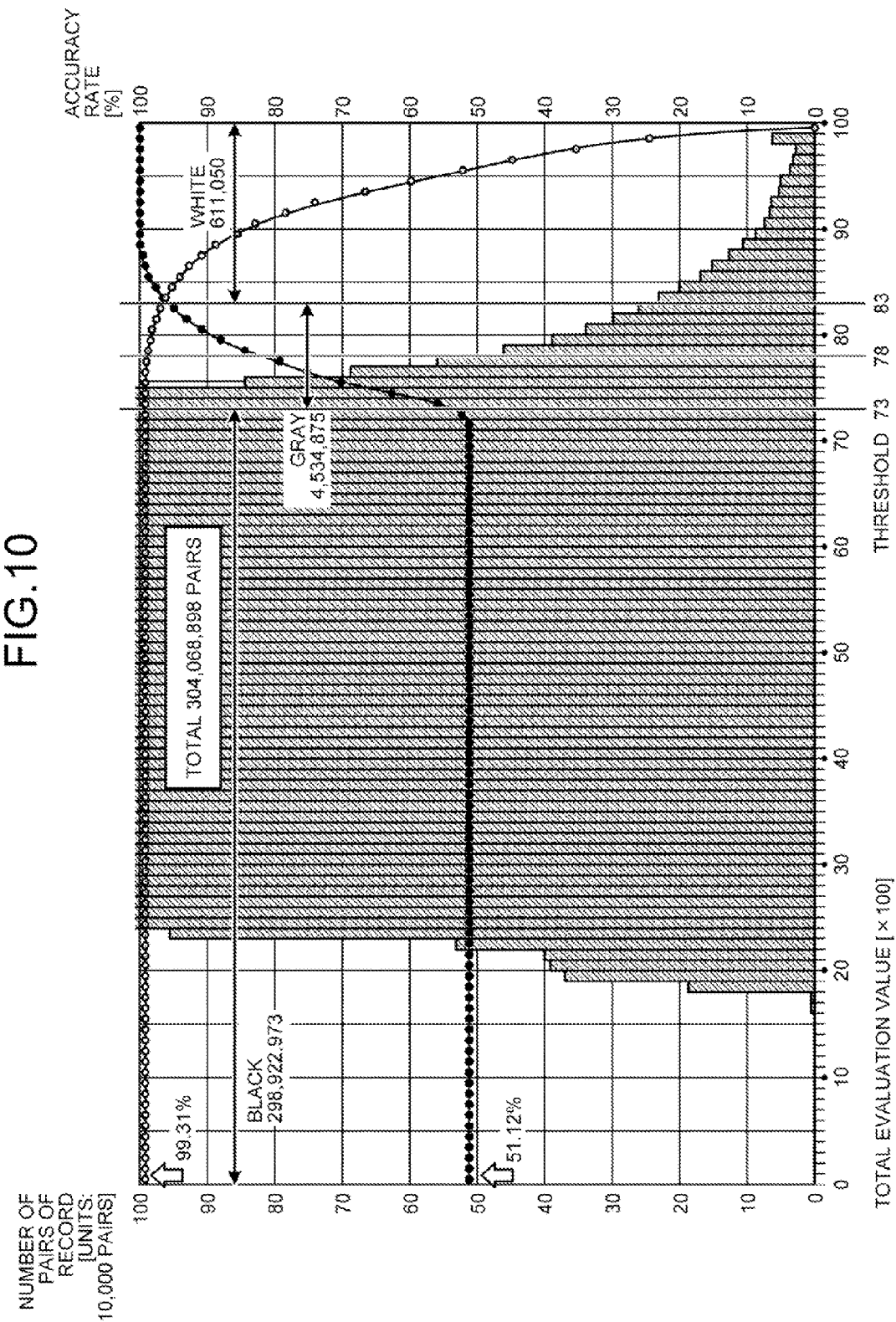
FIG. 10 is a diagram illustrating an example of an output in a case where indices No. 1 to No. 3 and No. 5 are combined before an index No. 6 is applied.
Figure 11:
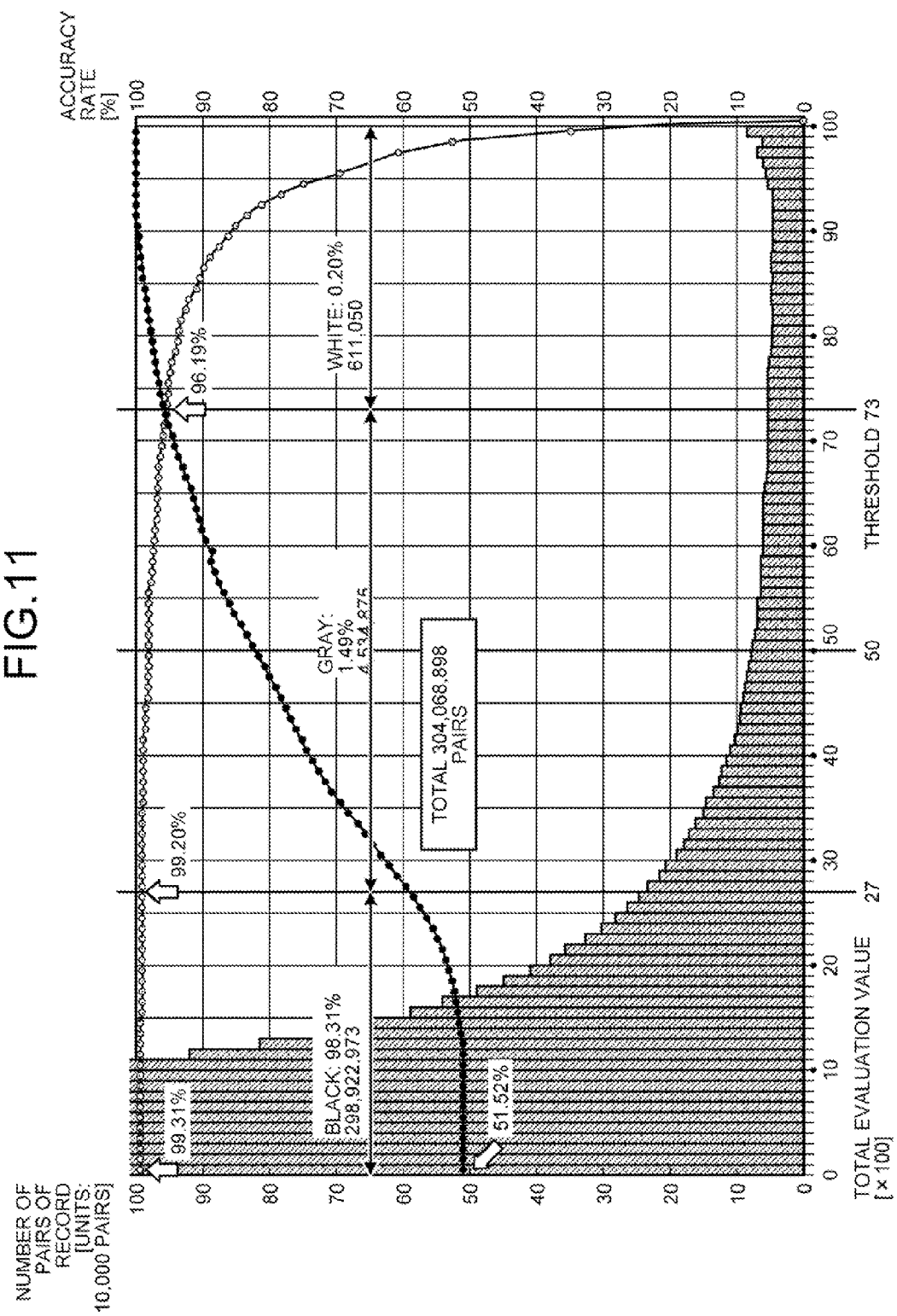
FIG. 11 is a diagram illustrating an example of an output in a case where indices No. 1 to No. 3 and No. 5 are combined after the index No. 6 is applied.

Here, an example of an output obtained in a case where indices No. "1" to No. "3" and No. "5" are combined before or after the application of No. "6" will be described with reference to FIGS. 10 and 11. FIG. 10 is a diagram illustrating an example of an output in a case where indices No. 1 to No. 3 and No. 5 are combined before the index No. 6 is applied. FIG. 11 is a diagram illustrating an example of an output in a case where indices No. 1 to No. 3 and No. 5 are combined after the index No. 6 is applied.

As illustrated in FIG. 10, before the normalization and the sigmoid transformation, a histogram is illustrated which is based on a frequency distribution table for total evaluation values acquired by adding values that are acquired by applying weighting factors for each name identification item to the evaluation values of the evaluation functions for each name identification item. Here, the lower threshold is set to 73, the upper threshold is set to 83, and the number of judgments of "Black", the number of judgments of "Gray", and the number of judgments of "White" are illustrated. In addition, the accuracy rates of the judgment of "White" and the judgment of "Black" based on check points are illustrated. Such an output before the normalization and the sigmoid transformation is appropriate for the purpose of uniformly overviewing the entire area.

As illustrated in FIG. 11, after the normalization and the sigmoid transformation, the center threshold 78 corresponds to 50, and the upper threshold 83 and the lower threshold 73 correspond to 73 and 27, respectively. In addition, a histogram is illustrated which is based on a frequency distribution table as a result of the normalization and the sigmoid transformation for further enlarging a portion between the upper threshold and the lower threshold and portions near the thresholds. Furthermore, the number of judgment results of the judgment of "Black", the judgment of "Gray", and the judgment of "White" are illustrated, and the accuracy rates of check points of "White" and "Black" are illustrated. After the normalization and the sigmoid transformation, a portion between the upper threshold and the lower threshold and portions near the thresholds are enlarged, which is appropriate for the use of fine adjustment of thresholds.

Referring back to FIG. 1, in a case where the index is the "sets of sample records" of "No. (s0) "7", the sample record output unit 133 acquires a total evaluation value as a visualization target from the visualization request accepting unit 131 and outputs sets of sample records corresponding to the acquired total evaluation value. For example, the sample record output unit 133 acquires a total evaluation value instructed by a user from a visualization request. Then, the sample record output unit 133 extracts the IDs of the set of sample records from the frequency distribution table generated by the index information generating unit 122, which is judged whether or not there is a sigmoid transformation of the acquired total evaluation value. In other words, the sample record output unit 133 selects classes of the frequency distribution table that include the total evaluation value acquired from the visualization request accepting unit 131 in the range thereof and extracts sets of IDs of sample records that are associated with the selected classes. This frequency distribution table represents the frequency distribution table generated from the frequency distribution table H1 before the sigmoid transformation described with reference to FIG. 3 in a case where there is no sigmoid transformation and represents the frequency distribution table generated from the frequency distribution table H2, for which the sigmoid transformation has been performed, described with reference to FIG. 3 in a case where there is the sigmoid transformation. Then, the sample record output unit 133 delivers the extracted IDs of the sets of sample records to the sample extracting unit 124. Then, the sample record output unit 133 receives the contents of actual records corresponding to the IDs of the delivered sets of sample records from the sample extracting unit 124 and outputs the contents of the received records.

In a case where the index is "judgment result counting" of No. (s0) "8", the judgment result output unit 134 counts and outputs a difference between the judgment result of the set of the records of the name identification source and the name identification target and the judgment result based on the previous judgment criteria used for the name identification process. Here, it is assumed that thresholds are included in the judgment criteria used in the name identification process. For example, when a visualization request of the "judgment result counting" is acquired, the judgment result output unit 134 notifies the judgment result counting unit 125 to be described later of the counting of the judgment results that are based on the old and new thresholds. Then, the judgment result output unit 134 receives the result of the counting of the judgment results based on the old and new thresholds from the judgment result counting unit 125 and outputs the received counting result.

When the IDs of the set of sample records as the visualization targets are acquired from the sample record output unit 133, the sample extracting unit 124 searches for the actual records of the set of sample records by using the acquired IDs of the sample records as the keys from the name identification source DB 111 and the name identification target DB 112. Then, the sample extracting unit 124 delivers the retrieved set of sample records to the sample record output unit 133.

Here, an output example in which the set of sample records that is extracted by the sample extracting unit 124 is output by the sample record output unit 133 will be described with reference to FIGS. 12 and 5. FIG. 12 is a diagram illustrating an example of an output that is output by the sample record output unit. As illustrated in FIG. 12, the sample record output unit 133 extracts the set of sample records of a name identification source and the name identification target near the total evaluation value instructed from the user from the frequency distribution table and displays the sets of actual sample records.

Here, for example, when the instructed total evaluation value is 73.0 for which the sigmoid transformation has been performed, the sample record output unit 133 selects the frequency distribution table H2B that is generated from the index H2A illustrated in FIG. 5 as a frequency distribution table, for which the sigmoid transformation has been performed, and is currently displayed as a target and extracts sets of sample records respectively having the total evaluation values 72.85 and 73.04 from samples S721 to S730 corresponding to the class 73 of the designated total evaluation value designated as a set of sample records near the total evaluation value in the target frequency distribution table H2B. Then, the sample record output unit 133 extracts IDs "1000100":"100113" and IDs "100101": "100121" as the IDs of the sets of sample records respectively having the total evaluation values 72.85 and 73.04 and delivers the extracted sets of sample records to the sample extracting unit 124. The sample extracting unit 124 that has received the IDs of the sets of sample records, for the set of sample records having the total evaluation value 72.85, searches for records by using the ID "1000100" as the key from the name identification source DB 111 and searches for records by using the ID "1000113" as the key from the name identification target DB 112. In addition, the sample extracting unit 124, for the set of sample records having the total evaluation value 73.04, searches for a record by using the ID "1000101" as the key from the name identification source DB 111 and searches for a record by using the ID "1000121" as the key from the name identification target DB 112. Then, the sample record output unit 133 respectively outputs the sets of records retrieved by the sample extracting unit 124. Here, a set of records sr1 of the name identification source and the name identification target having the total evaluation value 72.85 and a set of records sr2 of the name identification source and the name identification target having the total evaluation value 73.04 are output.

For example, the total evaluation value 73 that is designated in the example of FIG. 12 is the upper threshold in the example of FIG. 11, and there is a function of adjusting the threshold, which will be described later, while actually checking sample records near the threshold. Here, an example is illustrated in which each one set of sample records before and after the designated total evaluation value is extracted and displayed by the sample record output unit 133. However, the method of extracting sample records by using the sample record output unit 133 and the number of samples to be extracted may be arbitrarily judged by using a method in which the extraction method and the number of samples are set in advance by the sample record output unit 133 or a method in which the extraction method and the number of samples are designated by a user through the visualization request accepting unit 131.

When an intent to count the judgment results based on the old and new thresholds is received from the judgment result output unit 134, the judgment result counting unit 125 acquires the judgment results of the name identifications based on the old and new thresholds and checks the trend in the judgment results for each set of records. For example, the judgment result counting unit 125 stores a judgment list of "White", a judgment list of a judgment of "Gray" upper portion, and a judgment list of a judgment of "Gray" lower portion in a temporary area of the storage unit 11 as the judgment results of name identifications in advance and acquires judgment results based on the old thresholds from this temporary area. In addition, the judgment result counting unit 125 stores a total number of the judgment results of the name identifications based on the old thresholds in a temporary area of the storage unit 11. At this time, the judgment result counting unit 125 does not store the judgment results of the judgment of "Black" in a temporary area. The reason for this is that the number of judgment results of the judgment of "Black" can be acquired by subtracting the number of sets in the judgment list of "White", the judgment list of the upper portion of "Gray", and the judgment list of the lower portion of "Gray" from the total number. In addition, the judgment result counting unit 125 acquires the judgment list of "White" as the judgment results of the name identifications based on the new thresholds from the name identification result 115 and acquires the judgment list of the judgment of "Gray" upper portion and the judgment list of the judgment of "Gray" lower portion from the candidate list 116.

Here, the judgment list of the judgment of "Gray" upper portion is a list of judgments having total evaluation values in the range from the center value between the upper threshold and the lower threshold to a value smaller than the upper threshold, and, hereinafter, it will be abbreviated as "GrayU". On the other hand, the judgment list of the judgment of "Gray" lower portion is a list of judgments having total evaluation values in the range from the lower threshold to a value smaller than the center value between the upper threshold and the lower threshold, and, hereinafter, it will be abbreviated as "GrayL".

In addition, for each set of records included in the judgment results based on the old thresholds, the judgment result counting unit 125 compares the judgment results with the judgment results based on the new thresholds for counting. For example, in a case where sets of records of which the judgment results based on the old thresholds are the judgment of "White" have "GrayU" as judgment results based on the new thresholds, the judgment result counting unit 125 adds a value corresponding to the number of record sets, to the number of changes from the judgment of "White" to judgment of "GrayU". As an additional example, in a case where sets of records of which the judgment results based on the old thresholds are the judgment of "White" have "GrayL" as judgment results based on the new thresholds, the judgment result counting unit 125 adds a value corresponding to the number of record sets to the number of changes from the judgment of "White" to the judgment of "GrayL". Similarly, the judgment result counting unit 125 calculates the numbers of changes from the judgment of "White" to the judgment of "Black", from the judgment of "GrayU" to each judgment, and from the judgment of "Black" to each judgment.

Here, an example of the output of the counting of the judgment results will be described with reference to FIG. 13. FIG. 13 is a diagram illustrating an example of an output of the counting of judgment results by using the judgment result output unit. As illustrated in FIG. 13, the judgment result output unit 134 outputs the numbers of judgments of "White", "GrayU", "GrayL", and "Black" and a total number of judgment results that are based on the old thresholds. In addition, the judgment result counting unit 125 calculates the number of judgments of "Black" based on the old thresholds, as represented in Equation (3) by using the number of judgments of "White", the number of judgments of "GrayU", and the number of judgments of "GrayL".

$$\text{Number of Judgments as "Black" } C_{BO} = \text{Total Number } C_{AO} - \text{Number of Judgments as "White" } C_{WO} - \text{Number of Judgments as "Gray}U\text{" } C_{GUO} - \text{Number of Judgments as "Gray}L\text{" } C_{GLO} \quad (3)$$

Here, the number of judgments $C_{BO}$ as "Black", based on Equation (3), is 298,922,973 sets.

In addition, the judgment result output unit 134, for each set of records included in the judgment results based on the old thresholds, compares the judgment result with the judgment result based on the new thresholds and outputs the number of changes in the judgment results that change based on the new thresholds and the number of judgment results that do not change based on the new thresholds. Here, for example, it is represented that the number of sets of records that are judged as "White" based on the old thresholds are judged as "GrayL" based on the new thresholds is 9,497 sets ($C_{WL}$). This number of sets of records is counted as the number of sets of records included in the judgment list of "GrayL" based on the new thresholds out of sets of records that are included in the judgment list of "White" based on the old thresholds by the judgment result counting unit 125. On the other hand, it is represented that the number of sets of records that are judged as "White" based on the old thresholds are judged as "Black" based on the new thresholds is 7,605 sets ($C_{WB}$). This number of sets of records is counted as the number of sets of records not included in any of the judgment lists of "White", "GrayU", and "GrayL" based on the new thresholds out of sets of records that are included in the judgment list of "White" based on the old thresholds by the judgment result counting unit 125.

In addition, it is represented that the number of sets of records that are judged as "Black" based on the old thresholds are judged as "White" based on the new thresholds is 206,832 sets ($C_{BW}$). This number of sets of records is counted as the number of sets of records not included in any of the judgment lists based on the old thresholds out of sets of records that are included in the judgment list of "White" based on the new thresholds by the judgment result counting unit 125.

As above, even in a case where the judgment list of "Black" is not stored, the judgment result output unit 134 visualizes all the changes in the judgment results for each set of records. In addition, in each judgment list, only a set of identification numbers of records is stored for one set of records. In a case where all the judgment results based on the old and new thresholds are stored together with the sets of records, the amount of information to be stored is as represented in Equation (4). Here, the amount of information of one record is 30 bytes.

Amount of Information of One Record (30 bytes)×
(Total Number of Judgment Results Based On
Old Thresholds (304,068,898)+Total Number of
Judgment Results Based On New Thresholds
(304,068,898))≈18,244 (MB)     (4)

On the other hand, the amount of information to be stored in a case where the judgment results as "Black" are not stored is as represented in Equation (5). Here, the amount of information of one record is 20 bytes. Here, the reason for assuming the amount of one record is less than that in a general method by 10 bytes is that the judgment results do not need to be stored by storing only sets of identification numbers of records and classifying the records in advance.

Amount of Information of One Record (20 bytes)×
(Total Number of Judgment Results Based On
Old Thresholds (5,145,925)+Total Number of
Judgment Results Based On New Thresholds
(8,547,465))≈274 (MB)     (5)

As above, since the judgment results as "Black" are not stored, the amount of information of judgments as "White" and judgments as "Gray" is 1.5% of a case where judgments as "Black" are stored, and the amount of information to be stored becomes practical.

Referring back to FIG. 1, the threshold adjusting unit 126 changes the thresholds output by the visualization unit 123 manually or automatically and outputs various indices corresponding to the changed thresholds based on the frequency distribution table provided by the index information generating unit 122 to the visualization unit 123 again. In addition, the threshold adjusting unit 126 includes a threshold manual adjusting unit 141 and a threshold automatic adjusting unit 142.

In a case where the thresholds are manually changed, the threshold manual adjusting unit 141 acquires the position of the threshold that is manually changed at the position on the indices represented on a monitor and calculates thresholds on the indices based on the acquired position. Then, the threshold manual adjusting unit 141 notifies the index information generating unit 122 of the calculated thresholds. In addition, the threshold manual adjusting unit 141, in order to re-output various indices currently output to the monitor, notifies the index output unit 132 of a visualization request.

In a case where the thresholds are automatically changed, the threshold automatic adjusting unit 142 changes the thresholds on the indices represented on the monitor based on an adjustment polity that is set in advance. Then, the threshold automatic adjusting unit 142 notifies the index information generating unit 122 of the calculated thresholds. In addition, the threshold automatic adjusting unit 142, in order to re-output various indices currently output to the monitor, notifies the index output unit 132 of a visualization request.

Figure 14:
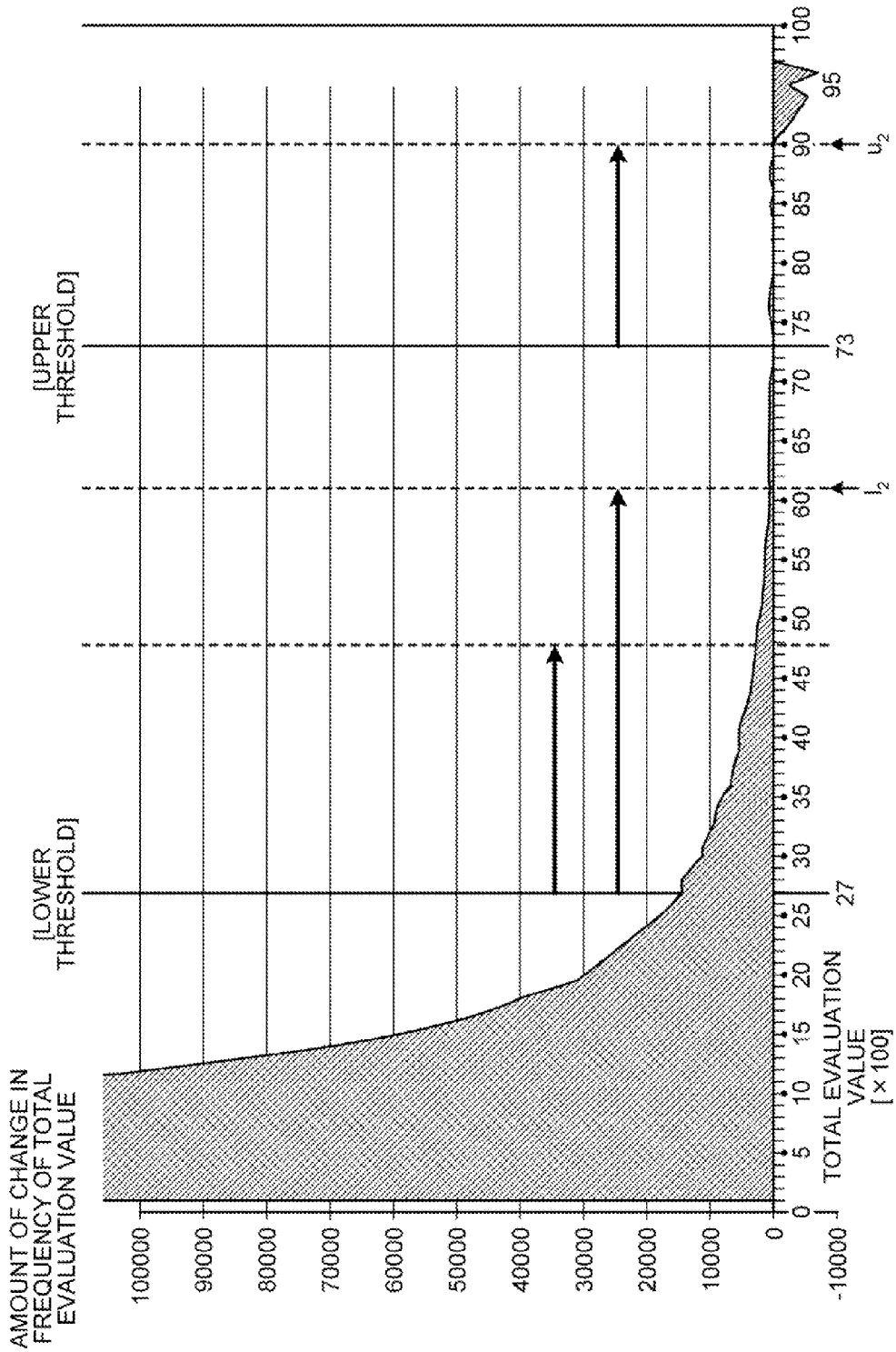
FIG. 14 is a diagram illustrating an optimal threshold in a case where an adjustment policy is: optimal value based on the amount of change in the frequency.

For example, in a case where the adjustment policy is "optimal value based on the amount of change in the frequency", the threshold automatic adjusting unit 142 calculates a differential of the histogram of the total evaluation value as a difference from the frequency of the minimal class and, while moving from the center of the histogram or the current threshold, calculates the total evaluation value that is immediately before the absolute value of the calculated differential becomes the maximal class as an optimal value of the threshold. FIG. 14 is a diagram illustrating an optimal threshold in a case where the adjustment policy is "optimal value based on the amount of change in the frequency". As illustrated in FIG. 14, a histogram of total evaluation values are represented, the X axis represents the total evaluation value, and the Y axis represents the amount of change in the frequency. In addition, it is represented that the lower threshold is 27, and the upper threshold is 73. The threshold automatic adjusting unit 142, by allowing the threshold to move from 27 as a current lower threshold, derives a total evaluation value immediately before an increase in the absolute value of the amount of change (amount of differential) as an optimal value of the threshold. Here, the threshold automatic adjusting unit 142 moves the lower threshold 27 to a higher position until immediately before an increase in the amount of change and sets 61 as an optimal value $l_2$ as a point at which the absolute value of the amount of change is sufficiently small. In addition, the threshold automatic adjusting unit 142 moves the upper threshold 73 to a higher position until immediately before an increase in the absolute value of the amount of change and sets 90 as an optimal value $u_2$. Here, in a case where the adjustment polity is "optimal value based on the amount of change in frequency", although the threshold automatic adjusting unit 142 is described to move the threshold and sets a value immediately before an increase in the amount of change as an optimal value, in a case where the threshold is moved from a portion at which the amount of change is continuously large, a portion at which the amount of change is small may be set as an optimal value.

Figure 15:
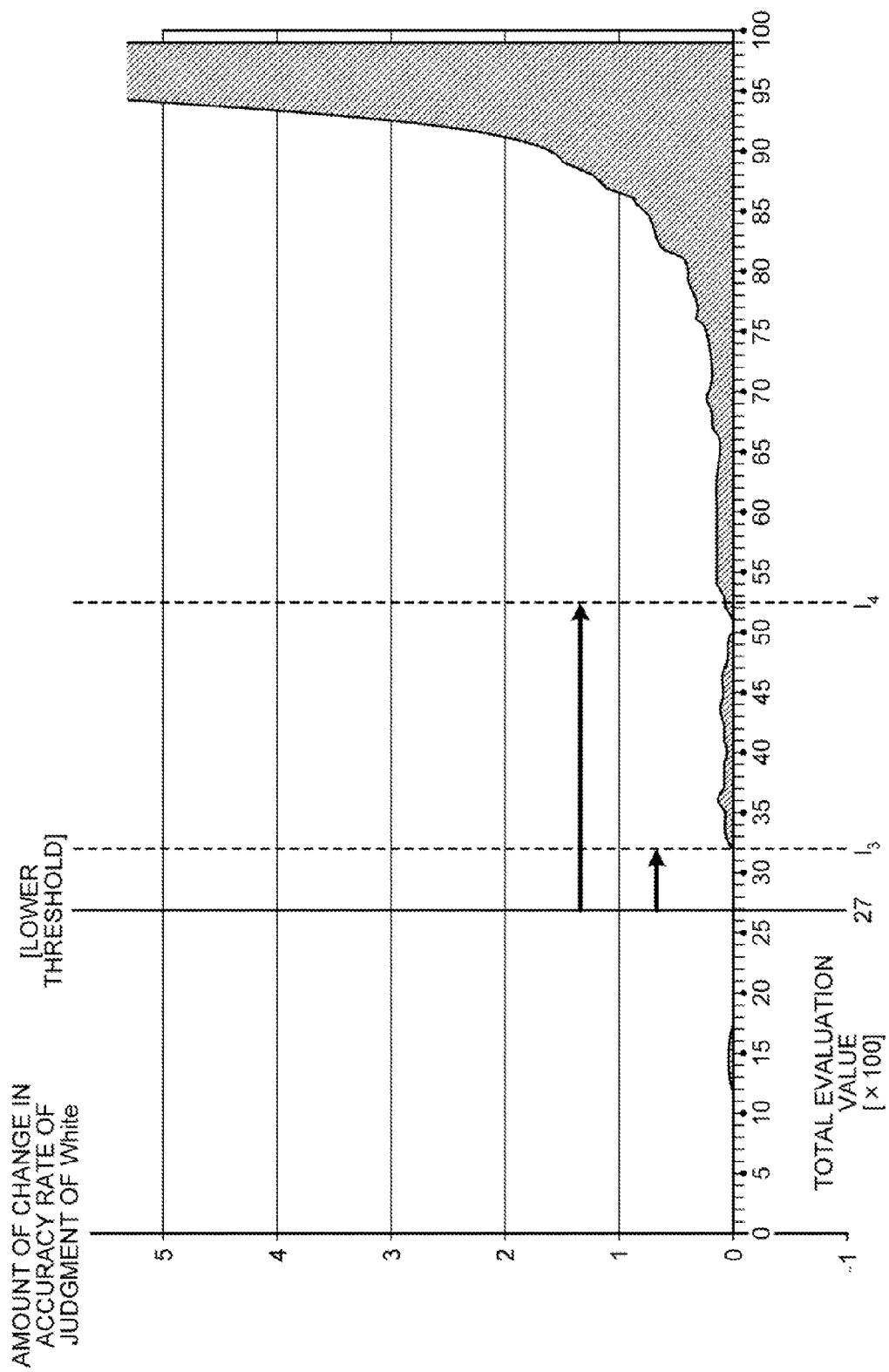
FIG. 15 is a diagram illustrating an optimal threshold in a case where the adjustment policy is: an optimal value based on the amount of change in the accuracy rate of a judgment of "White.

Referring back to FIG. 1, in a case where the adjustment policy is "an optimal value based on the amount of change in the accuracy rate of a judgment of "White"", the threshold automatic adjusting unit 142 calculates a differential of the accuracy rate of a judgment of "White" as a difference from the frequency of a higher class and moves the lower threshold to both sides thereof and derives a total evaluation value that is immediately before the absolute value of the amount of differential becomes as high as an optimal value of the threshold. At this time, in order to minimize the area judged as "Gray", it is preferable that the threshold automatic adjusting unit 142 set the optimal value of the threshold to a value as high as possible. Such an adjustment policy is a policy giving the priority to the accuracy rate of a judgment of "White" and sets high priority to the prevention of missing out a set of records of "White" to be judged to be same each other. FIG. 15 is a diagram illustrating an optimal threshold in a case where the adjustment policy is "an optimal value based on the amount of change in the accuracy rate of a judgment of "White"". As illustrated in FIG. 15, the amount of change in the histogram of total evaluation values at check points of "White" are represented, the X axis represents the total evaluation value, and the Y axis represents the amount of change in the frequency. In addition, it is represented that the lower threshold is 27. The threshold automatic adjusting unit 142 moves the lower threshold to both sides and derives a total evaluation value immediately before an increase in the amount of change (amount of differential) as an optimal value of the threshold. Here, the threshold automatic adjusting unit 142 moves the lower threshold 27 to both sides thereof up to a position until immediately before an increase in the amount of change and sets 32 as an optimal value $l_3$. In addition, in order to set the optimal value of the threshold as large as possible, the threshold automatic adjusting unit 142 moves while the amount of change is small and finally sets 52.5 as the optimal value $l_4$.

Figure 16:
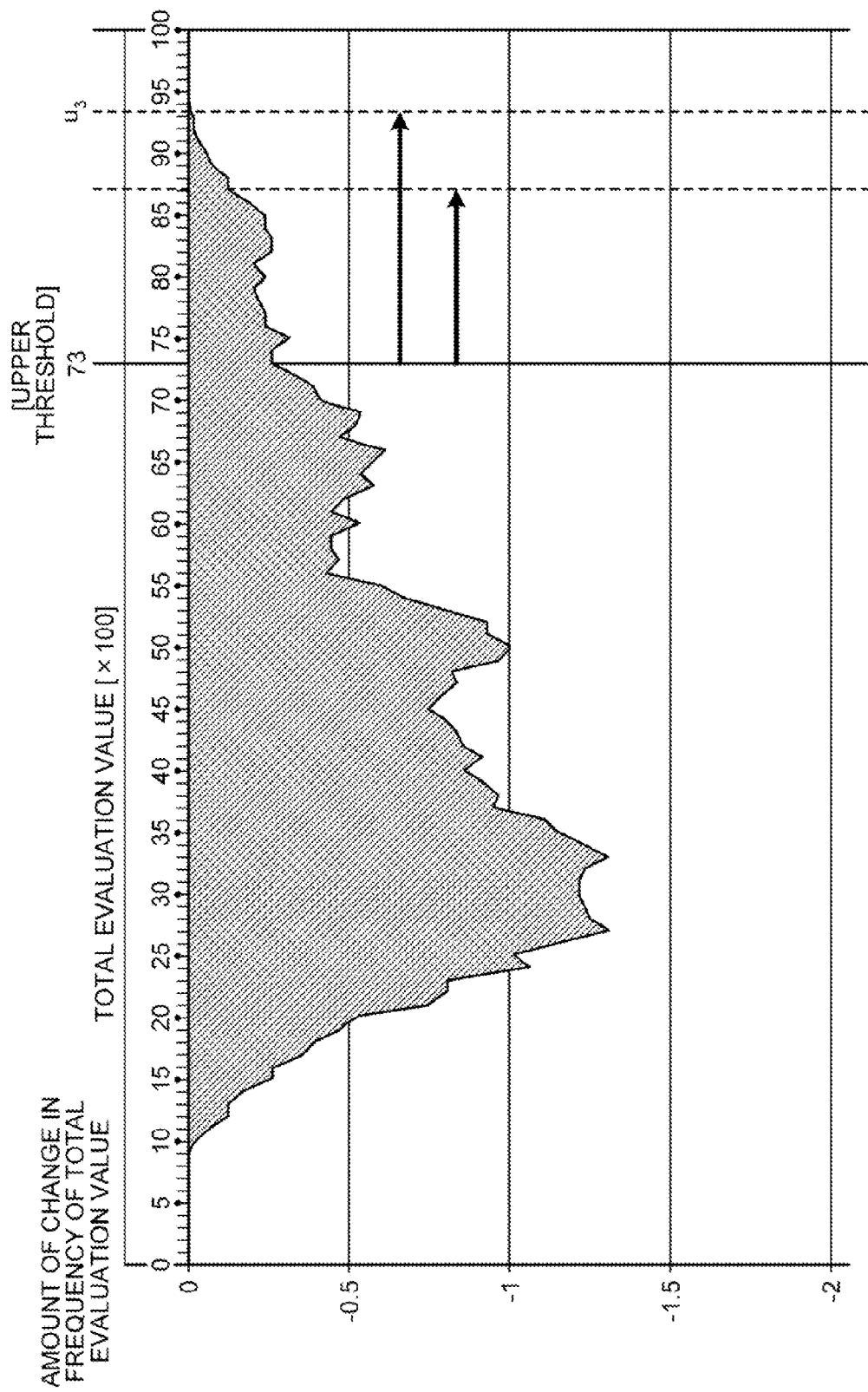
FIG. 16 is a diagram illustrating an optimal threshold in a case where the adjustment policy is: an optimal value based on the amount of change in the accuracy rate of a judgment of "Black"

Referring back to FIG. 1, in a case where the adjustment policy is "an optimal value based on the amount of change in the accuracy rate of a judgment of "Black"", the threshold automatic adjusting unit 142 calculates a differential of the accuracy rate of a judgment of "Black" as a difference from the frequency of a higher class and moves the upper threshold to both sides thereof and derives a total evaluation value that is immediately before the absolute value of the amount of differential becomes as high as an optimal value of the threshold. At this time, in order to minimize the area judged as "Gray", it is preferable that the threshold automatic adjusting unit 142 sets the optimal value of the threshold to a value as low as possible. Such an adjustment policy is a policy giving the priority to the accuracy rate of a judgment of "Black" and sets high priority to the prevention of judging a set of records of "Black", which is to be judged to be different each other, to be same each other ("White"). FIG. 16 is a diagram illustrating an optimal threshold in a case where the adjustment policy is "an optimal value based on the amount of change in the accuracy rate of a judgment of "Black"". As illustrated in FIG. 16, the amount of change in the histogram of total evaluation values at check points of "Black" are represented, the X axis represents the total evaluation value, and the Y axis represents the amount of change in the frequency. In addition, it is represented that the upper threshold is 73. The threshold automatic adjusting unit 142 moves the upper threshold to both sides and derives a total evaluation value immediately before an increase in the amount of change (amount of differential) as an optimal value of the threshold. Here, the threshold automatic adjusting unit 142 moves the upper threshold 73 to both sides thereof up to a position until immediately before a decrease in the amount of change, further moves the upper threshold immediately before an increase in the absolute value of the amount of change, and sets 93 as the optimal value $u_3$.

Referring back to FIG. 1, in a case where the adjustment policy is "minimization of costs in a judgment of "Gray"", the threshold automatic adjusting unit 142 combines the above-described adjustment policies and adjusts the upper threshold and the lower threshold so as to minimize the number of judgments of "Gray". Such an adjustment policy minimizes the cost of a judgment of "Gray" by minimizing the number of judgments of "Gray".

Figure 17:
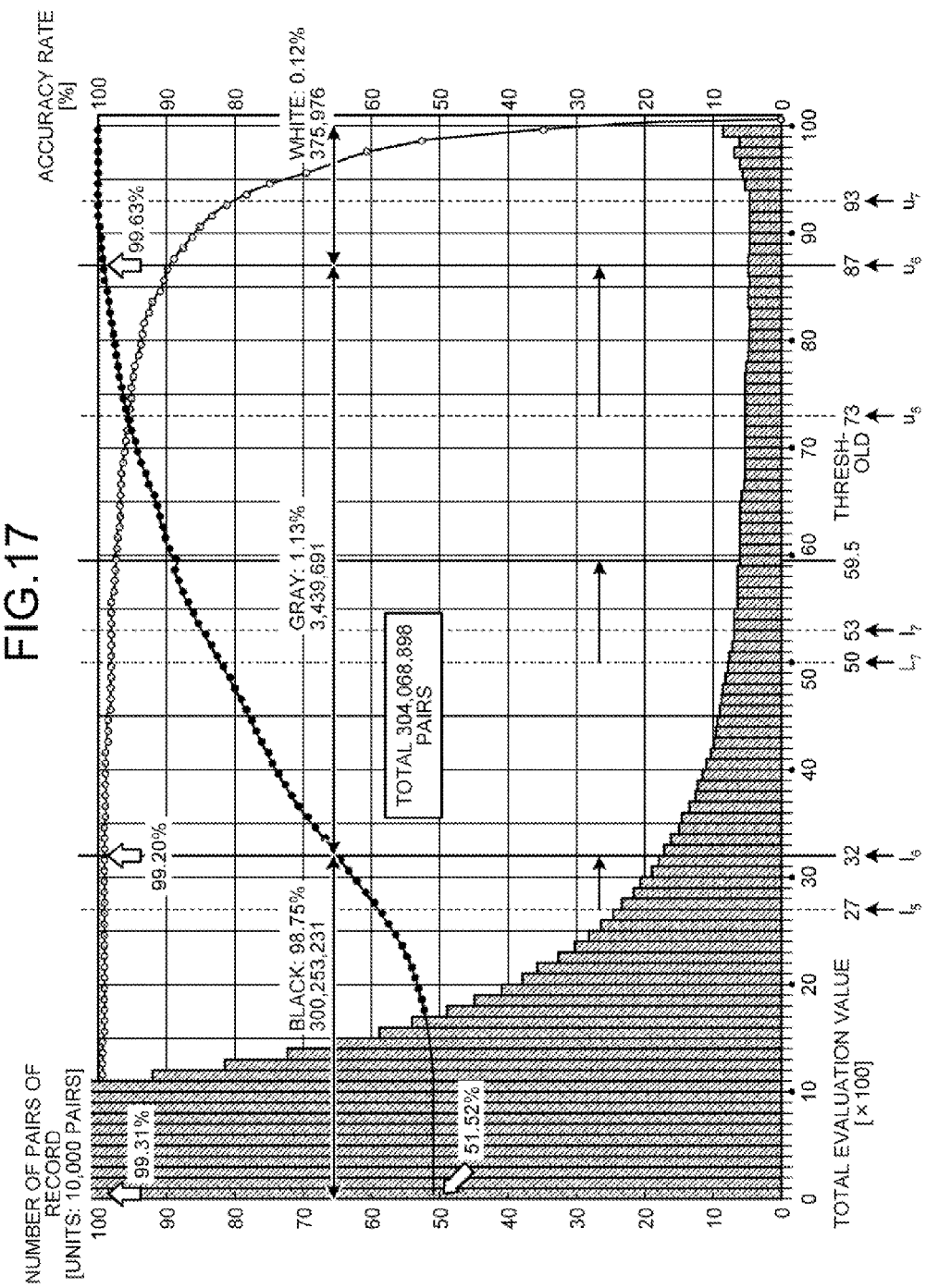
FIG. 17 is a diagram illustrating a specific example of the adjustment of thresholds performed by a threshold adjusting unit.
Figure 18:
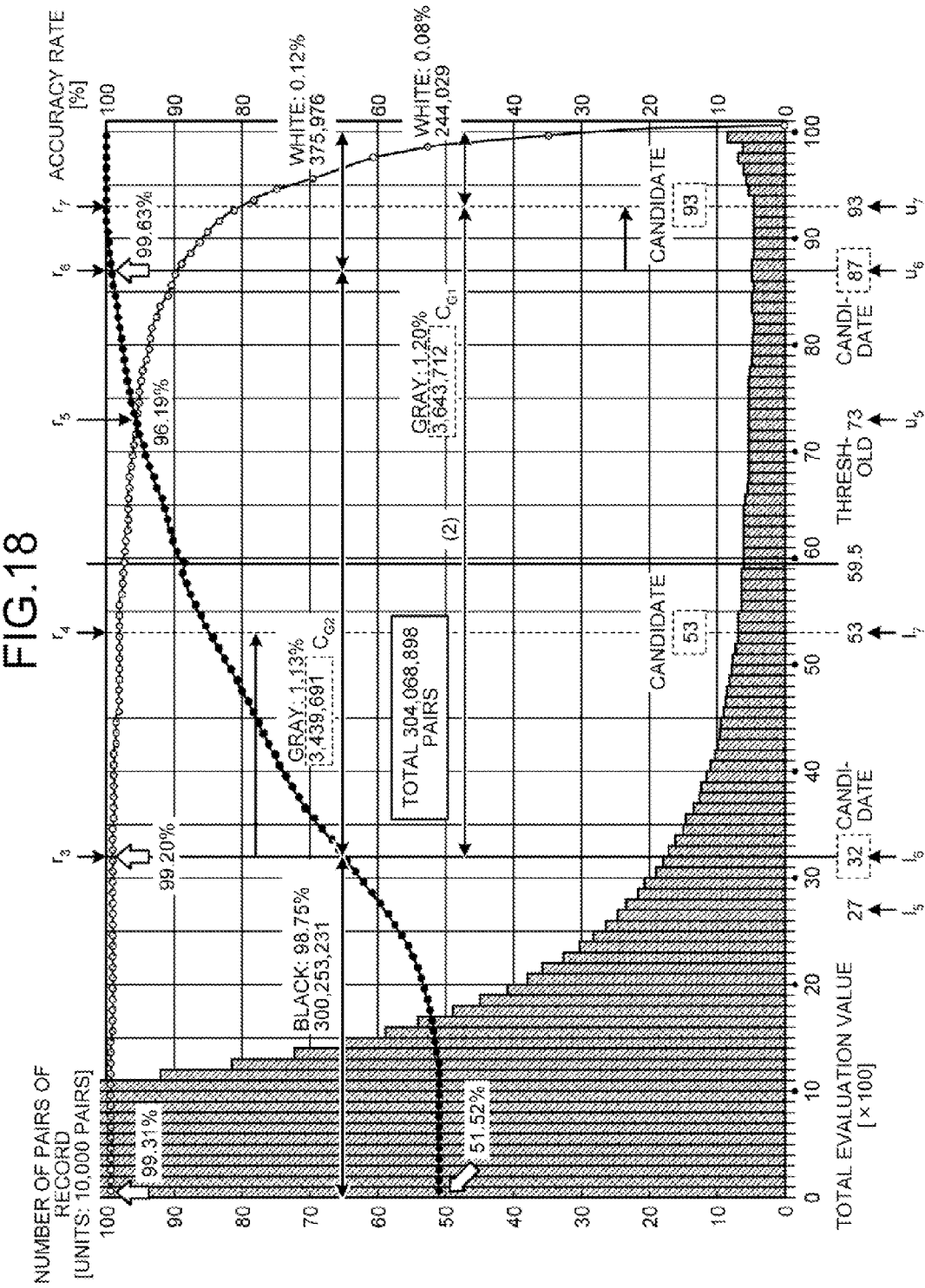
FIG. 18 is a diagram illustrating a specific example of a review accompanied with the adjustment of thresholds.

Here, specific examples of the threshold adjusting process of the threshold adjusting unit 126 will be described with reference to FIGS. 17 and 18. FIG. 17 is a diagram illustrating a specific example of the adjustment of thresholds performed by the threshold adjusting unit, and FIG. 18 is a diagram illustrating a specific example of a review accompanied with the adjustment of thresholds. In FIG. 17, for description, in the adjustment of the lower threshold, "an optimal value based on the amount of change in the accuracy rate of a judgment of "White"" is assumed to be set as the adjustment policy, and, in the adjustment of the upper threshold, "an optimal value based on the amount of change in the accuracy rate of a judgment of "Black"" is assumed to be set as the adjustment policy.

Referring back to FIG. 17, based on the adjustment policy of "an optimal value based on the amount of change in the accuracy rate of a judgment of "White"", the threshold automatic adjusting unit 142 detects candidates for the lower threshold. Here, the threshold automatic adjusting unit 142 moves the lower threshold 27 ($l_5$) to both sides up to a position immediately before an increase in the amount of change and sets 32 ($l_6$) as a candidate for the lower threshold. In addition, the threshold automatic adjusting unit 142 repeats to move the lower threshold while the amount of change is small and sets 53 ($l_7$) as a candidate for the lower threshold. In other words, the threshold automatic adjusting unit 142 sets 32 ($l_6$) and 53 ($l_7$) as candidates for the lower threshold (see FIG. 15).

Next, based on the adjustment policy of "an optimal value based on the amount of change in the accuracy rate of a judgment of "Black"", the threshold automatic adjusting unit 142 detects candidates for the upper threshold. Here, the threshold automatic adjusting unit 142 moves the upper threshold 73 ($u_5$) to both sides up to a position at which the amount of change is small and sets 87 ($u_6$) as a candidate for the upper threshold. In addition, the threshold automatic adjusting unit 142 moves to a position immediately before an increase in the amount of change and sets 93 ($u_7$) as a candidate for the upper threshold. In other words, the threshold automatic adjusting unit 142 sets 87 ($u_6$) and 93 ($u_7$) as candidates for the upper threshold (see FIG. 16).

Finally, based on the adjustment policy of "minimization of cost of a judgment of "Gray"", the threshold automatic adjusting unit 142 comprehensively reviews the adjustment of the upper threshold and the lower threshold. As illustrated in FIG. 18, the threshold automatic adjusting unit 142 judges that, even in a case where the lower threshold is moved from 27 ($l_5$) to 32 ($l_6$), the accuracy rate of a judgment of "White" is 99.20% ($r_3$) in both cases and does not change. On the other hand, the threshold automatic adjusting unit 142 judges that, in a case where the lower threshold is moved from 27 ($l_5$) to 53 ($l_7$), the accuracy rate of a judgment of "White" decreases from 99.20% ($r_3$) to 98.16% ($r_4$). Thus, the threshold automatic adjusting unit 142 preliminary judges the lower threshold to 32 ($l_6$) for which the accuracy rate of a judgment of "White" is higher.

Next, the threshold automatic adjusting unit 142 judges that, in a case where the upper threshold is moved from 73 ($u_5$) to 87 ($u_6$), the accuracy rate of a judgment of "Black" increases from 96.19% ($r_5$) to 99.63% ($r_6$). In addition, the threshold automatic adjusting unit 142 judges that, in a case where the upper threshold is moved from 73 ($u_5$) to 93 ($u_7$), the accuracy rate of a judgment of "Black" becomes 100% ($r_7$). Here, the threshold automatic adjusting unit 142 judges that, in a case where the lower threshold is set to 32 ($l_6$) that has been preliminarily judged, and the upper threshold is set to 93 ($u_7$), the number of judgments of "Gray" is 3,643,712 sets ($C_{G1}$) that is more than a case where the upper threshold is set to 87 ($u_6$) by 204,021 sets. Accordingly, based on the adjustment policy of "minimization of cost of a judgment of "Gray"", the threshold automatic adjusting unit 142 preliminarily judges the upper threshold to be 87 ($u_6$). In addition, even in a case where the adjustment policy is "an optimal value based on the amount of change in the frequency", the threshold automatic adjusting unit 142 judges that the upper threshold 87 and the lower threshold 32 are valid and sets 87 as the optimal value of the upper threshold and sets 32 as the optimal value of the lower threshold.

As a result, by moving the lower threshold from 27 to 32 and moving the upper threshold from 73 to 87, the threshold automatic adjusting unit 142 raises the accuracy rate of a judgment of "Black" from 96.19% ($r_5$) to 99.63% ($r_6$) without changing the accuracy rate of a judgment of "White" 99.20% ($r_3$). In addition, the threshold automatic adjusting unit 142 decreases the number of judgments of "Gray" from 4,534,875 sets (see FIG. 11) to 3,439,691 sets ($C_{G2}$) by 1,095,184 (24.1%).

In addition, the adjustment of the thresholds may be made by a staff using the threshold manual adjusting unit 141 by referring to various index information that is presented from the visualization unit. However, it is more efficient to perform an automatic judgment using the threshold automatic adjusting unit 142 first and to correct the result by a staff using the threshold manual adjusting unit 141 by comprehensively judging the result of the automatic judgment.

Sequence of Index Information Generating Process

Figure 19B:
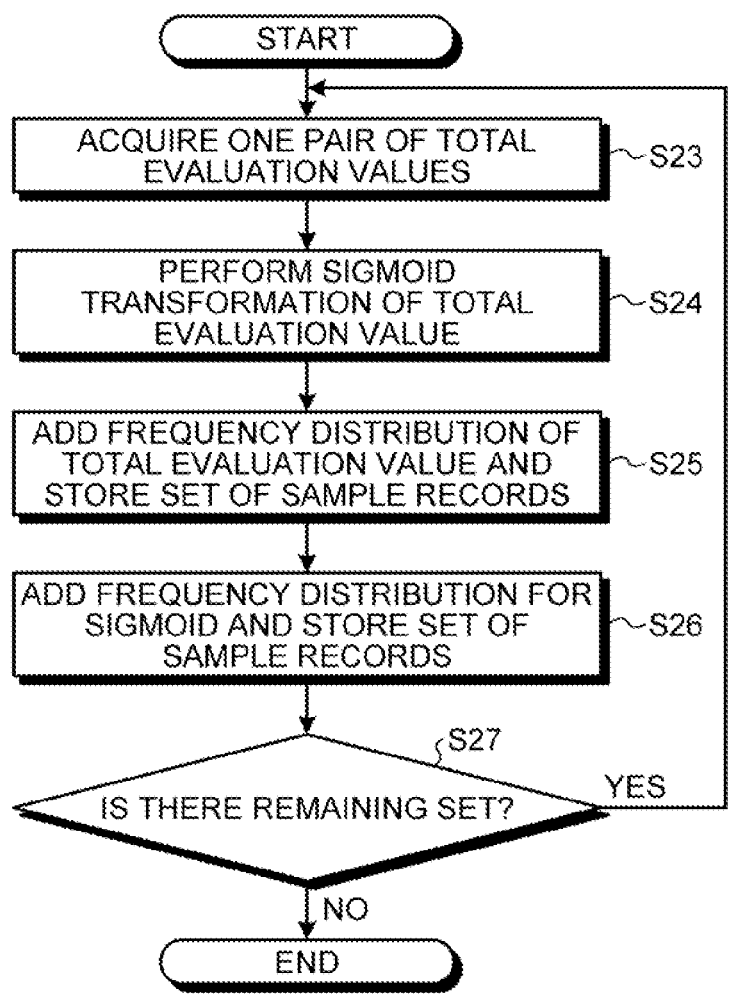
FIG. 19B is a flowchart illustrating the sequence of the index information generating process of a name identification result.
Figure 19D:
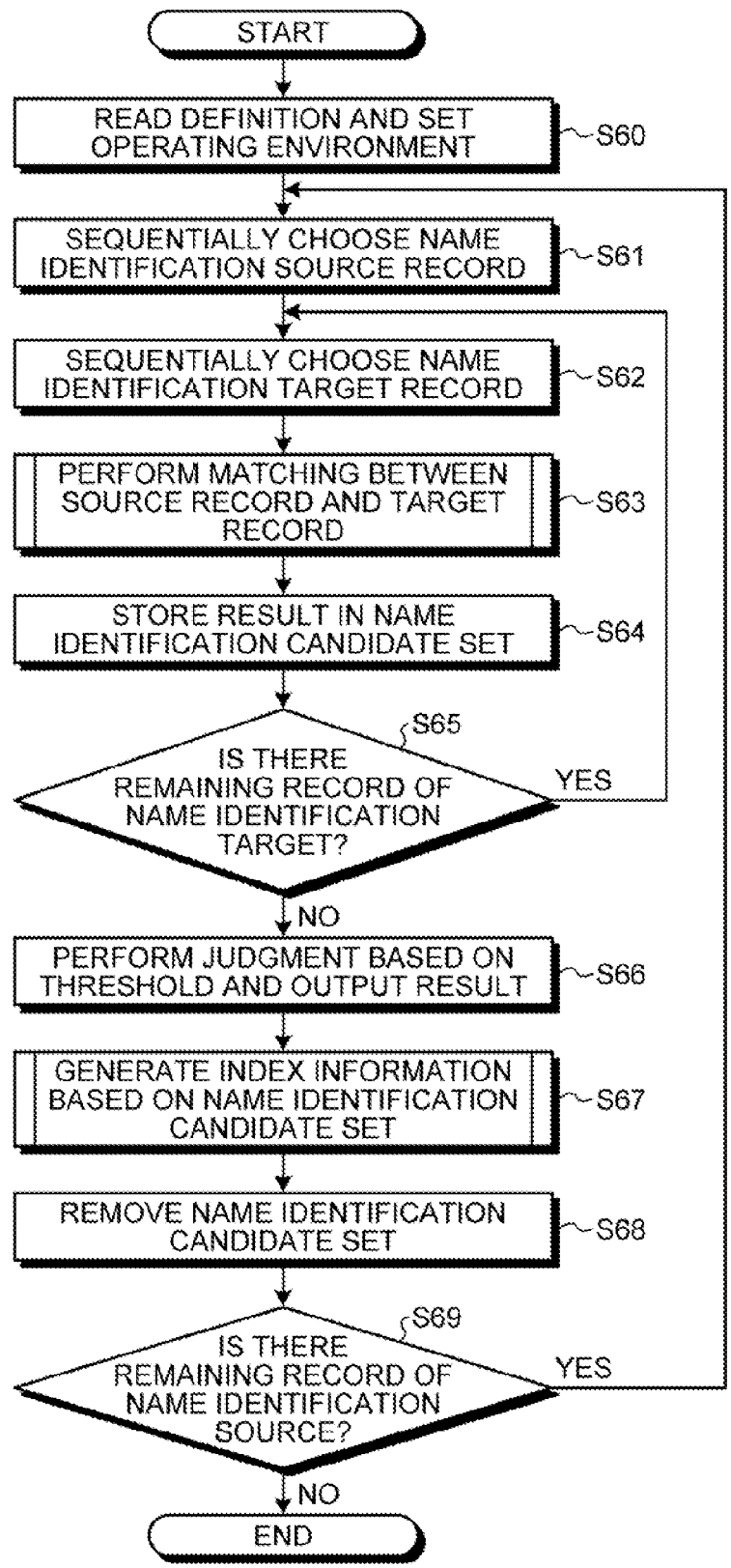
FIG. 19D is a flowchart illustrating the sequence of the index information generating process by performing a name identification.

Next, the sequence of the index information generating process will be described with reference to FIGS. 19A to 19D. FIG. 19A illustrates the sequence of a main process of the index information generating process according to an embodiment, FIG. 19B illustrates the sequence of the index information generating process of a name identification result, FIG. 19C illustrates the sequence of the index information generating process of check points, and FIG. 19D illustrates the sequence of the index information generating process by performing a name identification. FIG. 19A is a flowchart illustrating the sequence of the main process of the index information generating process according to an embodiment.

First, before the name identification process is started by the name identification unit 121, the index information generating unit 122 initializes information such as the index information 117 of the storage unit 11 that is managed by the index information generating unit 122 in Step S10. Next, the index information generating unit 122 requests the name identification unit 121 to perform a name identification of the name identification source DB 111 and the name identification target DB 112, generates index information, and temporarily stores the index information in the index information generating unit 122 in Step S11. Next, the index information generating unit 122 acquires the thresholds used by the name identification unit from the name identification unit, performs a sigmoid transformation, and stores the thresholds before and after the sigmoid transformation and the index information temporarily stored in Step S11 together in the index information 117 of the storage unit 11 in Step S12.

Subsequently, the index information generating unit 122 generates the index information of check points of "White" and stores the generated index information in the index information 117 of the storage unit 11 in Step S13. In addition, the index information generating unit 122 generates the index information of check points of "Black" and stores the generated index information in the index information 117 of the storage unit 11 in Step S14. Thereafter, the index information generating unit 122 ends the index information generating process.

Sequence of Index Information Generating Process of Name Identification Result

Figure 28:
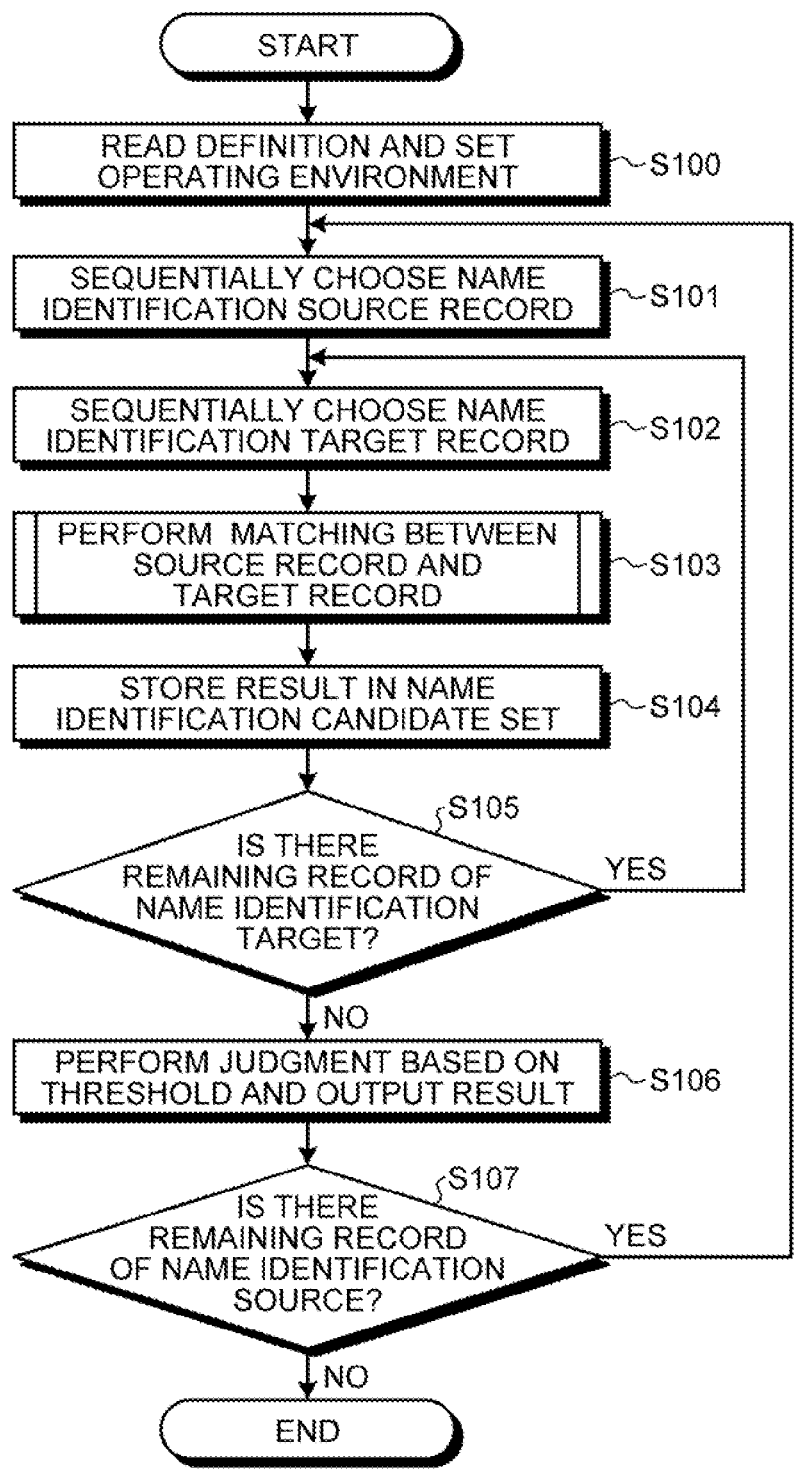
FIG. 28 is a flowchart illustrating the sequence of a name identification process.

Next, the processing sequence of Step S11 in which the name identification illustrated in FIG. 19A is performed, and the index information is generated and stored will be described with reference to FIGS. 19D and 19B. FIG. 19D is a flowchart illustrating the sequence of the index information generating process by performing the name identification. The processing sequence illustrated in FIG. 19D is the name identification process (matching process) performed by the name identification unit 121, Steps S60 to S66 and Step S69 are the same as Steps S100 to S106 and Step S107 of the above-described name identification process described with reference to FIG. 28, thus the duplicate description will not be repeated, and Step S67 and Step S68 that are performed immediately before Step S107 will be described. In addition, the matching process of Step S63 is the same as that described above with reference to FIG. 29, and the duplicate description will not be repeated.

When Step S66 is completed by the name identification unit 121, the entire name identification process for one record of the name identification source ends, and, in the name identification candidate set of the name identification unit 121, matching results corresponding to combinations of all the name identification target records with one name identification source records are stored. Thus, the name identification unit 121 requests the index information generating unit 122 to perform the process of generating index information based on the stored name identification candidate set in Step S67. This process will be described later with reference to FIG. 19B. When the generation of the index information using the index information generating unit 122 ends, the name identification unit 121 removes the name candidate sets for one record of the name identification source that have been stored and prepares the process for the next name identification source record in Step S68.

Next, the sequence of the process (Step S67) of generating the index information from the name candidate set illustrated in FIG. 19D will be described with reference to FIG. 19B. FIG. 19B is a flowchart illustrating the sequence of the index information generating process of a name identification result. Further, as the index information such as the frequency distribution table used here, the index information that is temporarily stored in the index information generating unit 122 is used. First, the index information generating unit 122 acquires a total evaluation value of a recorded pair of a set of records of the name identification source and the name identification target from the name identification candidate set of the name identification unit 121 in Step S23. Then, the index information generating unit 122 performs a sigmoid transformation of the acquired total evaluation value in Step S24. In addition, the index information generating unit 122, in a frequency distribution table in which the total evaluation value is set as the class, adds the frequency of the class of the frequency distribution table that corresponds to the acquired total evaluation value and temporarily stores the class of the acquired total evaluation value in the index information generating unit 122 in association with the set of sample records in Step S25.

Then, the index information generating unit 122, in the frequency distribution table in which the total evaluation value after the sigmoid transformation is set as the class, adds the frequency of the class of the frequency distribution table that corresponds to the total evaluation value after the sigmoid transformation and associates the class of the total evaluation value with the set of sample records. Then, the index information generating unit 122 temporarily stores the frequency distribution table after the sigmoid transformation inside the index information generating unit 122 in Step S26.

Subsequently, the index information generating unit 122 judges whether or not there is a remaining set of a recorded pairs in the name identification candidate set of the name identification unit 121 in Step S27. In a case where there is a remaining set of a recorded pair (Yes in Step S27), the index information generating unit 122 proceeds to Step S23 for acquiring the next set. On the other hand, in a case where it is judged that there are no remaining sets of a recorded pairs (No in Step S27), the index information generating unit 122 ends the index information generating process of the name identification result.

Sequence of Index Information Generating Process of Check Points

Next, the processing sequence of Step S13 or S14 in which the index information of check points of "White" or "Black" illustrated in FIG. 19A will be described with reference to FIG. 19C. FIG. 19C is a flowchart illustrating the sequence of the index information generating process of check points. Here, it is assumed that check points are "White" in a case where they are called from Step S13, and check points are "Black" in a case where they are called from Step S14.

First, the index information generating unit 122 performs initial setting in Step S31. For example, the index information generating unit 122 initializes the storage area of the index information relating to the check points of the index information 117 of the storage unit 11. Then, the index information generating unit 122 sets pair of target records that are check points as name identification records in Step S32.

Next, the index information generating unit 122 acquires one set of name identification records that is a check point in Step S33. Then, the index information generating unit 122 matches one set of name identification records, which is a check point, that have been acquired by using the name identification unit 121 in Step S34. This matching process is similar to that illustrated above in FIG. 29, and the duplicate description will not be repeated, and a total evaluation value is included in the matching result. Then, the index information generating unit 122, through the sequence of the index information generating process of the name identification result, generates the index information of the matched check points and associates the check point as a pair of sample records with the generated index information. Then, the index information generating unit 122 internally stores the index information temporarily in Step S35.

Subsequently, the index information generating unit 122 judges whether or not there is a remaining pair of records as a check point in Step S36. In a case where there is a remaining pair of records as check points (Yes in Step S36), the index information generating unit 122 proceeds to Step S33 for acquiring the next one set. On the other hand, in a case where it is judged that there are no remaining pairs of records as check points (No in Step S36), the index information generating unit 122 stores all the generated index information of check points in the index information 117 of the storage unit 11. Then, the index information generating unit 122 ends the index information generating process of check points.

Sequence of Visualization Process

Figure 20:
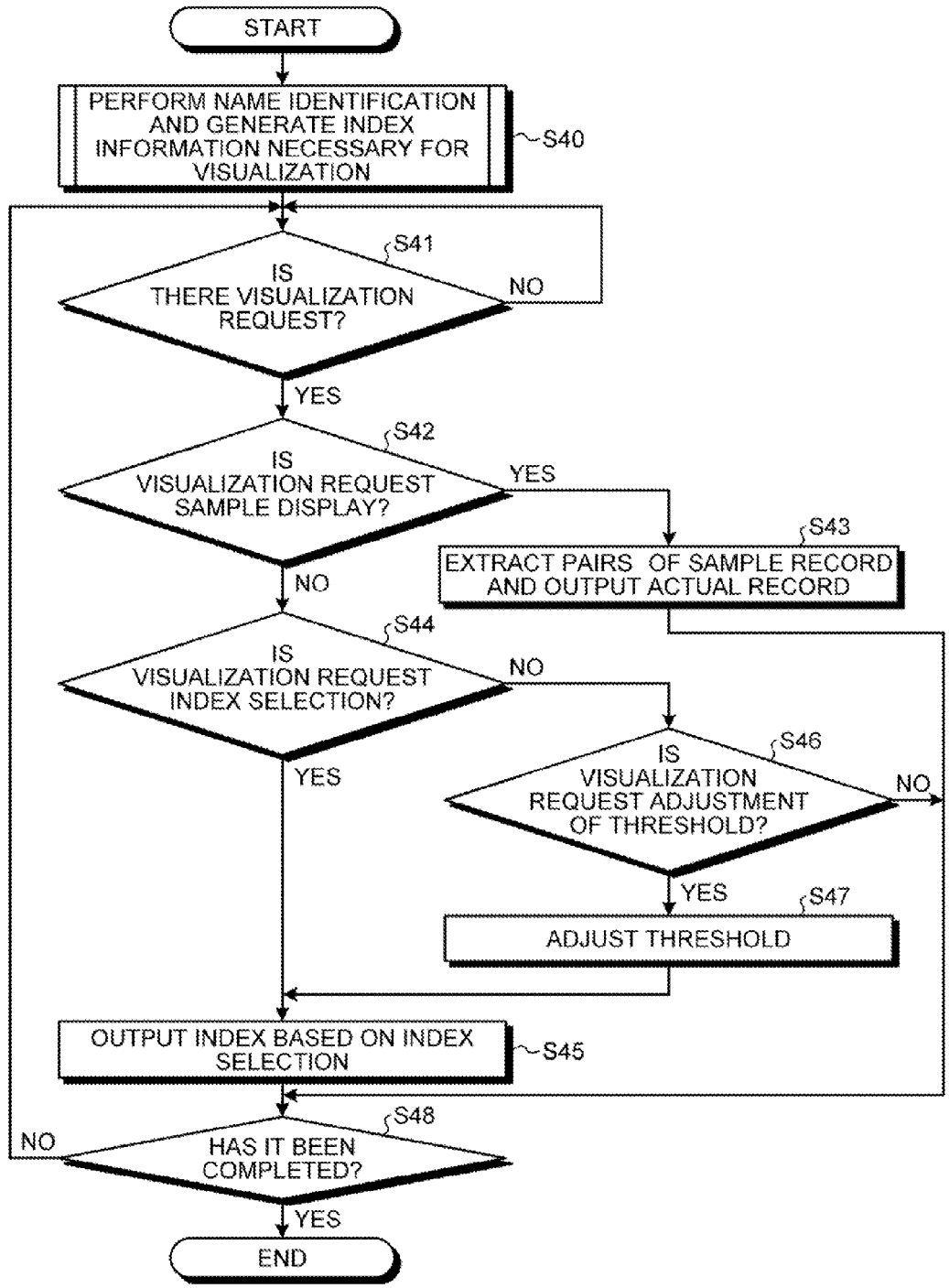
FIG. 20 is a flowchart illustrating the sequence of a visualization process according to this embodiment.

Next, the sequence of the visualization process will be described with reference to FIG. 20. FIG. 20 is a flowchart illustrating the sequence of the visualization process according to an embodiment. This sequence illustrates an embodiment in a case where the embodiment using the technique of the present invention is performed for the purpose of visualization of the name identification.

First, the index information generating unit 122 generates index information used for visualization by performing a name identification process using the name identification unit 121 in Step S40. In this process, initialization is performed as described above with reference to FIG. 19A, index information before the sigmoid transformation and after completion of the sigmoid transformation is generated, thresholds before the sigmoid transformation and after completion of the sigmoid transformation is generated, the index information of check points of "White" and "Black" is generated, and the index information used for the visualization is stored in the index information 117 of the storage unit 11.

Next, the visualization request accepting unit 131 judges whether or not there is a visualization request in Step S41. In a case where it is judged that there is no visualization request (No in Step S41), the process waits until there is a visualization request. On the other hand, in a case where it is judged that there is a visualization result (Yes in Step S41), the visualization request accepting unit 131 judges whether or not the visualization request is a request representing a sample display of "set of sample records" of the index No. "7" in Step S42.

In a case where it is judged that the visualization request is a request representing a sample display (Yes in Step S42), the sample record output unit 133 extracts a pair of sample records and outputs actual records of the extracted set in Step S43. For example, the sample record output unit 133 acquires a total evaluation value of a visualization target from the visualization request accepting unit 131, checks whether or not the sigmoid transformation is performed, and judges a frequency distribution table generated by the index information generating unit 122 as a target. Then, the sample record output unit 133 extracts the set of sample records corresponding to the total evaluation value acquired from the visualization request accepting unit 131 based on the target frequency distribution table and notifies the sample extracting unit 124 of a set of the extracted IDs of the sample records. Then, the sample extracting unit 124 searches for the actual records of the received set of IDs of sample records from the name identification source DB 111 and the name identification target DB 112 and notifies the sample record output unit 133 of the actual records. In addition, the sample record output unit 133 outputs the actual records of the set of sample records retrieved by the sample extracting unit 124 and ends Step S43. Thereafter, the visualization request accepting unit 131 judges whether to end the visualization process in Step S48. In a case where the visualization process is to be ended (Yes in Step S48), the visualization request accepting unit 131 ends the visualization process. On the other hand, in a case where the visualization process is not to be ended (No in Step S48), the process is returned to Step S41 for accepting the next visualization request.

On the other hand, in a case where it is judged that the visualization request is not a request representing a sample display (No in Step S42), the visualization request accepting unit 131 judges whether or not the visualization request is an index selection in Step S44. In a case where it is judged that the visualization request is the index selection (Yes in Step S44), the index output unit 132 outputs an index based on the index selection in Step S45. For example, in a case where No. "1" to No. "6" and No. "8" are selected as the indices, the index output unit 132 performs a process for each No. and outputs the processing results. For example, in a case where No. "1" is selected as the index, the index output unit 132 outputs a histogram in which the total evaluation value is set to the class based on the frequency distribution table generated by the index information generating unit 122. In addition, as an example, in a case where No. "2" is selected as the index, the index output unit 132 acquired thresholds from the index information generating unit 122 and outputs the acquired thresholds together with the histogram.

In a case where it is judged that the visualization request is not an index selection (No in Step S44), the visualization request accepting unit 131 judges whether or not the visualization request is a request for threshold adjustment in Step S46. In a case where it is judged that the visualization request is not a request for threshold adjustment (No in Step S46), there is no corresponding visualization request, and accordingly, the visualization request accepting unit 131 proceeds to Step S48 described above for checking the end of the visualization process. On the other hand, in a case where it is judged that the visualization request is the request for threshold adjustment (Yes in Step S46), the threshold adjusting unit 126 adjusts the thresholds in Step S47. Then, the threshold adjusting unit 126 proceeds to Step S45 for re-outputting the index with the thresholds after adjustment to the index output unit 132.

Sequence of Threshold Adjustment

Figure 21:
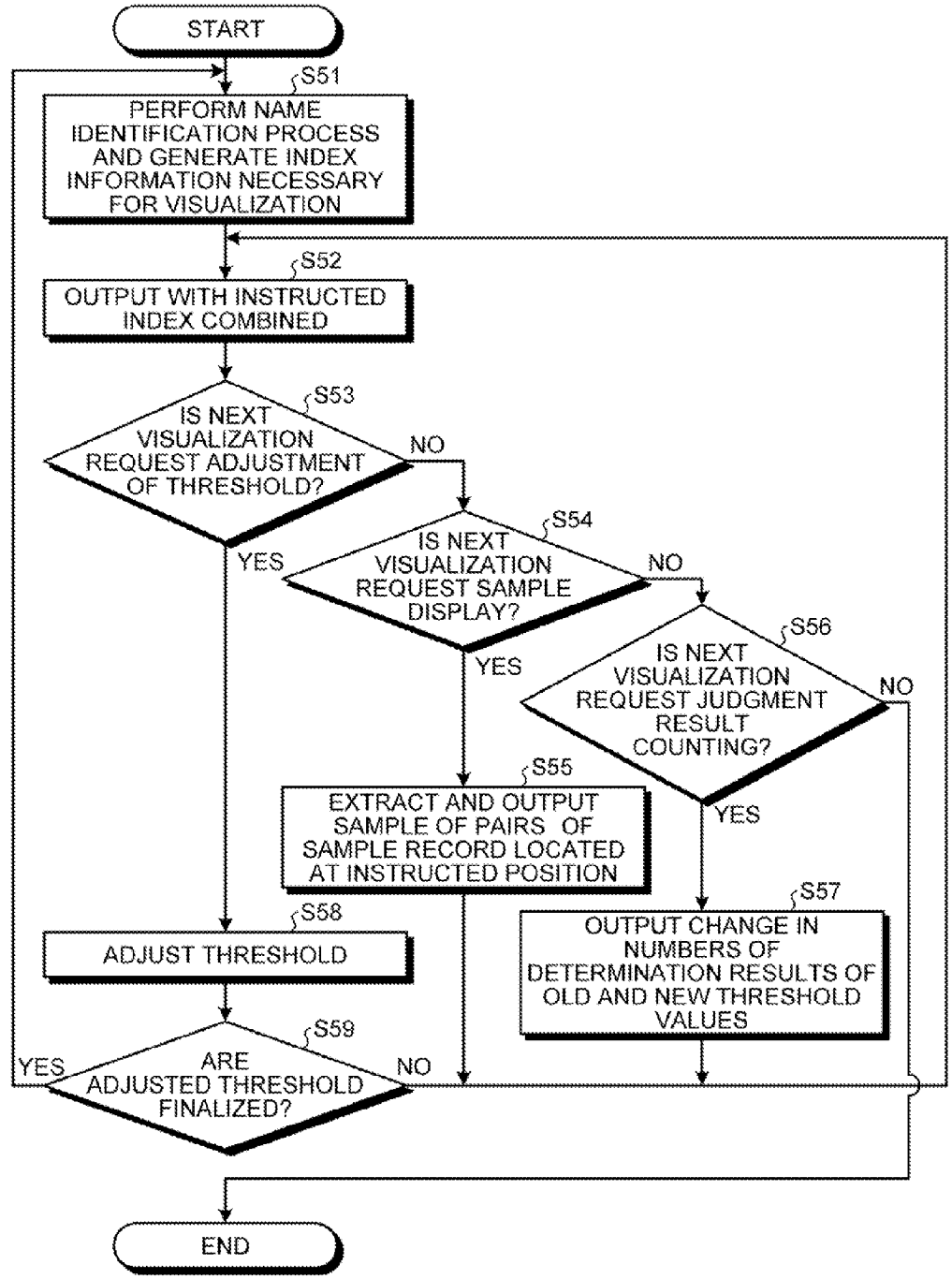
FIG. 21 is a flowchart illustrating the sequence of a threshold adjusting process according to an embodiment.

Next, the sequence of the adjustment of thresholds according to an embodiment will be described with reference to FIG. 21. FIG. 21 is a flowchart illustrating the sequence of a threshold adjusting process according to an embodiment. Although this sequence represents an embodiment performed for the purpose of adjusting thresholds as an embodiment using the technique of the present invention, it is also effective as an independent main process for the purpose of the adjustment of thresholds, the visualization of the name identification according to the index, the display of sample records, or the visualization of a change in the name identification result.

First, the index information generating unit 122 performs a name identification process using the name identification unit 121 and generates index information used for visualization in Step S51. Since this process is similar to that of Step S40 illustrated in FIG. 20 and is the above-described process illustrated in FIG. 19A, a detailed description thereof will not presented here. However, in a case where a flag used for storing the latest name identification result and the like, is On, before the initialization process (Step S10 illustrated in FIG. 19A), a process of storing information, which is used for counting the judgment results such as the latest name identification result 115, the candidate list 116, the index information 117, and the like, in another area of the storage unit 11 as information relating to old thresholds is performed.

Next, the index output unit 132 generates an instructed indices based on the index information generated by the index information generating unit 122 and combines and outputs the generated indices in Step S52. In addition, the visualization request accepting unit 131 judges whether or not the next visualization request is a request for threshold adjustment in Step S53. In a case where it is judged that the next visualization request is not the threshold adjustment (No in Step S53), the visualization request accepting unit 131 judges whether or not the next visualization request is a request for sample display in Step S54. In a case where it is judged that the next visualization request is a request for the sample display (Yes in Step S54), the sample record output unit 133 extracts a set of sample records that correspond to the instructed total evaluation value from the index information. Then, the sample record output unit 133 outputs the actual records of the extracted pair of sample records in Step S55, and the process proceeds to Step S52.

On the other hand, in a case where it is judged that the next visualization request is not the request for the sample display (No in Step S54), the visualization request accepting unit 131 judges whether or not the next visualization request is a request for judgment result counting in Step S56. In a case where it is judged that the next visualization request is the request for the judgment result counting (Yes in Step S56), the judgment result output unit 134 outputs changes in the numbers of judgments according to the old and new thresholds in Step S57, and the process proceeds to Step S52. In addition, in a case where it is judged that the next visualization request is not the request for judgment result counting (No in Step S56), there is no corresponding visualization request, and accordingly, the process ends.

In addition, in a case where it is judged that the next visualization request is the request for threshold adjustment (Yes in Step S53), the threshold adjusting unit 126 adjusts the thresholds in Step S58. Thereafter, the control unit 12 judges whether the adjusted thresholds are finalized in Step S59. In a case where the adjusted thresholds are judged to be finalized (Yes in Step S59), the control unit 12, in order to perform a name identification process again by using the finalized thresholds, sets the flag used for storing the latest name identification result and the like, to On, and the process proceeds to Step S51. On the other hand, in a case where it is judged that the adjusted thresholds are not finalized (No in Step S59), the control unit 12 proceeds to Step S52 for re-outputting the indices by using the adjusted thresholds.

In the above-described information matching apparatus 1, a case has been descried in which the name identification unit 121 that matches the name identification source and the name identification target, the visualization unit 123 that performs visualization based on the index information (the frequency distribution table) generated based on the matching result, and the like are included. However, it may be configured such that the information matching apparatus 1 is an apparatus including the name identification unit 121 that matches the name identification source and the name identification target and an information processing apparatus 1B that is connected to the information matching apparatus 1 includes a visualization unit 123 that performs visualization based on the index information that is generated based on the matching result. In addition, it may be configured such that the index information generating unit 122 is divided into an index information generating unit A that generates information used for index information in the matching process of the name identification unit 121 and an index information generating unit B that generated and provided index information available after the name identification, and the former index is included in an information matching apparatus 1A as the index information generating unit A (122A), and the latter is included in the information processing apparatus 1B as the index information generating unit B (122B).

Configuration of Information Matching System According to Embodiment

Figure 22:
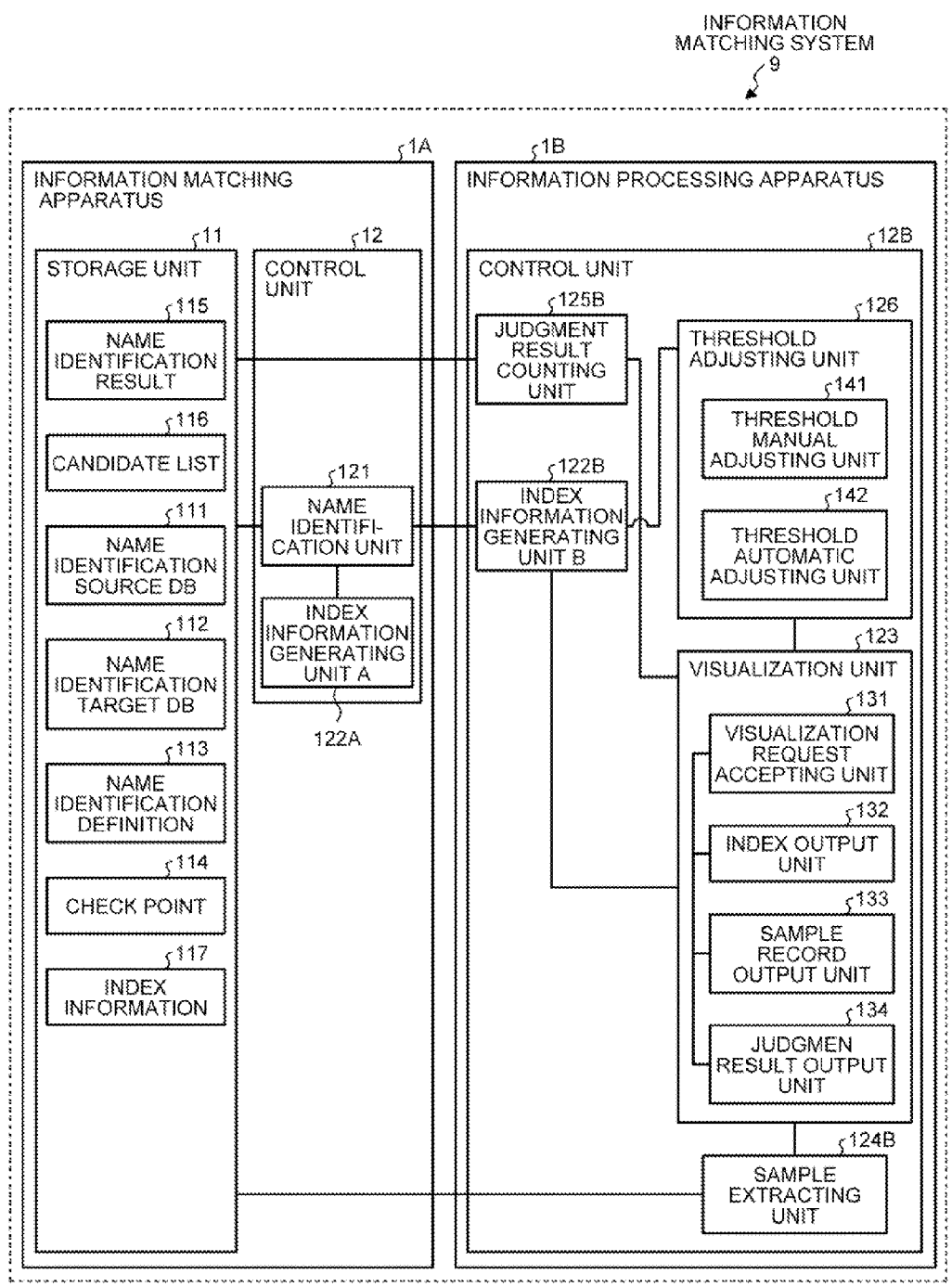
FIG. 22 is a functional block diagram illustrating a modified example of an information matching system according to an embodiment.

As a modified example, a case will be described in which the information matching apparatus 1 includes the name identification unit 121 that matches the name identification source and the name identification target, and the information processing apparatus 1B connected to the information matching apparatus 1A includes the visualization unit 123 that performs visualization based on the index information generated based on the matching result and the like. FIG. 22 is a functional block diagram illustrating an information matching system 9 according to an embodiment. The same reference numeral is assigned to the configuration that is that same as that of the information matching apparatus 1 (FIG. 1) according to an embodiment, and the description of the configuration and the operation that are duplicated will not be repeated. A difference between the embodiment and the modified example is that the visualization unit 123 that performs visualization and the like are included in the information processing apparatus 1B other than the information matching apparatus 1A. Described in more detail, in the modified example, the index information generating unit 122 is divided into an index information generating unit A (122A) that generates information used for index information in the matching process of the name identification unit 121 and an index information generating unit B (122B) that generates and provides index information available after the name identification, the sample extracting unit 124 is replaced with a sample extracting unit 124B, and the judgment result counting unit 125 is replaced with a judgment result counting unit 125B.

The information matching apparatus 1A and the information processing apparatus 1B may be operated using independent computers connected through a network. In such a case, since the information matching apparatus 1A includes a storage unit that stores much information such as the name identification source DB 111, the name identification target DB 112 and the like, and a name identification unit 121 that performs a name identification process for vast combinations, it is appropriate to operate the information matching apparatus 1A in a server such as a workstation. In addition, the information processing apparatus 1B includes a visualization unit that visualizes through a machine interface that may easily use small amount of information generated by the index information generating unit B 122B as its main part, acquires available information from the information matching apparatus 1A, and the amount of information on the network at that time is also small, whereby it is appropriate to operate the information processing apparatus 1B in a client such as a personal computer. Furthermore, a configuration may be employed in which a plurality of the information processing apparatuses 1B are connected to one information matching apparatus 1A.

The index information generating unit A 122A performs the name identification process according to the sequence described with reference to FIG. 19A, generates index information (index information before the sigmoid transformation and after the completion of the sigmoid transformation, thresholds before the sigmoid transformation and after the completion of the sigmoid transformation, index information of check points of "White" and "Black", and the like) used for visualization, and stores the index information in the index information 117 of the storage unit 11. The index information generating unit B (122B) acquires the index information generated by the index information generating unit A (122A) from the storage unit 11 through a network. Then, the index information generating unit 122B generates index information requested from the visualization unit or the like based on the acquired index information. Since the process of generating the index information has been described in relation with the index information generating unit 122, the duplicate description will not be repeated. Here, the index information, for example, represents a frequency distribution table.

When the IDs of the set of sample records as a visualization target are acquired from the sample record output unit 133, the sample extracting unit 124B searches for the actual records of the set of the sample records with the IDs used as keys from the name identification source DB 111 and the name identification target DB 112. Then, the sample extracting unit 124B delivers the retrieved actual records to the sample record output unit 133.

The judgment result counting unit 125B, as a judgment result based on new thresholds, acquires the name identification result 115 that includes a judgment list of "White" and the candidate list 116 that includes an upper portion judgment of "Gray" and a lower portion judgment of "Gray" through a network. Then, the judgment result counting unit 125B checks the trends in the acquired judgment result that is based on the new thresholds and the judgment result that is based on the old thresholds. In addition, the judgment result that is based on the old thresholds is stored in advance in the storage unit 11 or a temporary area of the judgment result counting unit 125B, which has been described in relation with the judgment result counting unit 125. In addition, since the process of checking the trends in the judgment results that are based on the old and new thresholds has been described in relation with the judgment result counting unit 125, the duplicate description thereof will not be repeated.

Advantages of Embodiments

According to the above-described embodiments, the information matching apparatus 1, for a plurality of records, acquires a total evaluation value representing a result of the matching between the records and generates a frequency distribution table in which the acquired total evaluation value is set as a class. Then, the information matching apparatus 1 outputs indices that comprehensively evaluate a plurality of matching results based on the generated frequency distribution table. In such a configuration, by generating a frequency distribution table in which the total evaluation value representing the matching result is set as a class, the information matching apparatus 1 generates the index information that represents the entirety of the plurality of matching results without storing the results of the plurality of matchings, whereby visualization can be performed by using the generated index information. In other words, even in a case where there are enormous records as matching targets, the information matching apparatus 1 can allow the entirety of the plurality of matching results to be clearly understood with a small amount of information.

In addition, according to the above-described embodiment, the index output unit 132 outputs the histogram of the total evaluation values as an index based on the frequency distribution table. In such a configuration, the index output unit 132 outputs the histogram of the total evaluation values as an index, the entirety of the total evaluation values can be understood accurately.

Furthermore, according to the above-described embodiments, the index output unit 132 outputs the judgment criteria (thresholds) used for the judgment of the name identification as indices on the histogram of total evaluation values. In such a configuration, the index output unit 132 additionally outputs the thresholds as indices on the histogram of total evaluation values, and accordingly, the entirety of the total evaluation values according to the relation with the thresholds as judgment criteria used for the judgment of the name identification can be accurately understood.

In addition, according to the above-described embodiments, the index output unit 132 calculates the sum of frequencies of respective sections of classes divided based on the judgment criteria (thresholds) that are used for judging a name identification based on the frequency distribution table and outputs the calculated sum of frequencies of respective sections as an index. In such a configuration, the index output unit 132 can estimate the numbers of the sets of records of the judgment results (a judgment of "White", a judgment of "Gray", and a judgment of "Black") corresponding to the thresholds as the judgment criteria used for judging the name identification without performing a matching process and a judgment process through the actual name identification, and accordingly, for a change in the judgment criteria (thresholds), the influence (effect) thereof can be simulated in a short time.

Furthermore, according to the above-described embodiments, the index information generating unit 122 sets a set of records, for which the judgment result is judged to be same each other, as a check point of "White". In addition, the index information generating unit 122 sets a set of records for which the judgment result is judged to be different each other is set as a check point of "Black". Then, the index information generating unit 122 acquires total evaluation values representing a matching result of each check point for check points of "White" and check points of "Black" and generates a frequency distribution table in which the acquired total evaluation value is set as a class. In addition, the index output unit 132 calculates the accuracy rates for each class of the check points of "White" and the check points of "Black" that are derived from the judgment criteria (thresholds) used for a judgment based on the frequency distribution table that is generated by the index information generating unit 122. Then, the index output unit 132 outputs the calculated accuracy rate for each class as an index. In such a configuration, since the index output unit 132 outputs the accuracy rates for the check points of "White" and the check points of "Black" as indices, the accuracy rates for all the areas of the classes in a case where the judgment criteria (thresholds) are changed can be visually evaluated altogether.

In addition, according to the above-described embodiment, the index information generating unit 122 normalizes the total evaluation values by using the judgment criteria (thresholds) used for the judgment and further generates a frequency distribution table in which a value acquired by performing a sigmoid transformation for the normalized value is set as a class. In such a configuration, the index information generating unit 122 normalizes the total evaluation values by using the thresholds and generates a frequency distribution table in which a value acquired by performing a sigmoid transformation for the normalized value is set as the class, and the index output unit 132 displays the frequency distribution table as a histogram, and accordingly, the portions near the thresholds can be amplified and output, and whereby the thresholds can be finely adjusted.

Furthermore, according to the above-described embodiments, the index information generating unit 122 stores a prejudged number of sets of sample records belonging to each class in association with the class. Then, the sample record output unit 133 acquires a total evaluation value for an output target and extracts a set of records corresponding to the acquired total evaluation value from a prejudged number of sets of sample records that are associated with the class by the index information generating unit 122. In addition, the sample record output unit 133 outputs the extracted set of sample records as indices. In such a configuration, the index information generating unit 122 judges the number of sets of sample records and associates sets of sample records belonging to each class that corresponds to the judged number with the class. Accordingly, the set of sample records that correspond to the total output value as an output target can be checked while suppressing the amount of data of the sets of sample records that are stored in association with the class.

In addition, according to the above-described embodiments, the threshold adjusting unit 126 changes the judgment criteria (thresholds) output by the index output unit 132. Then, the threshold adjusting unit 126, based on the frequency distribution table, performs an index information generating process according to the index using the changed thresholds and outputs the executed processing result as an index corresponding to the change thresholds again. In such a configuration, the threshold adjusting unit 126 can dynamically re-output the index without re-performing the name identification process in accordance with the change in the thresholds and accordingly, can judge optimal thresholds while allowing the indices to be checked. In addition, even in a case where the thresholds are changed, the threshold adjusting unit 126 can efficiently re-output the index corresponding to the changed thresholds by using the frequency distribution table generated once without regenerating the frequency distribution table that becomes the base of the index information.

Furthermore, according to the above-described embodiments, the threshold automatic adjusting unit 142 changes the judgment criteria (thresholds) based on the acquired index information and the adjustment policy that is set in advance.

In such a configuration, since the threshold automatic adjusting unit 142 changes the thresholds based on the adjustment policy, ideal thresholds that are compliant with the adjustment policy can be efficiently derived.

In addition, according to the above-described embodiment, the storage unit 11 stores a judgment list of "White" that represents information of sets of records judged to be same each other as the judgment result, a judgment list of "Gray" that represents information of sets of records judged to be difficult to judge as the judgment result, and the total number of judgment results. Then, the judgment result counting unit 125, for each set of records stored in the storage unit 11, matches the judgment results in a case where the judgment criteria (thresholds) used for the judgment, counts the number of changes in the judgment results of all the sets for individual sets of records, and outputs the counted results. In such a configuration, since the storage unit 11 stores the judgment list of "White", the judgment list of "Gray", and the total number of judgment results, the sets of records judged as "Black" can be judged and counted without storing a judgment list of "Black" that includes a considerable number of judgment results. As a result, the storage unit 11 can decrease the storage area and the counting processing time used for counting the number of changes in the judgment results by using the judgment result counting unit 125.

Furthermore, the judgment result counting unit 125 has been described to divide the judgment of "Gray" as the judgment result of the name identification into the judgment upper portion of "Gray" and the judgment lower portion of "Gray" and calculate the number of changes in the judgment results that are based on the low and new thresholds for each set of records included in the judgment results. However, the judgment result counting unit 125 may be configured so as to calculate the number of changes in the judgment results based on the old and new thresholds for each set of records included in the judgment results without dividing the judgment of "Gray" as the judgment result of the name identification into the judgment upper portion of "Gray" and the judgment lower portion of "Gray".

In addition, according to the above-described embodiments, the information matching apparatus 1A that includes the storage unit 11 and the name identification unit 121 and requires much information and high processing capability and the information processing apparatus 1B that includes the visualization unit and the threshold adjusting unit as its main part and mainly handles a small amount of information are separately configured and are interconnected through a network. For example, the information matching apparatus 1A is operated by a server such as a workstation, and the information processing apparatus 1B is operated by a client such as a personal computer, and accordingly, the information matching system 9 is realized at low cost, whereby a plurality of users can perform operations in a parallel manner.

Programs and the Like

In addition, the information matching apparatus 1 can be realized by mounting the functions of the storage unit 11, the control unit 12, and the like described above in an information processing apparatus such as a general personal computer, or a workstation.

In addition, the constituent elements of the information matching apparatus 1 illustrated in the figures do not need to be physically configured as illustrated in the figures. In other words, a specific form of the distribution or integration of the information matching apparatus 1 is not limited to that illustrated in the figure, and the entirety or a part thereof may be configured so as to be physically divided or integrated in an arbitrary unit based on various loads, the use state, and the like. For example, the sample record output unit 133 and the judgment result output unit 134 may be built into the index output unit 132 so as to be integrated as one unit. In addition, the sample record output unit 133 and the sample extracting unit 124 may be integrated as one unit. On the other hand, the index information generating unit 122 may be divided into a first index information generating unit that generates a frequency distribution table in which the total evaluation value is set as the class and a second index information generating unit that performs a sigmoid transformation of the total evaluation value and generates a frequency distribution table in which the total evaluation value after the transformation is set as the class. In addition, a third index information generating unit that generates a frequency distribution table in which the total evaluation values of check points of "White" and "Black" are set as the classes may be separated from the index information generating unit 122. Furthermore, the storage unit 11 that stores the name identification target DB 112, the name identification source DB 111, and the like may be configured as an external device of the information matching apparatus 1 that is connected to the information matching apparatus 1 through a network.

In addition, various processes described in the above-described embodiment can be realized by executing a program prepared in advance by using a computer such as a personal computer or a workstation. Thus, hereinafter, an example of a computer that executes an information matching program having the same functions as those of the control unit 12 of the information matching apparatus 1 illustrated in FIG. 1 will be described with reference to FIG. 23.

Figure 23:
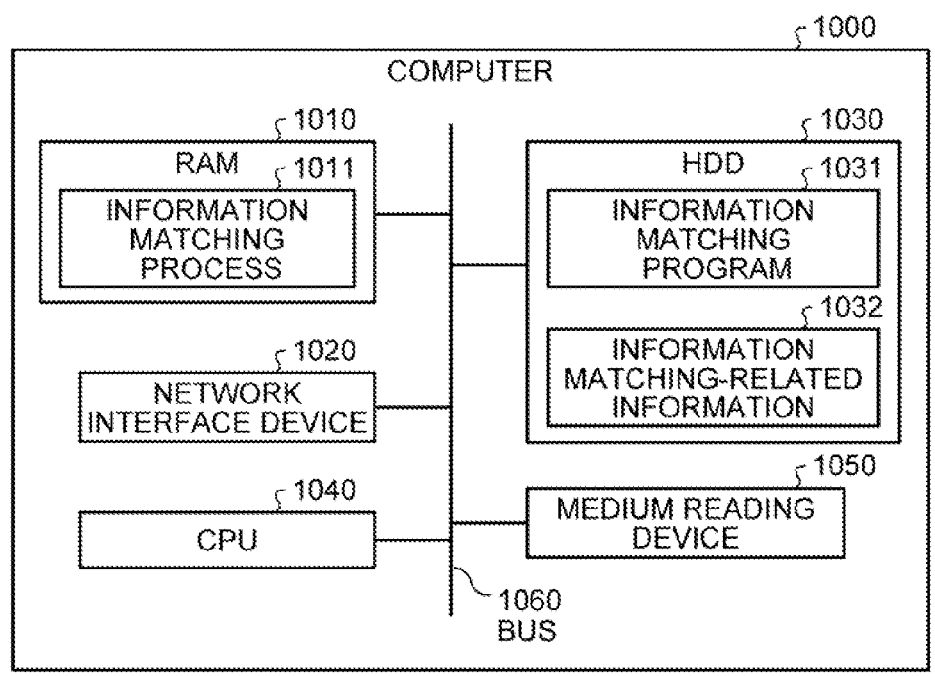
FIG. 23 is a diagram illustrating a computer that executes an information matching program.
Figure 24:
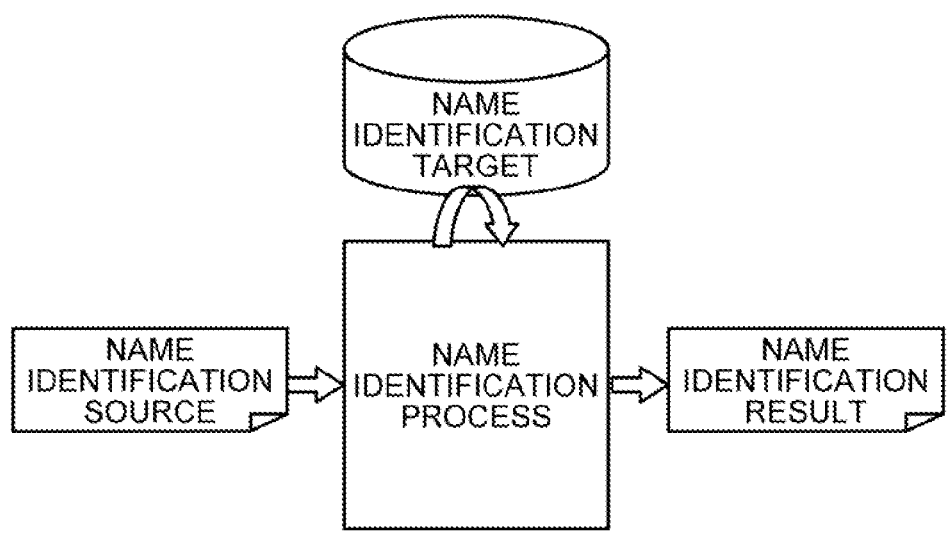
FIG. 24 is a diagram illustrating a name identification function.
Figure 25:
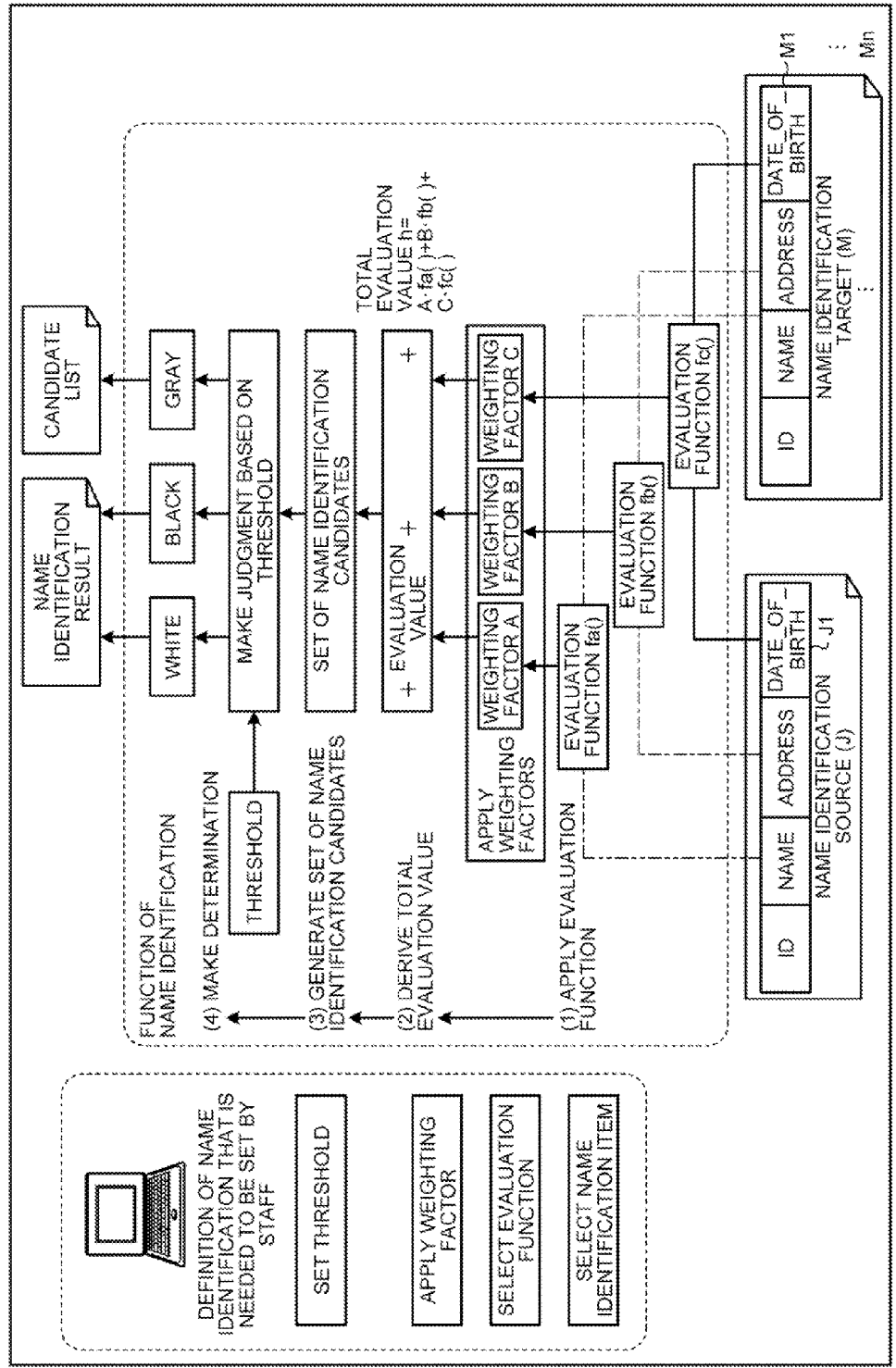
FIG. 25 is a diagram illustrating the operation of a name identification function.
Figure 26:
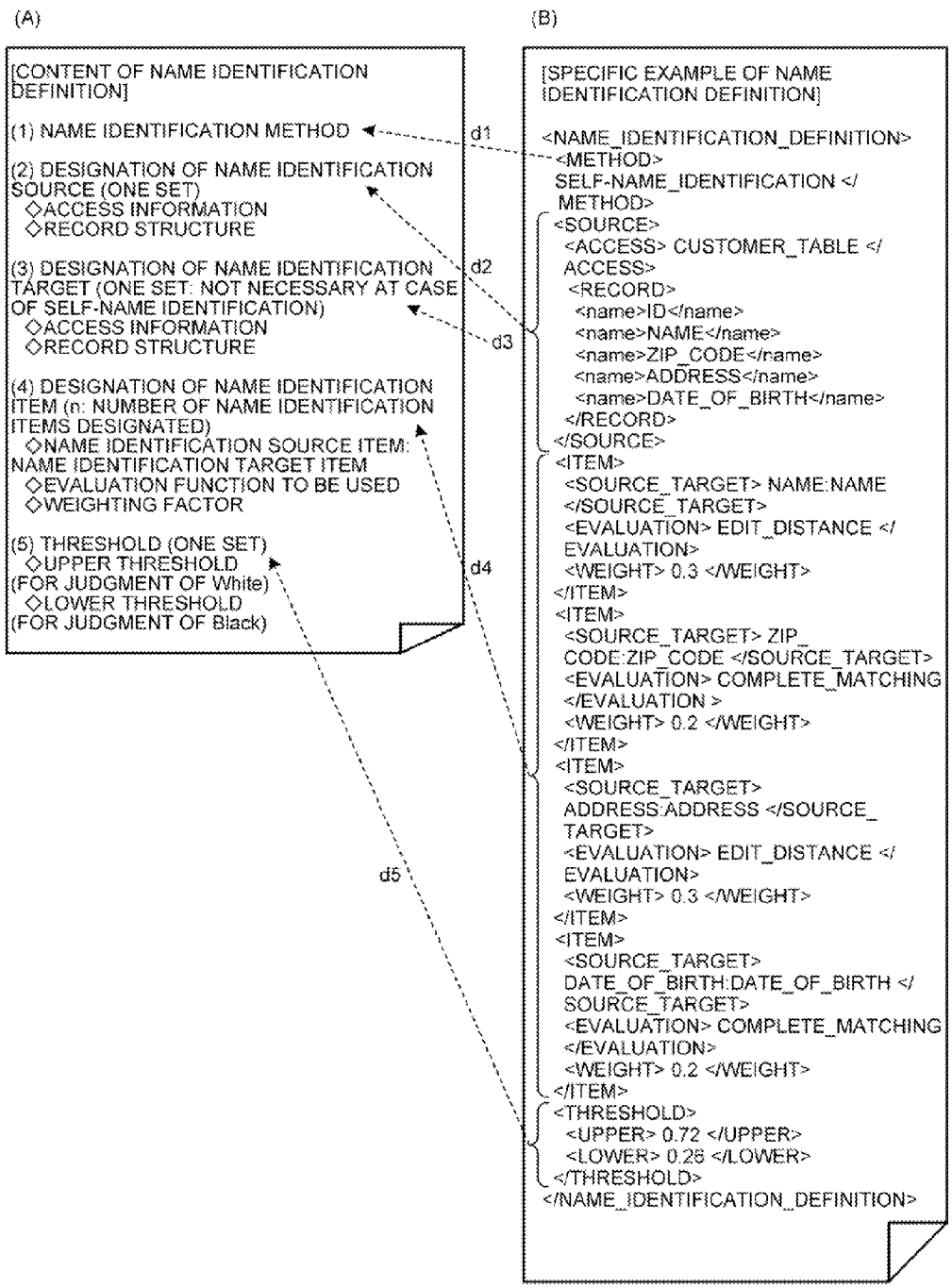
FIG. 26 is a diagram illustrating an example of the data structure of a name identification definition.
Figure 27:
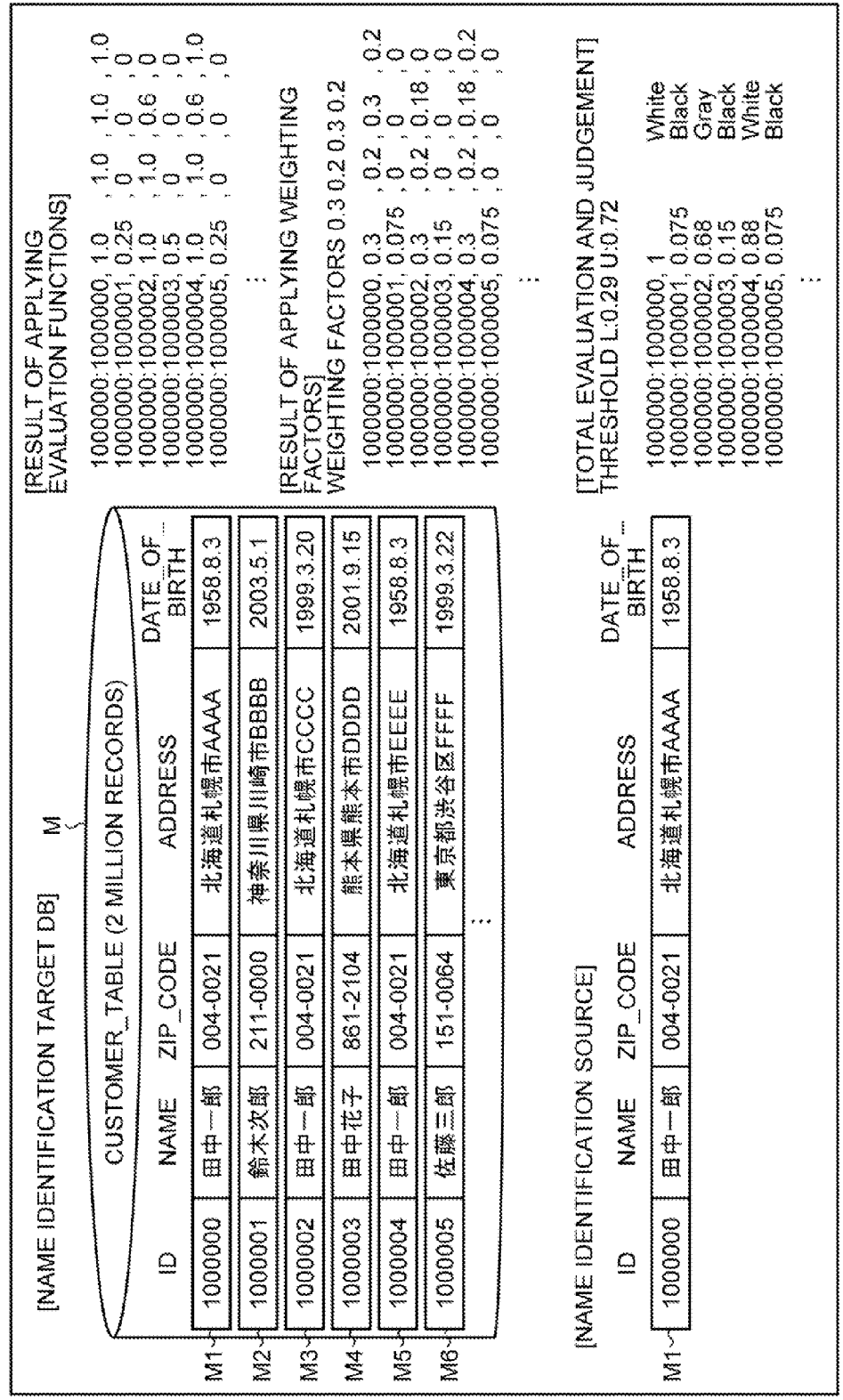
FIG. 27 is a diagram illustrating a specific example of a name identification.

FIG. 23 is a diagram illustrating the computer that executes the information matching program. As illustrated in FIG. 23, a computer 1000 includes a RAM 1010, a network interface device 1020, an HDD 1030, a CPU 1040, a medium reading device 1050, and a bus 1060. The RAM 1010, the network interface device 1020, the HDD 1030, the CPU 1040, the medium reading device 1050 are interconnected through the bus 1060.

In the HDD 1030, an information matching program 1031 that has the same function as that of the control unit 12 illustrated in FIG. 1 is stored. In addition, in the HDD 1030, information matching-related information 1032 corresponding to the name identification target DB 112, the name identification source DB 111, the name identification definition 113, the check point 114, the name identification result 115, the candidate list 116, and the index information 117 illustrated in FIG. 1 is stored.

As the CPU 1040 reads out the information matching program 1031 from the HDD 1030 and expands the information matching program 1031 in the RAM 1010, the information matching program 1031 serves as an information matching process 1011. The information matching process 1011 appropriately expands the information and the like read out from the information matching-related information 1032 in an area of the RAM 1010 that is assigned by the information matching process 1011 and performs various data processing based on the expanded data and the like.

Even in a case where the information matching program 1031 is not stored in the HDD 1030, the medium reading device 1050 reads out the information matching program 1031 from a medium that stores the information matching program 1031 or the like. As examples of the medium reading device 1050, there is a CD-ROM or an optical disk device. In addition, the network interface device 1020 is a device that is connected to an external device through a network and corresponds through a wired or wireless connection.

In addition, the computer 1000 illustrated in FIG. 23 may perform an information matching program that has the same function as that of a control unit 12B of the information processing apparatus 1B illustrated in FIG. 22.

In addition, the information matching program 1031 described above does not need to be stored in the HDD 1030, and this program stored on the medium reading device 1050 such as a CD-ROM may be read out and executed by the computer 1000. Furthermore, the program may be stored in another computer (or a server) or the like that is connected to the computer 1000 through a public line, the Internet, a LAN, a wide area network (WAN), or the like. In such a case, the computer 1000 reads out the program from such a unit through the network interface device 1020 and executes the program.

In a large-scale name identification process, the entire name identification results can be clearly understood. In addition, by providing the entire name identification results in a way that is clearly understood, the realization of an appropriate name identification setting can be supported.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information matching apparatus comprising:
a processor; and
a memory coupled to the processor, wherein the processor executes:
calculating matching result values representing identicalness, similarity, and relevance between a plurality of records by matching the plurality of records based on a specified judgment criterion, each of the plurality of records including sets of values corresponding to items;
generating frequency distribution information in which the calculated matching result values are used as classes;
outputting indices used for evaluating and visualizing a plurality of matching results based on the frequency distribution information generated at the generating, the indices including a histogram of the matching result value;
adjusting a threshold corresponding to the specified judgment criterion based on the generated frequency distribution information to generate an adjusted judgment criterion for whether the records match;
changing the specified judgment criterion based on an adjusting threshold;
outputting the adjusted judgment criterion with the output indices; and
re-outputting indices corresponding to the changed judgment criterion.

2. The information matching apparatus according to claim 1, wherein the outputting indices, outputs a judgment criterion used for a judgment of identicalness, similarity, and relevance between the records by matching the records as the indices.

3. The information matching apparatus according to claim 1, wherein the outputting indices, based on the frequency distribution information, sums up frequencies, for each section of classes divided based on the specified judgment criterion used for the judgment and outputs the calculated sum for each section as an index used for estimating the number of judgment results.

4. The information matching apparatus according to claim 1,
wherein the generating frequency distribution information, for check points of "White" that are sets of records to be judged to be the same as each other as a judgment result and check points of "Black" that are sets of records to be judged to be different from each other as the judgment result, acquires the matching result value that represents a matching result for each check point and generates a frequency distribution information in which the acquired matching result value is set as the class, and
wherein the outputting indices, based on the frequency distribution information generated at the generating, calculates an accuracy rate for each class of check points of "White" or check points of "Black" that is derived from the specified judgment criterion used for the judgment and outputs the calculated accuracy rate for each class as the indices.

5. The information matching apparatus according to claim 1, wherein the generating frequency distribution information, normalizes the matching result value by using the specified judgment criterion used for the judgment and further generates a frequency distribution information in which a value acquired by performing a sigmoid transformation for the normalized value is set as the class.

6. The information matching apparatus according to claim 1,
wherein the generating frequency distribution information, for each class, associates a prejudged number of sets of records that belong to the class, and
wherein the outputting indices, acquires the matching result value of an output target, extracts a set of records corresponding to the acquired matching result value from the prejudged number of sets of records that are associated with the classes at the generating, and outputs the extracted set of records as the indices.

7. The information matching apparatus according to claim 1, wherein the adjusting a threshold, changes the specified judgment criterion based on acquired index information and an adjustment policy that is set in advance.

8. The information matching apparatus according to 1, wherein the specified judgment criterion includes a threshold of the matching result value for the judgment of identicalness, similarity, and relevance between the records by matching the records as the indices.

9. The information matching apparatus according to 1, the information matching apparatus further comprising:
storing a prejudged number of sets of records corresponding to each class.

10. An information matching system comprising:
an information matching apparatus; and
an information processing apparatus that is connected to the information matching apparatus,
wherein the information matching apparatus includes a first generating unit which calculates matching result values representing identicalness, similarity, and relevance between a plurality of records by matching the plurality of records based on a specified judgment criterion, each of the plurality of records including sets of values corresponding to items and generates frequency distribution information in which the calculated matching result values are used as classes, and a second generating unit which adjusts a threshold corresponding to the specified judgment criterion based on the generated frequency distribution information to generate an adjusted judgment criterion for whether the records match and change the specified judgment criterion based on an adjusting threshold, and
wherein the information processing apparatus includes a first outputting unit which outputs indices used for evaluating and visualizing a plurality of matching results based on the frequency distribution information generated by the first generating unit, the indices including a histogram of the matching result value and a second outputting unit which outputs the adjusted judgment criterion with the output indices and re-outputs indices corresponding to the changed judgment criterion.

11. A method of matching information performed by an information matching apparatus, the method comprising:
calculating matching result values representing identicalness, similarity, and relevance between a plurality of records by matching the plurality of records based on a specified judgment criterion, each of the plurality of records including sets of values corresponding to items;
generating frequency distribution information in which the calculated matching result values are used as classes;
outputting indices used for evaluating and visualizing a plurality of matching results based on the frequency distribution information generated at the generating, the indices including a histogram of the matching result value;
adjusting a threshold corresponding to the specified judgment criterion based on the generated frequency distribution information to generate an adjusted judgment criterion for whether the records match;
changing the specified judgment criterion based on an adjusting threshold;
outputting the adjusted judgment criterion with the output indices; and
re-outputting indices corresponding to the changed judgment criterion.

12. A non-transitory computer readable storage medium having stored therein an information matching program causing an information matching apparatus to execute a process comprising:
calculating matching result values representing identicalness, similarity, and relevance between a plurality of records by matching the plurality of records based on a specified judgment criterion, each of the plurality of records including sets of values corresponding to items;
generating frequency distribution information in which the calculated matching result values are used as classes;
outputting indices used for evaluating and visualizing a plurality of matching results based on the frequency distribution information generated at the generating, the indices including a histogram of the matching result value;
adjusting a threshold corresponding to the specified judgment criterion based on the generated frequency distribution information to generate an adjusted judgment criterion for whether the records match, the adjusted judgment criterion being an adjusting threshold that changes the specified judgment criterion;
changing the specified judgment criterion based on an adjusting threshold;
outputting the adjusted judgment criterion with the output indices; and re-outputting indices corresponding to the adjusted changed judgment criterion.

\* \* \* \* \*